(12) United States Patent
Masters et al.

(10) Patent No.: US 7,096,248 B2
(45) Date of Patent: Aug. 22, 2006

(54) PROGRAM CONTROL FOR RESOURCE MANAGEMENT ARCHITECTURE AND CORRESPONDING PROGRAMS THEREFOR

(75) Inventors: Michael W. Masters, Fredericksburg, VA (US); Larry A. Fontenot, King George, VA (US); Paul V. Werme, King George, VA (US); Lonnie R. Welch, Athens, OH (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 681 days.

(21) Appl. No.: 09/864,821

(22) Filed: Sep. 19, 2001

(65) Prior Publication Data

US 2003/0191829 A1 Oct. 9, 2003

Related U.S. Application Data

(60) Provisional application No. 60/207,891, filed on May 25, 2000.

(51) Int. Cl.
*G06F 15/16* (2006.01)
(52) U.S. Cl. .............. 709/201; 709/202; 709/203; 709/205; 709/224; 718/100
(58) Field of Classification Search .......... 709/200, 709/201–203, 223, 224, 229, 244, 250, 205, 709/226; 707/10; 718/100
See application file for complete search history.

(56) References Cited

U.S. PATENT DOCUMENTS

| | | | | |
|---|---|---|---|---|
| 5,307,354 A * | 4/1994 | Cramer et al. | ............... | 714/4 |
| 5,590,340 A * | 12/1996 | Morita et al. | ............... | 713/323 |
| 5,655,081 A * | 8/1997 | Bonnell et al. | ............. | 709/202 |
| 5,958,009 A * | 9/1999 | Friedrich et al. | ............. | 709/224 |
| 5,958,010 A * | 9/1999 | Agarwal et al. | ............. | 709/224 |
| 5,968,124 A * | 10/1999 | Takahashi et al. | .......... | 709/224 |
| 5,987,135 A * | 11/1999 | Johnson et al. | ............. | 709/224 |
| 6,041,306 A * | 3/2000 | Du et al. | ..................... | 705/8 |
| 6,070,190 A * | 5/2000 | Reps et al. | ................. | 709/224 |
| 6,122,664 A * | 9/2000 | Boukobza et al. | .......... | 709/224 |
| 6,553,403 B1 * | 4/2003 | Jarriel et al. | ................. | 709/223 |
| 6,598,090 B1 * | 7/2003 | Champlin | .................... | 709/244 |
| 6,671,724 B1 * | 12/2003 | Pandya et al. | ............. | 709/226 |
| 6,714,976 B1 * | 3/2004 | Wilson et al. | ............. | 709/224 |
| 6,757,747 B1 * | 6/2004 | Hooper | ....................... | 709/201 |
| 6,807,575 B1 * | 10/2004 | Emaru et al. | ............... | 709/203 |
| 6,823,355 B1 * | 11/2004 | Novaes et al. | ............. | 709/201 |
| 6,871,233 B1 * | 3/2005 | Bearden et al. | ............. | 709/226 |
| 6,904,593 B1 * | 6/2005 | Fong et al. | ................. | 717/171 |
| 2003/0167270 A1 * | 9/2003 | Werme et al. | ................ | 707/10 |

* cited by examiner

*Primary Examiner*—Ario Etienne
*Assistant Examiner*—Ramy M. Osman
(74) *Attorney, Agent, or Firm*—Gerhard W. Thielman, Esq.; Scott R. Boalick, Esq.; James B. Bechtel, Esq.

(57) ABSTRACT

A program control device operating in a distributed environment comprised of hosts instantiating copies of a scalable application, the program control device controlling start up, shutdown or movement of a selected one of the copies based on signals generated in response to first information regarding performance of all copies of the scalable application and second infomation regarding performance of the hosts.

48 Claims, 27 Drawing Sheets

(SEE FIG. 5B)

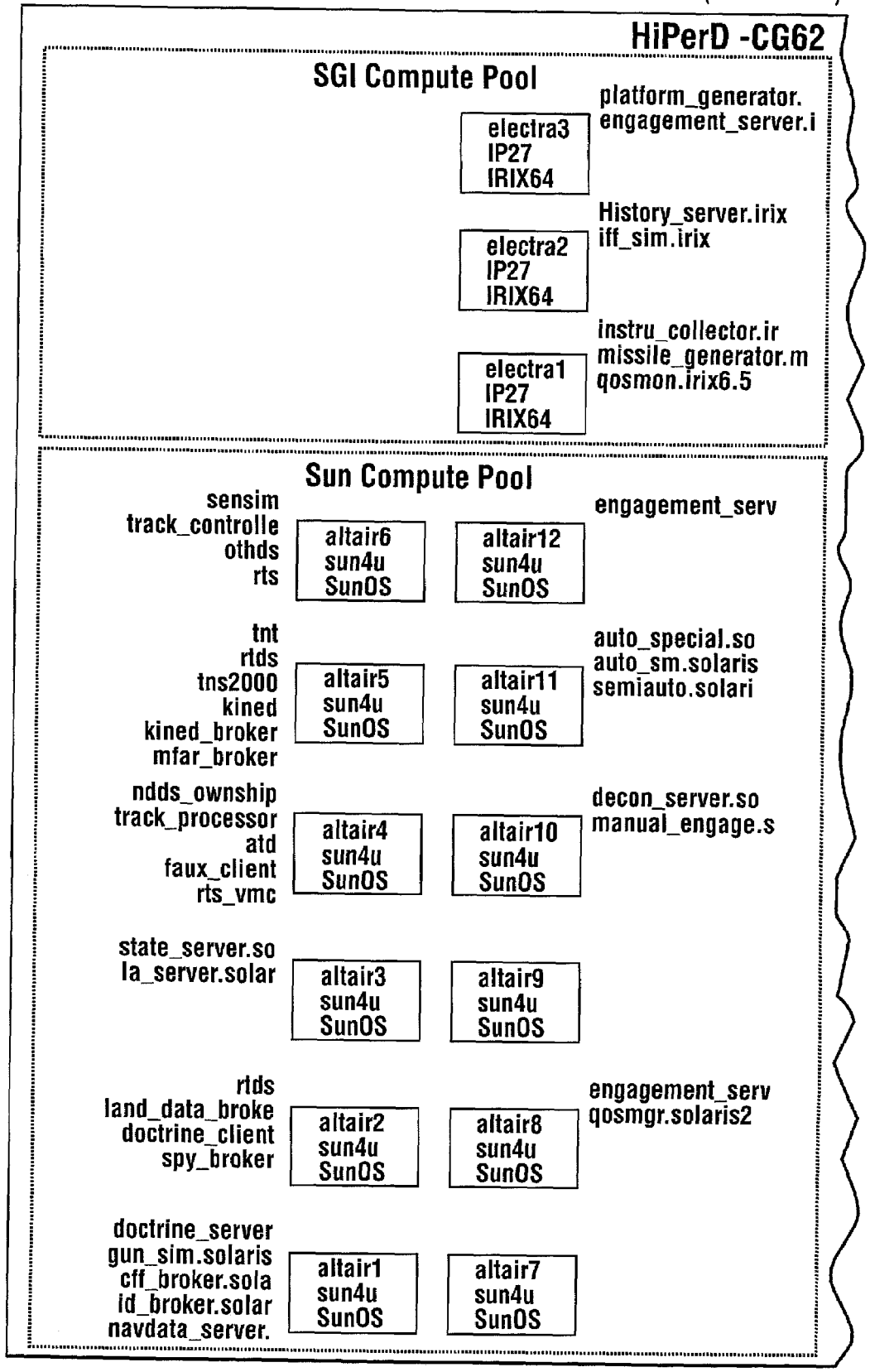
FIG. 6A (SEE FIG.6B)

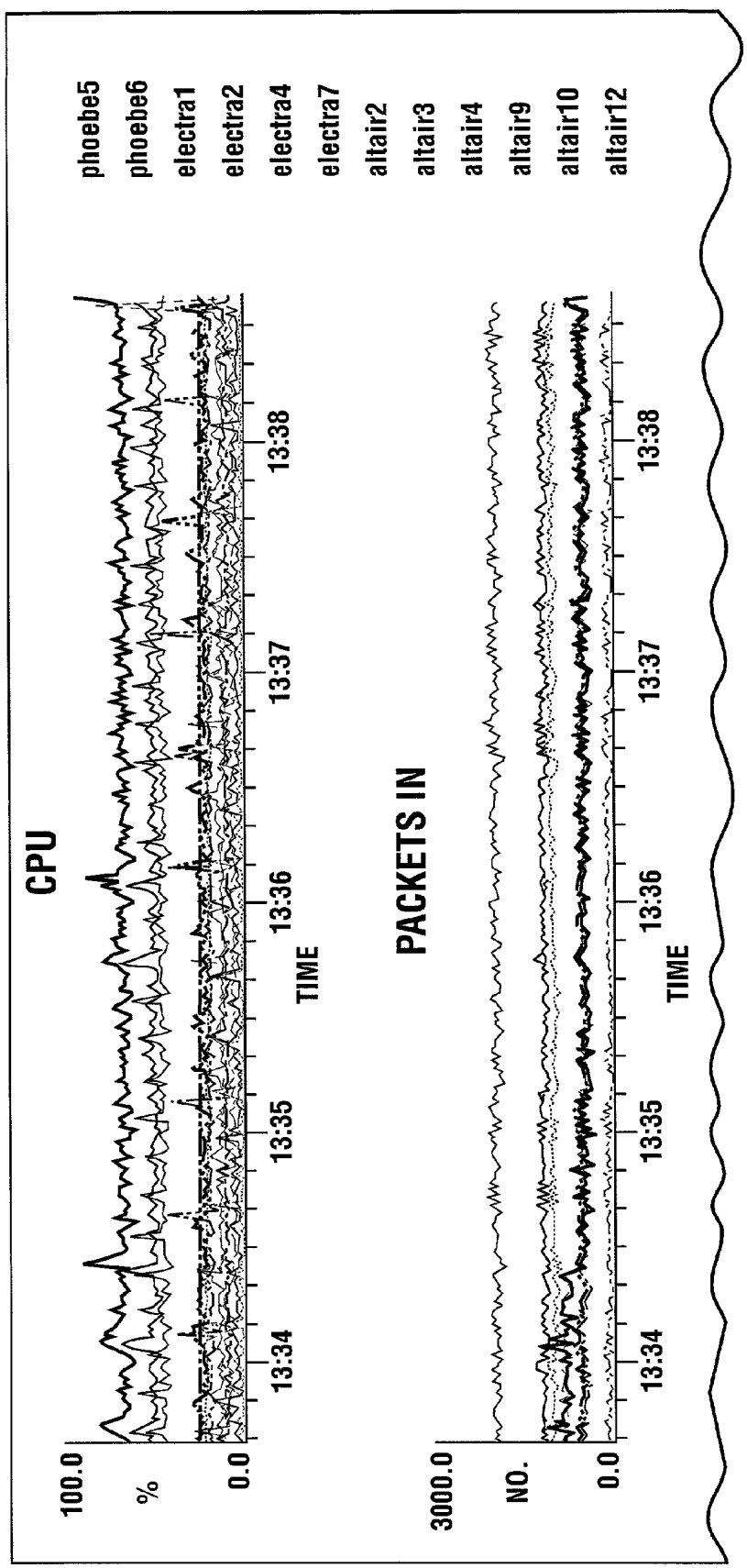

(SEE FIG.8B)

(SEE FIG.10B)

(SEE FIG.11B)

(SEE FIG. 12B)

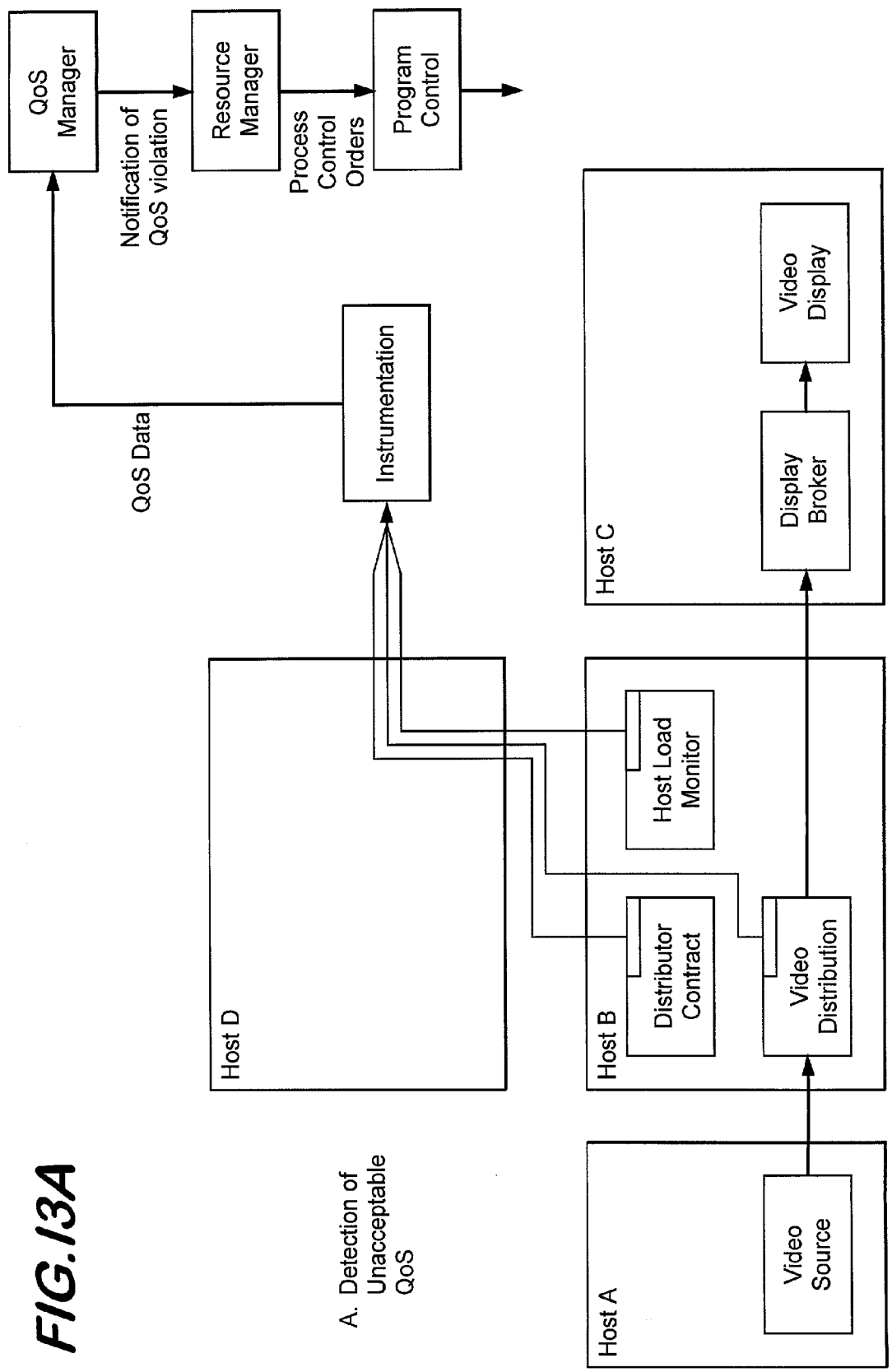

C. Shutdown of Distributor Components on Host B

PROGRAM CONTROL FOR RESOURCE MANAGEMENT ARCHITECTURE AND CORRESPONDING PROGRAMS THEREFOR

The instant application claims priority from Provisional Patent Application Ser. No. 60/207,891, which was filed on May 25, 2000. The Provisional Patent Application is incorporated herein in its entirety by reference.

STATEMENT OF GOVERNMENT INTEREST

The invention described herein was made in the performance of official duties by employees of the Department of the Navy or by researchers under contract to an agency of the United States government and, thus, the invention disclosed herein may be manufactured, used, licensed by or for the Government for governmental purposes without the payment of any royalties thereon.

BACKGROUND OF THE INVENTION

The present invention relates generally to resource management systems by which networked computers cooperate in performing at least one task too complex for a single computer to perform. More specifically, the present invention relates to a resource management system which dynamically and remotely controls networked computers to thereby permit them to cooperate in performing tasks that are too complex for any single computer to perform. Advantageously, software programs for converting a general purpose computer network into a resource managed network are also disclosed.

Resource Management consists of a set of cooperating computer programs that provides an ability to dynamically allocate computing tasks to a collection of networked computing resources (computer processors interconnected on a network) based on the following measures:

an application developer/user description of application computer program performance requirements;
 measured performance of each application programs;
 measured workload (CPU processing load, memory accesses, disk accesses) of each computer in the network; and
 measured inter-computer message communication traffic on the network.

Many attempts to form distributed systems and environments have been made in the past. For example, several companies and organizations have networked multiple computers to form a massively parallel supercomputer of sorts. One the best known of these efforts is SETI@home, which is organized by SETI (Search for Extraterrestrial Intelligence), a scientific effort aiming to determine if there is intelligent life out in the universe.

Typically, the search means the search of billions of radio frequencies that flood the universe in the hopes of finding another civilization that might be transmitting a radio signal. Most of the SETI programs in existence today, including those at UC Berkeley, build large computers that analyze that data from the telescope in real time. None of these computers look very deeply at the data for weak signals nor do they look for a large class of signal types. The reason for this is because they are limited by the amount of computer power available for data analysis. To extract the weakest signals, a great amount of computer power is necessary. It would take a monstrous supercomputer to get the job done. Moreover, SETI programs could never afford to build or buy that computing power. Thus, rather than use a huge computer to do the job, the SETI team developed software to use thousands of small computers, all working simultaneously on different parts of the analysis, to run the search routine. This is accomplished with a screen saver that can retrieve a data block over the internet, analyze that data, and then report the results back to SETI.

Several commercial companies are developing and implementing similar capabilities. Moreover, several companies, most notably IBM, have developed networks where each networked desktop computer becomes a parallel processor in a distributed computer system when the desktop computer is otherwise idle.

It will be appreciated that these approaches to computing in a distributed environment do not provide a system that is both flexible and adaptive (or at least easily adapted) to changes in system configuration, performance bottlenecks, survivability requirements, scalability, etc.

What is needed is a Resource Management Architecture which permits flexible control, i.e., allowing autonomous start up and shut down of application copies on host machines to accommodate changes in data processing requirements. What is also needed is functionality included in the Resource Management Architecture which permits the Resource Management Architecture to determine the near-optimal alignment of host and application resources in the distributed environment. It would be desirable to have a user-friendly technique with which to specify quality of service (QoS) requirements for each host, each application, and the network in which the hosts are connected. What is also needed is instrumentation to ensure that the specified QoS goals are being met.

SUMMARY OF THE INVENTION

Based on the above and foregoing, it can be appreciated that there presently exists a need in the art for a Resource Management Architecture, which overcomes the above-described deficiencies. The present invention was motivated by a desire to overcome the drawbacks and shortcomings of the presently available technology, and thereby fulfill this need in the art.

According to one aspect, the present invention provides, in a distributed environment comprised of hosts instantiating copies of a scalable application, a program control device responsive to signals ordering start up, shutdown or a move of a selected one of the copies responsive to first information regarding performance of all copies of the scalable application and second information regarding performance of the hosts.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIGS. 6A, 6B represent a screen capture of a host display generated by the Resource Management Architecture according to the present invention;

FIGS. 7A, 7B represent a screen capture of performance data regarding several of the hosts A–N included in FIGS. 6A, 6B;

FIGS. 13A, 13B, and 13C are block diagrams which are useful in explaining various operational and functional aspects of the Resource Management Architecture according to the present invention.

DETAILED DESCRIPTION OF THE PREFERRED EMBODIMENTS

Figure 1A:
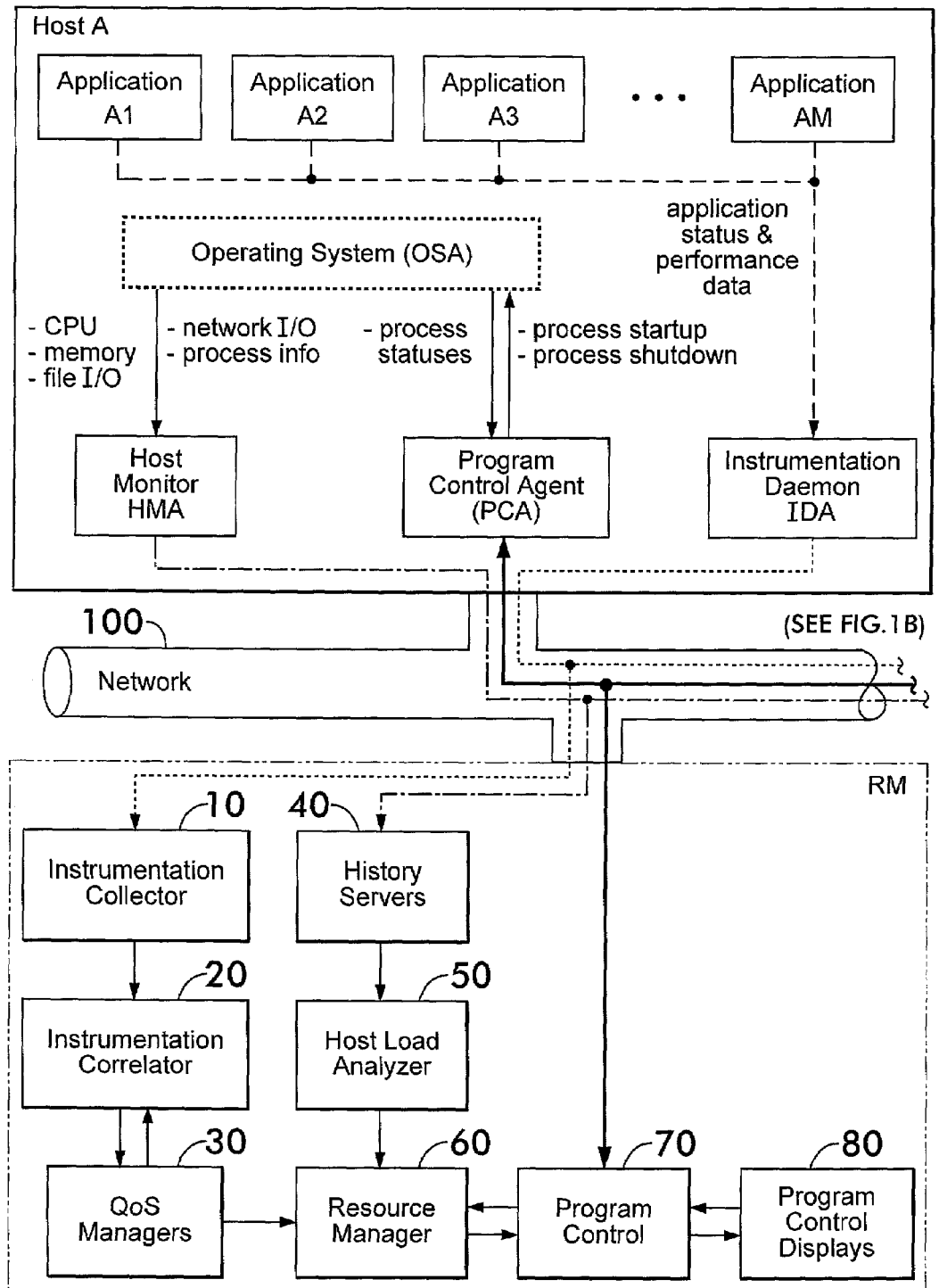
FIGS. 1A, 1B collectively represent a high-level block diagram of hardware and software components implemented in the Resource Management System according to the present invention.

The Resource Management Architecture, which was and is being developed by the Naval Surface Warfare Center—Dahlgren Division (NSWC—DD), provides capabilities for monitoring hosts, networks, and applications within a distributed computing environment. Moreover, the Resource Management Architecture provides the capability of dynamically allocating, and reallocating, applications to hosts as needed in order to maintain user-specified system performance goals. Advantageously, the Resource Management architecture provides functionality for determining both how each component within the distributed environment is performing and what options are available for attempting to correct deficient performance, determining the proper actions that should be taken, and enacting the determined course of action. In addition to these capabilities, the architecture also allows for operator control over creating and loading pre-defined static, dynamic, or combined static and dynamic system and/or host configurations. One particularly desirable feature of the Resource Management Architecture is that it provides capabilities for monitoring system performance along with the ability to dynamically allocate and reallocate system resources as required.

Before addressing the various features and aspects of the present invention, it would be useful to establish both terminology and the conventions that the instant application will follow throughout. In terms of terminology, a glossary section is presented below. In terms of conventions, this application includes information such as source code listing in an Appendix section. Since the source code itself is hundreds of pages, the Appendix section is divided into attached pages, e.g., Attached Appendix A, and an optical disk section, e.g., CD-Appendix N. Thus, while the appendices are listed in order, the reader must look to the signaling language to determine whether any particular appendix is actually provided in printed form.

| | |
|---|---|
| API | API (application programming interface) A set of subroutines or functions that a program, or application, can call to invoke some functionality contained in another software or hardware component. The Windows API consists of more than 1,000 functions that programs written in C, C++, Pascal, and other languages can call to create windows, open files, and perform other essential tasks. An application that wants to display an on-screen message can call Windows' MessageBox API function, for example. |
| BNF | Acronym for `Backus Normal Form' ( often incorrectly expanded as `Backus -Naur Form'), a metasyntactic notation used to specify the syntax of programming languages, command sets, and the like. Widely used for language descriptions but seldom documented anywhere, so that it must usually be learned by osmosis from other hackers. |
| DAEMON | A background process on a host or Web server ( normally in a UNIX environment), waiting to perform tasks. Well-known examples of daemons are sendmail and HTTP daemon. |
| FUNCTION | A capability available on a host due to the presence of software (e.g., a program), a software module (e.g., an API), etc. |
| GLOBUS | Wide area network (WAN) enterprise management and control capability developed under DARPA sponsorship by USC/ISI. |
| HOST | A device including a central processor controlled by an operating system. |
| ICMP | Internet Control Message Protocol - ICMP is an extension to the Internet Protocol. It allows for the generation of error messages, test |

-continued

| | |
|---|---|
| | packets and informational messages related to IP. It is defined in STD 5, RFC 792. |
| JEWEL | An open-source instrumentation package produced by the German National Research Center for Computer Science |
| NFS | Network File System - A protocol developed by Sun Microsystems, and defined in RFC 1094, which allows a computer system to access files over a network as if they were on its local disks. This protocol has been incorporated in products by more than two hundred companies, and is now a de facto Internet standard. |
| QoS | Quality of Service |
| REMOS | Remos (REsource MOnitoring System) is a network bandwidth and topology monitoring system developed under DARPA sponsorship by CMU. Remos allows network-aware applications to obtain relevant information about their execution environment. The major challenges in defining a uniform interface are network heterogeneity, diversity in traffic requirements, variability of the information, and resource sharing in the network. Remos provides an API that addresses these issue by striking a compromise between accuracy (the information provided is best-effort, but includes statistical information if available) and efficiency (providing a query-based interface, so applications incur overhead only when they acquire information). Remos supports two classes of queries. "Flow queries" provide a portable way to describe a communication step to the Remos implementation, which uses its platform-dependent knowledge to return to the user the capacity of the network to meet this request. "Topology queries" reverse the process, with the Remos implementation providing a portable description of the network's behavior to the application. |
| SNMP | Simple Network Management Protocol Internet standard protocol defined in STD 15, RFC 1157; developed to manage nodes, e.g., hubs and switches, on an IP network. |

Figure 1B:
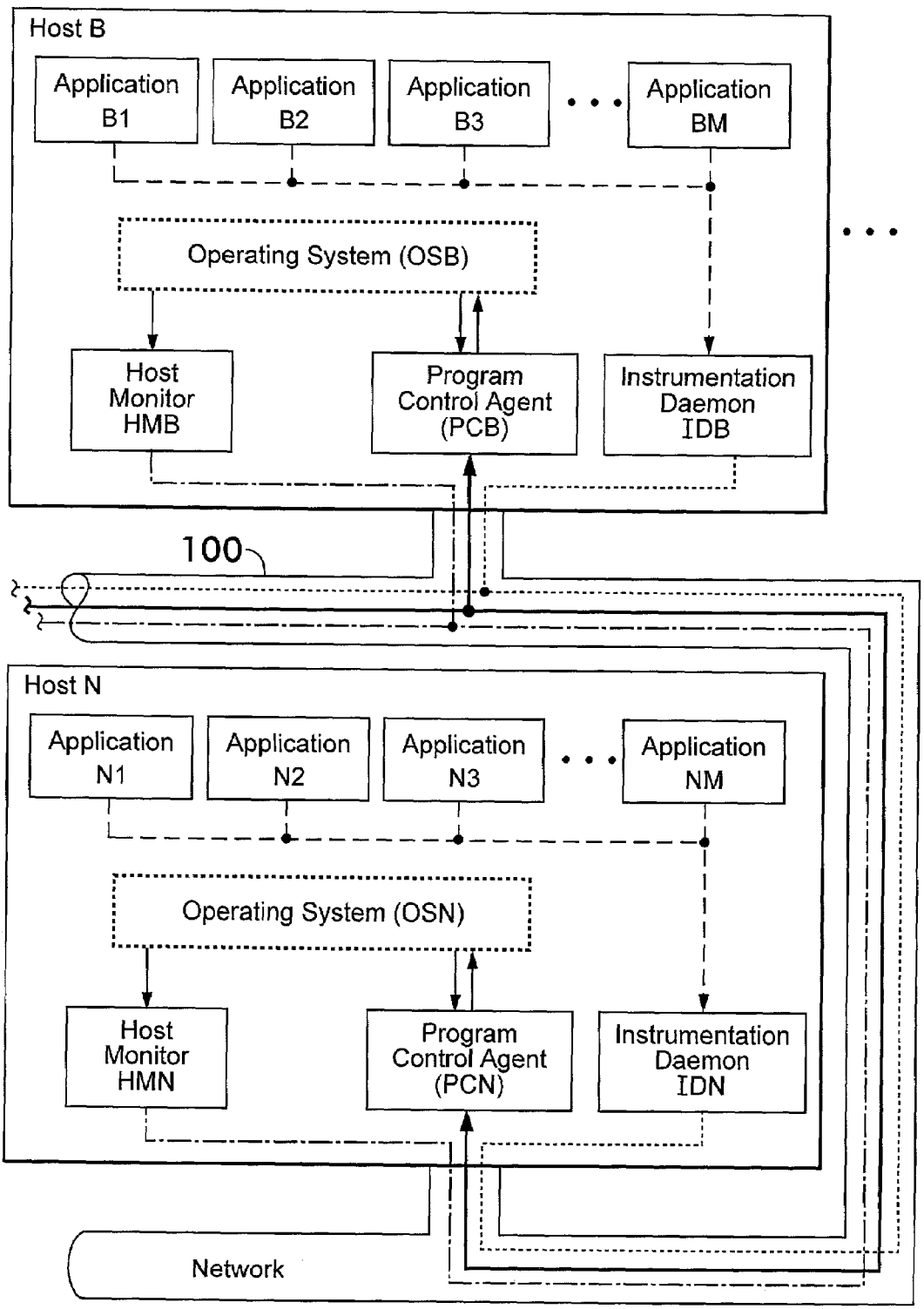

An exemplary system for implementing the Resource Management Architecture according to the present invention is illustrate in FIGS. 1A, 1B, which includes a plurality of Host computers A, B, . . . , N operatively connected to one another and Resource Management hardware RM via a Network 100. It will be appreciated that the hardware configuration illustrated in FIGS. 1a, 1B constitutes a so-called grid system. It will also be appreciated that the network 100 advantageously can be any known network, e.g., a local area network (LAN) or a wide area network (WAN). It will also be appreciated that the hardware RM need not be a discrete piece of equipment; the hardware RM advantageously can be distributed across multiple platforms, e.g., the host computer(s), as discussed in detail below. In addressing the functional elements and applications in the distributed environment, it will be appreciated that hosts A–N each can instantiate applications 1–M. Thus, when all applications are being addressed, these applications will be denoted as A1–NM.

Still referring to FIGS. 1A, 1B, each of the hosts A, B, etc., preferably is controlled by an operating system (OSA, OSB, etc.), which permits Host A, for example, to execute applications A1–AN, as well as an instrumentation daemon IDA, a Program Control (PC) agent PCA, and a Host Monitor HMA. It should be noted that instrumentation daemon IDA, PC agent PCA, and Host Monitor HMA are integral to the Resource Management Architecture while the operating system OSA and applications A1–AN are well known to one of ordinary skill in the art.

In FIGS. 1A, 1B, the Resource Management Architecture RM advantageously includes an instrument collector 10 receiving data from all of the instrumentation daemons (IDA–IDN) and providing data to instrument correlator(s) 20, which, in turn, provide correlation data to corresponding quality of service (QoS) managers 30. Resource Management Architecture RM also receives data from host monitors HMA–HMN at history servers 40, which maintain status and performance histories on each of the hosts A–N and provide selected information to host load analyzer 50. Analyzer 50 advantageously determines the host and network loads for both hosts A–N and their connecting network 100 and provides that information to Resource Manager 60, which is the primary decision making component of the Resource Management Architecture. It will be appreciated that Resource Manager 60 also receives information from the QoS managers 30 and exchanges information with program controller 70. Program controller 70 sends startup and shutdown orders to the Program Control Agents based on operator or Resource Manager-initiated orders. It will be appreciated that the operator-initiated orders are received via the one of the program control displays 80.

As will be discussed in greater detail below, the Resource Manager 60 is the primary decision-making component of the Resource Management Architecture. The Resource Manager 60 is responsible for determining:

how to respond to host and application failures;
where (i.e., which of hosts A–N) to place new applications;
which applications to start up in response to the detection of a new host (host N+1);
how to resolve application dependencies;
what applications should be started, stopped, or moved in response to application system priority changes; and
based on recommendations from the QoS Managers, when and where scalable application should be started or stopped.

Before leaving FIGS. 1A, 1B, is should be noted that the functions, e.g., instantiated programs or software program modules, in the Resource Management Architecture advantageously can be distributed across multiple platforms, e.g., multiple hosts (which may or may not be the illustrated Hosts A–N) or a grid system.

Figure 2A:
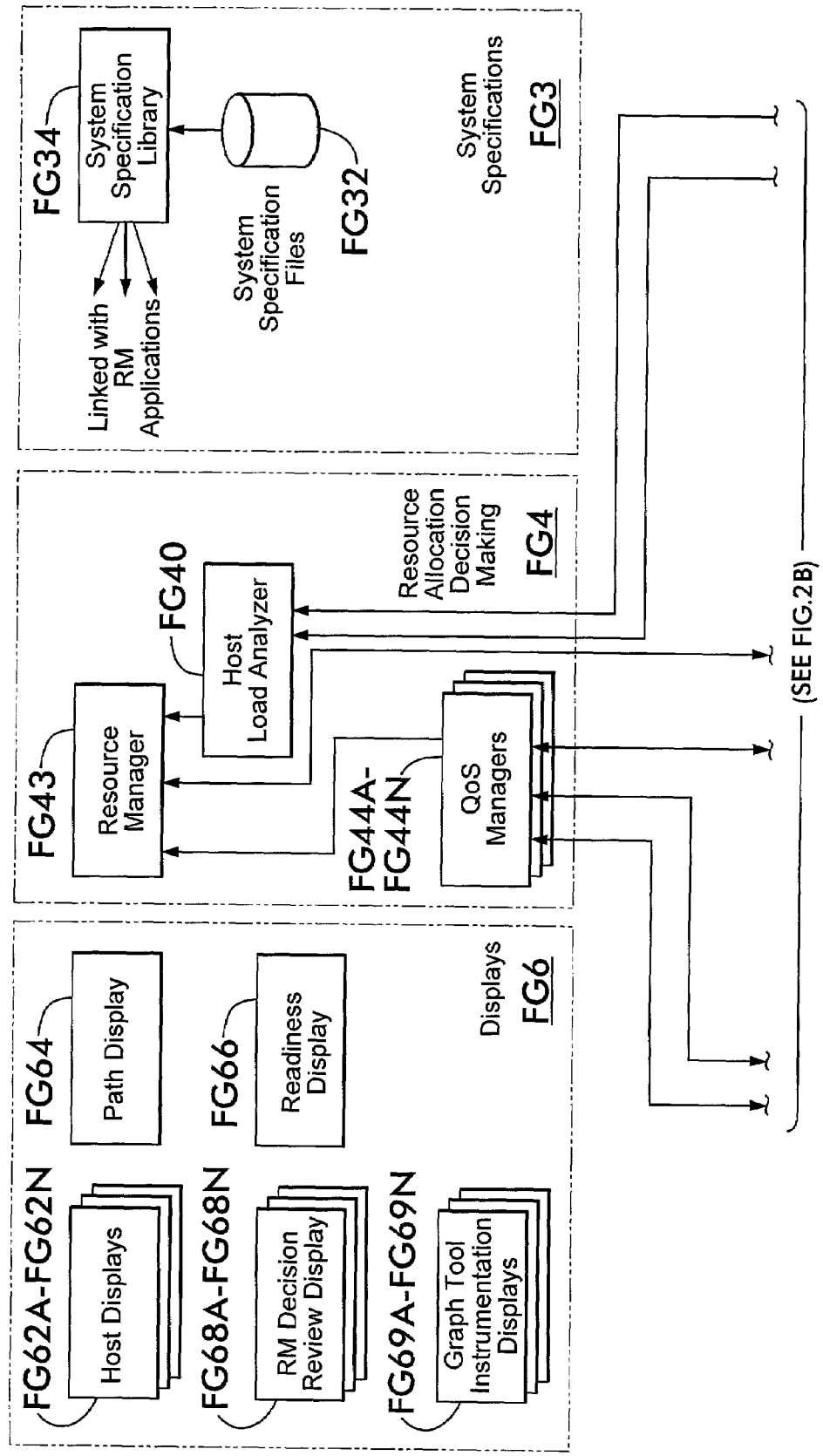
FIGS. 2A, 2B collectively represent a functional block diagram of the Resource Management Architecture according to the present invention.
Figure 2B:
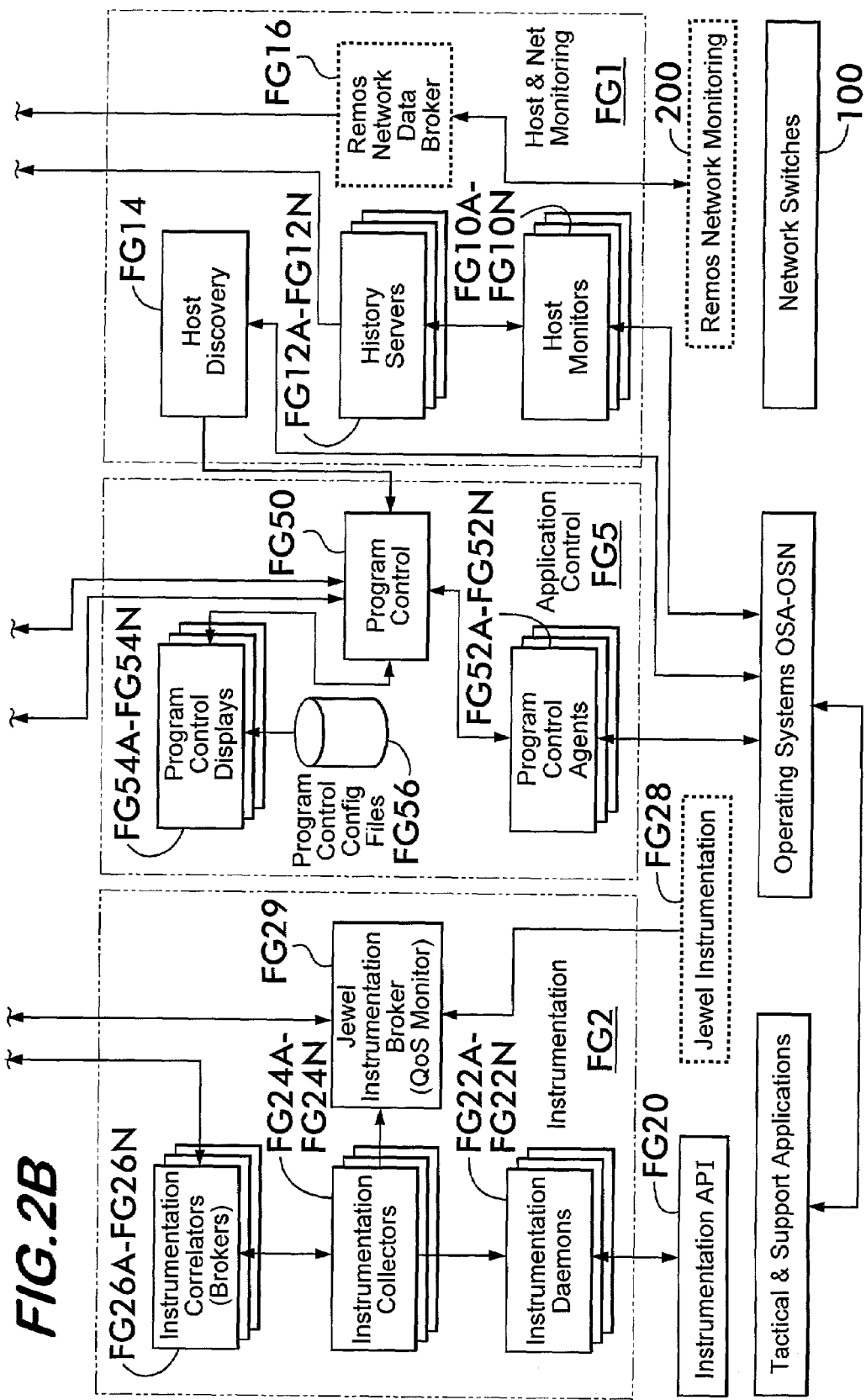

The major functional groups of the Resource Management Architecture according to the present invention are illustrated in FIGS. 2A, 2B. The functions illustrated as solid boxes are components of the Resource Management Architecture and are fully described below; the functions denoted by diagonal striping denote third-party software which has been integrated with the Resource Management Architecture but does not provide core functionality. Thus, the latter functions will be described only to the extent necessary to provide integration details. Moreover, it will be appreciated that the functions and functionality of the Resource Management Architecture according to the present invention are interconnected to one another via middleware, which provides message passing interfaces between substantially all of the Resource Management functions. This middleware package, RMComms, is fully described below.

The major functional groups provided by the Resource Management architecture in an exemplary embodiment of the present invention are illustrated in FIGS. 2A, 2B. A summary of the functions provided by the Resource Management Architecture is available in Attached Appendix A. These functions, taken together, provide an integrated capability for monitoring and control of a distributed computing environment. In addition, many of the functions (and functional groups) within the Resource Management Architecture can also be run in a non-integrated configuration, thus providing subsets of the integrated Resource Management capabilities.

These function(al) groups illustrated in FIGS. 2A, 2B include:

FG1—Host and Network Monitoring. This function group consists of software which monitors the host and network resources within the distributed environment. The function group collects extensive run-time information on host and network configuration, statuses, and performance. Run-time capabilities for discovering new hosts that have been started and for determining that existing hosts have gone down are also provided. Distribution of current and historical status and performance data to other components of the Resource Management Architecture is also provided. A more detailed discussion is provided below.

FG2—Application-Level Instrumentation. The instrumentation function group provides general-purpose application event reporting and event correlation capabilities. Capabilities are provided for collecting and correlating application-provided data such as application statuses, states, performance, and internally detected errors. Low-overhead (API) libraries are provided for applications to use in sending out key internal event and performance data. This application data is forwarded to other components of the instrumentation subsystem which collect data from applications on hosts throughout the distributed environment. The system also provides grammar-driven capabilities for correlating, combining, and reformatting application data into higher-level metrics (composite events) for use by displays or other Resource Management components.

FG3—System Specifications. A specification language has been developed which allows the user to specify:
  1) application software system structure, capabilities, dependencies, and requirements; and
  2) hardware system (computer and network) structure, capabilities, and configuration.

Specification files, based on this specification language, are created by the user and provide the model of the software and hardware components of the distributed computing environment which is used by other Resource Management functions. The specification information is accessed by other Resource Management functions by linking in a specification parser library and making library calls to read in the files and convert them to an internal object model. Specific specification data items can then be retrieved via an object-oriented API. See the discussion below.

FG4—Resource Allocation Decision-Making. This subsystem provides the reasoning and decision-making capabilities of the Resource Management architecture. The components of this subsystem use information from other subsystems in order to determine the health and state of the distributed environment and the options that are available for attempting to recover from faults or unacceptable performance. The functions in this particular functional group make decisions regarding:
  1) where new applications should be started;
  2) whether and where failed applications should be restarted;
  3) based on application inter-dependencies, whether and where additional applications should to be started prior to starting a particular application;
  4) whether applications are meeting performance requirements and whether and where an application can be scaled up or moved when it is necessary to improve performance;
  5) whether scalable applications are performing well within performance requirements and can be scaled down and which copy should be brought down; and
  6) based on operator changes to application system priorities, whether and where new applications need to be started or whether and which existing applications need to be shut down.

FG5—Application (Resource) Control. This subsystem provides application control (i.e., Program Control) capabilities which permit starting, stopping, and configuring applications on each of the hosts in the distributed environment. The subsystem provides both interactive operator control of the distributed environment as well as automatic control via configuration orders received from the Resource Allocation Decision-Making Subsystem (i.e., the Resource Manager component). The interactive controls allow an operator to create, load, save, and edit pre-defined system configurations (e.g., lists of applications that are to be run, with or without specific host mappings), determine the status and configuration of currently running programs, and start and stop any or all applications. Both static (operator-entered) mappings of applications to hosts and dynamic mappings of applications to hosts (where the Resource Allocation Decision-Making Subsystem will be queried to determine the proper mapping at run-time) can be defined. The subsystem also provides application fault detection capabilities which are triggered by the unexpected death of an application that was started by the subsystem. A basic host fault detection capability is also provided which is triggered based on failure to receive heartbeat messages from subsystem components running on a particular host.

FG6—Displays. The display subsystem provides capabilities for visualizing the status, performance, and health of the hosts, networks, and applications in the distributed environment. Capabilities are also provided for visualizing the status, performance, and health of the Resource Management components themselves.

As mentioned above, the RMComms middleware package provides the internal message passing interfaces between substantially all of the Resource Management functions both within each functional group and between the various functional groups. The middleware provides for automatic location-transparent many-to-many client-server connections. Low-overhead, reliable message passing capabilities are provided. Registration of message handler callback functions for specified requested message types is provided with the message handler functions being invoked when messages arrive. Registration of connection status callback functions, which are invoked when either new connections are made or existing connections are broken, is also provided. The middleware package also allows for multiple client and server objects to be instantiated in the same application, is thread-safe, and provides an easy-to-use object-oriented API through which all capabilities are accessed.

A detailed overview of each functional group and each function instantiated within each of the function groups FG1–FG6 of the exemplary embodiment of the Resource Management Architecture illustrated in FIGS. 2A, 2B, including the capabilities provided by the functional group or function, will now be described in greater detail. The discussion below also includes an overview of the information flow between function blocks within the same functional group and between function blocks in separate functional groups.

FG1—Host and Network Monitoring Functional Group

Functional group FG1 provides extensive monitoring capabilities at the host and network levels. The information monitored includes statuses, configuration information, performance metrics, and detected fault conditions. By monitoring the individual hosts and network components within the distributed environment, the functional group FG1 determines:

Accurate State and Performance Information, primarily by gathering the level of information necessary for accurately determining the state and health of each machine and network component.

Distribution of Current Data to Resource Management Components by providing current performance and status information, either periodically or on request.

Distribution of Historical Data to Resource Management Components, thus providing historical performance and status information on request.

It will be appreciated that the functional group FG1 makes these determinations by (or while) providing:

Common Monitored Data Set and Formats, which permits functional group FG1 to gather the same set of statuses and statistics in the same formats for each host regardless of machine architecture or operating system.

Minimally-Intrusive Data Collection Mechanisms, which permits functional group FG1 to gather the information in as non-intrusive a manner as possible (in terms of CPU utilization, network bandwidth utilization, etc . . . ).

Near Real-Time Data Collection Mechanisms, which permits functional group FG1 to gather the information in as timely a manner as possible.

The Host and Network functional group FG1 includes the four functions set forth below:

1) Host Monitors FG10A–FG10N, which reside on each respective machine in the distributed environment and collect extensive operating system-level data for each host A–N.
2) History Servers FG12A–FG12N, which collect data from the Host Monitors FG10A–FG10N, respectively, maintain status and performance histories on each host A–N in the distributed environment, i.e., in the Resource Management Architecture, and provide this information to displays and other functions with the Resource Management Architecture.
3) Host Discovery Function FG14, which uses Simple Network Management Protocol (SNMP) calls and ping Internet Control Message Protocol (ICMP) calls to determine when new hosts, e.g., host N+1, come on-line and if an existing host, e.g., host K, goes down.
4) Remos Network Data Broker Function FG16, which collects information on network link bandwidths from the SNMP-based Remos tool (developed by Carnegie Mellon University) and passes this information to the Host Load Analyzer function of the Resource Allocation Decision-Making functional group FG4, both of which are discussed in greater detail below.

Host monitors FG10A–FG10N, which monitor the status and performance of hosts A–N, respectively, are instantiated on each host machine within the distributed environment. Host Monitors FG10A–FG10N employ operating system-level mechanisms to retrieve status, configuration, and performance information on each host A–N. The information retrieved includes:

1) operating system version and machine configuration;
2) CPU configuration, status, and utilization;
3) memory configuration and usage;
4) network configuration, status, and utilization;
5) filesystem configuration, status, and utilization; and
6) process statuses including CPU, memory, network, and filesystem utilization for each process.

While Host Monitors FG10A–FG10N are primarily responsible for monitoring the status of a particular host, they also provide information on network load as seen by that particular host. In the same manner, the Host Monitors FG10A–FG10N also provide information and statistics concerning any remotely mounted filesystems, e.g., Network File System (NFS).

The information that the Host Monitors FG10A–FG10N collect advantageously can be formatted into operating system-independent message formats. These message formats provide a pseudo-standardized set of state, status, and performance information which is useful to other components of the Resource Management Architecture, i.e., other components do not have to be aware of or deal with the minor differences between data formats and semantics. It will be appreciated that since not all the state and performance data is available on every platform, in order to indicate which information is available, a group of flags are set in the host configuration message indicating whether specific data items are valid on a particular platform.

History Servers FG12A–FG12N are responsible for collecting information from the Host Monitors FG10A–FG10N and maintaining histories on the statuses, statistics, and performance of each host A–N in the distributed environment. This information advantageously can be requested by other functions instantiated in the Resource Management Architecture. Preferably, the primary consumers of the status information obtained by the History Servers FG12A–FG12N are the Host Load Analyzer (Hardware Broker) component of the Resource Allocation Decision-Making functional group FG4, the Host Display FG62A–FG62N and the Path Display FG64 of the Displays functional group FG6. The Host Load Analyzer FG40 receives information on host configuration and loads (primarily CPU, memory, and network data) from History Servers FG12A–FG12N and employs this information to assign host fitness scores. Each Host Display, e.g., FG62A, receives and displays current status information on one of the hosts A–N, including process status information, and network connectivity information. Each Host Display can also request that a respective one of the History Servers FG12A–FG12N provide CPU load information, network load information, paging activity data, and memory utilization information, which is used to drive line graph charts for specific selected hosts.

It will be appreciated that History Servers FG12A–FG12N are designed so that multiple copies can be run simultaneously. Each of the History Servers FG12A–FG12N advantageously can be configured to either monitor all Host Monitors or to monitor only a selected set of Host Monitors. It should be mentioned at this point that the History Servers FG12A–FG12N determine the list of hosts in the distributed environment that could potentially be monitored from the System Specification Library. In this manner, the History Servers advantageously can be used to provide survivability (by having multiple History Servers connected to each Host Monitor) and/or to perform load-sharing (with the History Servers FG12A–FG12N each monitoring only a subset of the Host Monitors). It will also be appreciated that the History Servers FG12A–FG12N can be configured to periodically record history data to disk. These disk files can then be used for off-line analysis of the Resource Management Architecture.

The Host Discovery function FG14 employs Perl scripts in making SNMP and ICMP ping calls. These calls are used to periodically scan each subnet and host address in the distributed environment in an attempt to determine whether there have been any host status changes. In an exemplary case, the list of hosts and subnets that are to be monitored is read in from a file; alternatively, this information can reside in and be read from the System Specification Library, which is discussed in greater detail below.

It should be mentioned that when a new host is first detected, the new host's operating system configuration is queried by the Host Discovery function FG14 via SNMP calls. Information on the newly discovered host and its operating system configuration is then sent to the Program Control function FG50 in application control functional group FG5. Likewise, when a host fails to respond to multiple SNMP and ping queries, a message indicating that the host appears to have gone down is sent to the Program Control function FG50.

The final component of the Host and Network Monitoring functional group FG1 is the Remos Network Data Broker FG16, which receives information on network link bandwidth and network link bandwidth utilization from the SNMP-based Remos network monitoring tool mentioned above. The network information is accessed via the Remos application programming interface (API) library and is then sent on to the Host Load Analyzer (Hardware Broker) function FG40 of the Resource Allocation Decision-Making functional group FG4. The network information received from Remos consists of the maximum potential bandwidth and the current bandwidth utilization on specific host network links. As mentioned above, Remos network monitoring tool FG 16 is not a core component of the Resource Management Architecture; that being the case, no further details on either Remos or the Remos Network Data Broker are provided in the instant application.

FG2—Application-Level Instrumentation Functional Group

The Instrumentation functional group FG2 advantageously provides general-purpose application event reporting and event correlation capabilities. The Instrumentation functional group permits instrumented application data to be easily accessible to other components of the Resource Management Architecture. The functional group provides capabilities for collecting and correlating application-provided data such as application statuses, states, performance, and internally detected errors. Low-overhead API's are provided that the applications can use for sending internal event and performance data to the instrumentation components. The instrumentation functional group FG2 can collect data from applications on hosts A–N throughout the distributed environment. The functional group also provides grammar-driven capabilities for correlating, combining, and reformatting application data into higher-level metrics (composite events) for use by displays or other functional groups of the Resource Management Architecture.

The Instrumentation functional group provides:
open API's and non-proprietary architecture
near real-time monitoring support
cross-language support: C, C++, Ada
cross-platform support: Solaris, IRIX, Linux, etc . . .
simple easy-to-use API's
low-intrusive instrumentation interface
instrumentation interface that does not significantly change the run-time behavior of the applications
support for passing wide range of data types
support for data marshalling/unmarshalling (system independent data formats)
support for adding to or changing the information being instrumented without having to recompile portions of the architecture unaffected by the changes (preferably, no recompilation should be necessary expect for recompilation of the app being instrumented and any evaluation logic or displays that have been affected by the changes)
scalable architecture (100+hosts/20+apps per host/5+ threads per app)
ability for the architecture to perform auto-configuration as required
ability to run multiple tests, multiple displays and multiple data logging components simultaneously
ability to abstract away the underlying connectivity/communications between infrastructure components.
ability for instrumentation infrastructure to be brought up and down while the application is running
ability to easily build and configure new displays and data logging components (interactive configuration is preferable)
ability to easily build and configure new performance and data correlation components (interactive configuration is preferable)
backwards compatibility with existing Jewel Instrumentation displays (protect investments in existing display capabilities)
backwards compatibility with existing Jewel Instrumentation function calls (provide ease of transition/backfit)

As illustrated in FIGS. 2A, 2B, the Instrumentation functional group FG2 includes the components enumerated below. In addition, Instrumentation APIs and Jewel Instrumentation will be addressed along with the Instrumentation functional group, i.e., the Instrumentation functional group includes:

1) Instrumentation API Libraries FG20 are linked with the applications and provide the function call interfaces by which these applications send instrumentation data.
2) Instrumentation Daemons FG22A–FG22N reside on each host in the distributed environment and are responsible for reading instrumentation data sent out by the applications, reformatting the data into instrumentation event messages and sending the messages to the Instrumentation Collectors.

3) Instrumentation Collectors FG24A–FG24N connect to the Instrumentation Daemons FG22A–FG22N on each host and receive instrumentation messages from host A–N. The Collectors forward received messages to the Instrumentation Correlators FG26A–FG26N and Instrumentation Brokers FG28A–FG28N.

4) Instrumentation Correlators FG26A–FG26N receive instrumentation messages from the Instrumentation Collectors FG24A–FG24N and provide grammar-driven capabilities for correlating, combining, and reformatting application data into higher-level metrics (composite events) for use by displays or other functions of the Resource Management Architecture.

5) Instrumentation Brokers FG28A–FG28N receive instrumentation messages from the Instrumentation Collectors and perform task-specific reformatting and data manipulation for driving displays or other Resource Management components.

6) Jewel Instrumentation Broker (QoS Monitor) FG29 (a legacy component) receives instrumentation data from either the open source Jewel instrumentation package or from the Instrumentation Collectors. The QoS Monitor FG29 performs task-specific message reformatting and data manipulation for driving displays and the QoS Managers FG44A–FG44N.

The applications, e.g., A1–AN, link in the Instrumentation API Library FG20 and make API calls to construct and send out instrumentation event messages. Three separate APIs are provided for use by the applications:

1) a printf( )-style API which allows the code to format, build, and send instrumentation data with a single function call;
2) a buffer-construction-style API where the multiple function calls are made to construct the instrumentation buffer iteratively, one data element per call; and
3) a Jewel function call API based on the existing API provided by the Jewel instrumentation package (an open-source package produced by the German National Research Center for Computer Science).

The first two APIs are the preferred programming interfaces and take advantage of several key instrumentation features while the Jewel API is provided solely for backwards compatibility with existing instrumented application code and is implemented as a set of wrappers around the printf( )-style API. All three APIs are supported for C and C++. ADA bindings have also been produced for the buffer-construction-style API and the Jewel function call API.

Preferably, the instrumented data is sent from the application to one of the Instrumentation Daemons FG22A–FG22N on a respective one of the hosts A–N where the application is running. The currently preferred mechanism for data transfer is via UNIX FIFO (first in-first out) IPC (inter-process communication) mechanisms. It will be appreciated that the FIFO mechanism was chosen based on reliability, low overhead, and ease of implementation. Alternative data passing mechanisms including shared message queues are considered to be within the scope of the present invention.

As mentioned above, an Instrumentation Daemon resides on each host in the distributed environment. The Instrumentation Daemon is interrupted whenever new data is written to the FIFO. The Instrumentation Daemon reads the data from the FIFO, reformats the data into the standard internal Instrumentation message format (discussed below), and sends the data to each of the respective Instrumentation Collectors FG24A–FG24N that are currently active. Alternatively, an event request filtering mechanism can be implemented so that specific event messages will only be sent to those ones of the Instrumentation Collectors FG24A–FG24N that have requested the message.

The standard instrumentation message format includes a header, a format string describing the application-provided data contained in the message, and the actual data values. The message components are illustrated in Attached Appendix B.

The Instrumentation Collectors FG24A–FG24N receive instrumentation messages from the Instrumentation Daemons FG22A–FG22N on each host A–N, respectively, in the distributed environment. Currently, the Instrumentation Collectors FG24A–FG24N send every instrumentation message to all Instrumentation Brokers FG29A–FG29N and Instrumentation Correlators (Brokers) FG26A–FG26N that have connected to the Instrumentation Collectors FG24A–FG24N. The Instrumentation Collectors FG24A–FG24N serve as a pass-through server for instrumentation messages. The Instrumentation Collectors do support architecture scalability in the sense that without the Instrumentation Collectors, the Instrumentation Broker FG29 and Instrumentation Correlators FG26A–FG26N would need to maintain connections to the Instrumentation Daemons FG22A–FG22N on every host. As discussed above, an event request filtering mechanism advantageously can be implemented so that specific event messages will only be sent to those Instrumentation Brokers/Instrumentation Correlators that have requested the message.

Preferably, the Instrumentation Correlators FG26A–FG26N provide grammar-driven capabilities for correlating, combining, and reformatting application data into higher-level metrics (composite events) for use by displays or other components of the Resource Management Architecture. Each Correlator reads in a user-specified correlation grammar file which is interpreted at run-time by the Correlator's instrumentation correlation engine.

The Instrumentation Brokers FG28A–FG28N are task-specific applications built around a common code package. The Instrumentation Brokers FG28A–FG28N receive instrumentation messages from the Instrumentation Collectors FG24A–FG24N, filter all received instrumentation messages to find the messages of interest, and perform task-specific message data reformatting and manipulation for driving other components such as displays or other components of the Resource Management Architecture. This Instrumentation Broker approach permits instrumentation data sources to be quickly integrated for test, display, and debugging purposes.

It should be mentioned at this point that the Jewel Instrumentation Broker FG29 (hereafter referred to the QoS Monitor) is a legacy architecture component that served as a broker between the Jewel instrumentation package components and Resource Management components and displays. The QoS Monitor FG29 was responsible for polling the Jewel Collector components to retrieve application event messages. These messages were then reformatted and used to drive several displays and the QoS Managers FG44A–FG44N. The Jewel instrumentation package has now been replaced in all applications, however the message reformatting capabilities of the QoS Monitor have been maintained so that several displays and the existing QoS Manager interface do not have to be upgraded immediately. The QoS Monitor component has been modified so that it receives instrumentation data from both Jewel and the Instrumentation Collectors.

FG3—System Specifications Functional Group

Still referring to FIGS. 2A, 2B, it should be noted that a System Specification Language has been developed which allows the user to specify both (1) software system structure, capabilities, dependencies, and requirements, and (2) hardware system (computer and network) structure, capabilities, and configuration. System Specification Files, generally denoted FG32, which are based on this specification language, are created by the user and provide a model of the software and hardware components of the distributed computing environment which is used by the Resource Management Architecture. The language grammar advantageously can capture the following information related to the distributed environment and the applications that can run within the distributed environment:

Hardware and Operating Systems
Hardware Configuration
Network Configuration
Operating Systems and Version
Software
Systems, Subsystems, Paths, Applications, Processes
Resource Requirements
QoS Requirements (Events)
Survivability Requirements
Data Flow Path Information: Structure and QoS Requirements It will be appreciated that the System Specification Language allows for grouping hardware and software components into systems and subsystems in order to create a hierarchy of components. Each application system and subsystem can be assigned a priority which is used at run-time to determine the relative importance of applications running in the distributed environment.

At the application level, the hardware, operating system, and other host requirements for each application can be specified along with information describing how to start up, configure, and shutdown the application. This information can include:

a) environment variables that need to be set;
b) the working directory for running the application;
c) the path(s) and file name of the application;
d) command-line arguments that should be set, including arguments that need to be resolved at run-time (e.g., the hostname where another application is running, the current date, the current userid, a unique run-time identifier number, etc . . . );
e) whether the application needs to run in an xterm;
f) whether a script file or signal should be run to shutdown the application; and
g) which script or signal should be used.

In addition, startup and shutdown dependencies between applications can be specified. Moreover, application states can be defined based on received instrumentation data values, the length of time an application has been running, and/or the set of processes that are currently running. Furthermore, for each application A1–NM, the survivability and scalability capabilities of the application can be specified. This latter information includes whether an application can be restarted if it fails, whether multiple copies of an application can be run, what type of scalability the application supports (e.g., Primary-Shadow, Load-Sharing, etc . . . ), and the minimum and maximum number of copies that can be run. Moreover, an estimate of the amount of CPU, memory, and network resources that the application will use at run-time, advantageously can be specified.

At the host level, the operating system and version, the hardware architecture, the host's network interface name, and the SPEC organization's SPECfp95 and SPECint95 ratings for the host can be specified. At the network level, router and switch configurations and bandwidths can also be specified.

Moreover, application data flow paths can be defined including a graph of the data flow between applications along with performance requirements tied to one of more of the applications within the path. It should be mentioned that these defined requirements are named and are tied at run-time to Instrumentation Event data provided by the Instrumentation Correlators FG26A–FG26N. Monitoring of the performance requirements is the responsibility of the QoS Manager components FG44A–FG44N, as discussed in greater detail below.

As noted above, the System Specification Language provides a hierarchical structure for defining software and hardware systems. The current structure is shown below:

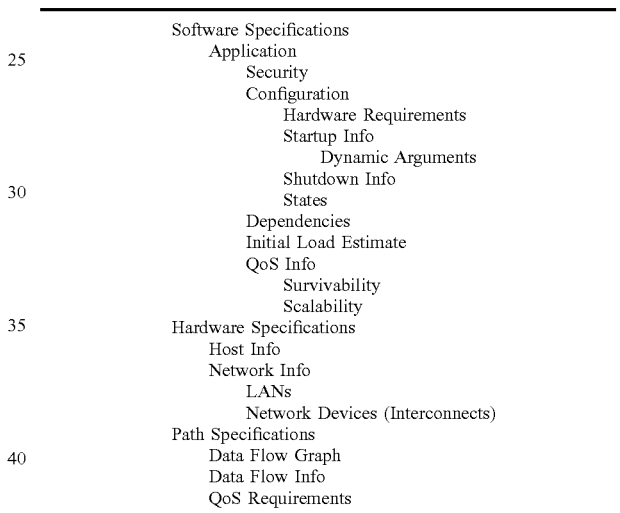

The specification information is accessed by linking in a specification parser library FG34 and making library calls to read in the files and convert them to an internal object model, and by making object access method calls to retrieve specific data items. The specification library is written in C++ and has been ported to all of the development platforms in the testbed. The library is currently being used by most of the Resource Management components, including Program Control FG50, the Resource Manager FG42, the QoS Managers FG44A–FG44N, the Hardware Broker FG40, and the History Servers FG12A–FG12N.

It should be mentioned that the software used to construct the API library consists of (1) a parser file that defines the grammar (in BNF format), (2) a lexical analyzer file that defines the tokens of the language, and (3) a set of C++ System Specification classes for storing the specification file information. The lexical analyzer file is compiled with the GNU flex (lex) utility and the parser file is compiled using the GNU bison (yacc) utility. The flex and bison utilities create C source files which are then compiled along with the C++ System Specification object storage classes to create the System Specification Library (SSL) FG34. This library is then linked with the Resource Management applications.

An overview of this structure is provided in FIG. 3; a more detailed discussion of the various functions are provided below.

FG4—Resource Allocation Decision-Making Functional Group

As illustrated in FIGS. 2A, 2B, the Resource Allocation Decision-Making functional group provides the reasoning and decision-making capabilities of the Resource Management architecture. The functions associated with this functional group employ information (listed below) to (1) determine the state and health of the distributed environment (hosts, networks, and applications), and (2) determine what allocation and reallocation actions need to be taken. The information provided to functional group FG4 includes:

---

System Specifications:
    Host configuration and capabilities
    Application capabilities
        Survivability
        Scalability
        Potential hosts to run on
    Application startup and shutdown dependencies
    Application and path performance requirements
Program Control:
    Application statuses
    Detected application faults
    Detected host failures
    Detection of new host
    Operator initiated requests
        Resolution of application startup or shutdown dependencies
        Selection of application-to-host mappings
History Servers:
    Host statuses, configuration, and loads
    Network link statuses and loads
Remos Network Data Broker:
    Network link statuses and loads
Instrumentation Subsystem:
    Application performance information
Readiness Display:
    Run-time changes to application system priorities

---

The subsystem components make decisions based on the following triggers and data sources:

- Based on requests from Program Control, determine where new applications should be started
- Based on indication of application failure from Program Control, determine whether and where the failed applications should be restarted
- Based on indication of host failure from Program Control (or indirectly from Host Discovery), determine whether and where the failed applications should be restarted
- Based on application inter-dependencies defined in the System Specification Files, determine whether and where additional applications should to be started (or shut down) prior to starting (or shutting down) a particular application
- Based on startup and shutdown dependency resolution requests from Program Control, determine whether and where additional applications should to be started (or shut down) prior to starting (or shutting down) a particular application
- Based on application instrumentation data and performance requirements defined in the System Specification Files, determine whether applications are meeting performance requirements and whether an application can be scaled up or moved to attempt to improve performance
- Based on application instrumentation data and performance requirements defined in the System Specification Files, determine whether applications are performing well within performance requirements and can be scaled down
- Based on operator changes to application system priorities, determine whether and where new applications need to be started and/or determine whether and which existing applications need to be shutdown
- Based on indication that a new host is on-line (from Host Discovery via Program Control), issue startup orders to bring up a Program Control Agent, Host Monitor, and Instrumentation Daemon on the new host which will bring the host under Resource Management control The Resource Allocation Decision-Making functional group implements one of the three discrete functions listed below:

1) Resource Manager FG 42 is the primary decision-making component of the Resource Management Architecture. Resource Manager FG42 is responsible for determining (1) how to respond to host and application failures, (2) where to place new applications, (3) which applications to start up in response to the detection of a new host, (4) how to resolve application dependencies, (5) what applications should be started, stopped, or moved in response to application system priority changes, and (6) based on recommendations from the QoS Managers FG44A–FG44N, when and where scalable application should be started or stopped.

2) Host Load Analyzer FG40 is responsible for assigning a set of fitness scores to each host based on host capabilities and loads.

3) QoS Managers FG44A–FG44N are responsible for monitoring application and path requirements as defined in the System Specification Files FG32 and recommending that applications be either scaled up, scaled down, or moved in order to maintain acceptable performance.

As mentioned above, the Resource Manager FG42 is the primary decision-making component of the Resource Management Architecture. It is responsible for:

(1) responding to application and host failures by determining if and what recovery actions should be taken;
(2) determining if and where to place new copies of scalable applications or which scalable applications should be shutdown when the QoS Managers indicate that scale-up or scale-down actions should be taken based on measured application performance;
(3) determining where new applications should be placed when requested to do so by Program Control; and
(4) determining which and how many applications should run based on application system (mission) priorities.

In order to accomplish these tasks, the Resource Manager FG42 maintains a global view of the state of the entire distributed environment including status information on all hosts A–N, network 100, and applications A1–NM. In addition, the Resource Manager FG42 also calculates software and hardware readiness metrics and reports these readiness values, for display purposes, to the display functional group FG6.

It will be appreciated from FIGS. 2A, 2B that the Resource Manager FG42 receives status and failure information about hosts, networks, and applications from Program Control function FG50. This information includes both periodic status updates and immediate updates when statuses change such as a new host being detected or an application failing. In the case of application shutdown, information as to whether the application was shutdown intentionally or whether the application failed is also provided. Program Control function FG50 also issues requests to the Resource Manager FG42 when new applications need to be dynamically allocated and when the Program Control function FG50 determines that the Resource Manager FG42 needs to assess and attempt to resolve inter-application dependencies (such as one application which needs to be running prior to starting up another application).

The Resource Manager FG42 responds to faulted applications and hosts by determining whether the failed applications can and should be restarted and attempting to determine where (and if) there are hosts available that the application can run on. When a decision is made by the Resource Manager FG42, a message is sent to Program Control FG50 specifying what application to start and where to put it, i.e., which of hosts A–N to start the application on. The same general mechanism is used when Program Control FG50 requests that the Resource Manager FG42 determine where to start new applications and/or how to resolve inter-application dependencies; the Resource Manager FG42 responds with orders indicating what applications to start and where to start them. The Resource Manager FG42 advantageously can send application shutdown instructions to Program Control FG50 requesting that a certain application be stopped; this can occur when the QoS Managers FG44A–FG44N indicate that certain scalable applications have too many copies running or when application system priority changes (when an application changes from a high priority to a lower priority) occur resulting in scaling back the application system configuration.

The Resource Manager FG42 also receives host load and host fitness information on all known hosts from the Hardware Broker (Host Load Analyzer) FG40. This information includes (1) overall host fitness scores, (2) CPU-based fitness scores, (3) network-based fitness scores, and (4) memory and paging-based fitness scores, along with (5) the SPEC95™ rating of the hosts. These scores are used by the Resource Manager FG42 for determining the "best" hosts for placing new applications when:

(1) responding to requests from the QoS Managers to scale up additional copies of an application;
(2) attempting to restart failed applications;
(3) responding to requests to dynamically allocate certain applications; and
(4) responding to application system (mission) priority changes which require scaling up additional applications.

The Resource Manager FG42 also receives requests from the QoS Managers FG44A–FG44N for scaling up, moving, or scaling down specific applications. The Resource Manager FG42 responds to these requests by determining whether the request should be acted upon and, if so, determines the specific action to take. The Resource Manager FG42 then issues orders to Program Control FG50 to start up or shutdown specific applications on specific hosts.

It should be noted that when the Resource Manager FG42 is first started, it reads in the System Specification Files FG32 (via calls to System Specification Library FG34) which contains the list of hosts that are known to be associated with the distributed environment and information on all applications that can be run in the distributed environment. The application-level information includes where, i.e., on which host, specific applications can be run, which applications are scalable, which applications can be restarted, and any dependencies between applications.

The Resource Manager FG42 currently responds to application system priority changes received from the Readiness Broker (translation software in or associated with the Readiness Display FG66) in the following manner:

(1) If the priority is changed to None, all applications associated with the specified system are shutdown.
(2) If the priority is changed to Low, all scalable applications within the specified system are scaled back to no more than 50% of potential maximum scalability and are not allowed to be scaled up past the 50% limit irregardless of performance.
(3) If the priority is changed to Medium, normal scaleup and scaledown functionality is allowed.
(4) If the priority is changed to High, all scalable applications are scaled up to at least 50% of potential maximum scalability and are not allowed to be scaled down to less than 50% irregardless of performance.
(5) If the priority is changed to Urgent, all scalable applications are scaled up to 100% (for maximum survivability) and are not allowed to be scaled down.

[Moreover, if the previous priority was None, and the new changed priority is higher than None, all required applications within the specified system are started up subject to the limitations outlined for each of the priority levels listed above.]

The Resource Manager FG42 also sends information about allocation and reallocation decisions to the Resource Management Decision Review Displays FG68A–FG68N, as discussed in greater detail below. Information on the decision that was made, what event the decision was in response to, and how long it took to both make the decision and implement the decision advantageously are also sent to the display functional group FG6. In addition, information about the alternative choices for where an application could have potentially been placed is also provided (if applicable); in an exemplary case, this information includes the host fitness scores for the selected host and the next best host choices which could have been selected.

As described above, the Resource Manager FG42 communicates with Program Control FG50, the Hardware Broker FG40, the QoS Managers FG44A–FG44N, QoS Specification Control (not shown), the Readiness Broker of display FG66, the Globus Broker (e.g., message translation software (not shown)), and the RM Decision Review Displays FG68A–FG68N using the RMComms middleware, which will be discussed in greater detail below.

The Hardware Broker (Host Load Analyzer) FG40 is the host load analysis component of the Resource Management Architecture, which is primarily responsible for determining the host and network loads on each host A–N within the distributed computing environment. The Hardware Broker FG40 assigns a set of fitness scores for each host and periodically provides the list of fitness scores to the Resource Manager FG42.

The Hardware Broker FG40 advantageously receives operating system-level statuses and statistics for each host A–N from the History Server(s) FG12A–FG12N, respectively. This information can be employed for calculating CPU, network, memory, paging activity, and overall fitness scores for each of the hosts A–N. Preferably, the Hardware Broker FG40 periodically, e.g, once per second, provides the complete list of host fitness scores to the Resource Manager FG42.

It should be noted that when the Hardware Broker FG40 is first started, it reads in the System Specification Files FG32 (via calls to the System Specification Library (SSL) FG34), which files contain the list of hosts that are known to be in the distributed environment. The Hardware Broker FG40 also receives, e.g., reads in a file containing, information about the bandwidth and maximum packet sizes on all known network subnets in the distributed environment. It will be appreciated that this data advantageously can be used for converting host network load information based on packet counts to load information based on bytes per second and percentage of available bandwidth.

Periodically, e.g., approximately every three seconds, the Hardware Broker FG40 transmits a list of overall and network host fitness scores to the Hardware Broker Instrumentation Display which was constructed using the Graph Tool Instrumentation Display FG69A–FG69N. Moreover, the Hardware Broker FG40 advantageously can receive host-based network load data from the Remos Network Data Broker function FG16, which receives network data via the Remos Network Monitoring software 2. It should be noted that if Remos network data is available for any of the hosts A–N that are being monitored, the Remos reported network data advantageously can be used for calculating the network fitness score for that host, rather than using the host network data received from the History Server(s) FG12A–FG12N.

The QoS Managers FG44A–FG44N of functional group FG4 are responsible for monitoring application-level performance requirements. These requirements are defined in the System Specification Files FG32 and are monitored primarily via instrumentation data obtained directly from the application code. The QoS Managers FG44A–FG44N advantageously can determine if applications or application paths are meeting their assigned requirements. If an application is not meeting its performance requirements and the application is scalable (in the sense that multiple copies can be run and the copies will perform load-sharing across the copies), the QoS Managers FG44A–FG44N will either request that the Resource Manager FG42 scale up a new copy of the application or move the application to a new host (as an attempt to achieve better performance). Moreover, if there are multiple copies of a scalable application running, and all copies are performing well below the specified requirement threshold, the QoS Managers FG44A–FG44N will request that the Resource Manager FG42 shutdown a specific copy. It should be noted that the division of responsibility between the QoS Managers FG44A–FG44N and the Resource Manager FG42 is that the QoS Managers determine what actions would potentially improve performance, while the Resource Manager has final authority to determine whether to implement the requested action(s).

Each of the QoS Managers FG44A–FG44N can be scaled for both redundancy and for load-sharing. In an exemplary case, each copy of the QoS Manager monitors all of the requirements associated with a single application path defined in the System Specification Files FG32. It will be appreciated that the specific path to be monitored can be specified via command-line parameters. By default, without specifying a path via the command-line, the QoS Managers FG44A–FG44N will monitor all requirements for all paths defined in the System Specification Files FG32.

It should be mentioned that, in one exemplary embodiment, the QoS Managers FG44A–FG44N each employ a sliding window algorithm to determine when to declare that applications should be scaled up or scaled down. The inputs to the algorithm define both high and low sampling window sizes, the maximum number of allowed violations within the sampling window, and violation thresholds as a percentage of the actual specified requirement value. It should also be mentioned that the sliding window algorithm was selected in order to damp out unexpected "noise" or "spikes" in the measured performance data. Moreover, the threshold value as a percentage of the actual requirement value was selected in order to scale up, or scale down, prior to violating the specified hard requirement. The QoS Managers FG44A–FG44N provide application scale up and scale down requests to the Resource Manager FG42 when the measured performance data for an associated application violates either the high (scale up) or low (scale down) sliding window criteria for a specific requirement. A scale up request indicates which application on which host has violated the performance criteria, and a scale down request indicates which application on which host is recommended to be shutdown. It will be appreciated that the success of this algorithm is highly dependent on the rate of change and noisiness of the measured data.

Any of the QoS Managers FG44A–FG44N can also request that the Resource Manager FG42 move an application. This will occur in the case where one copy of an application is performing much worse than all other running copies of the same application. In an exemplary case, the move request is implemented as a scale up request followed by a scale down request (of the badly performing copy). In that case, the scale down request does not get sent to the Resource Manager FG42 until the scale up action has been implemented. The QoS Managers FG44A–FG44N preferably employ application "settling times," defined in the System Specification Files FG32, to ensure that once a requested action has been sent to the Resource Manager FG42 that no additional actions are requested for that application until after the settling time has elapsed. It will be appreciated that this provides time for initialization and configuration among the application copies to occur. Alternatively, System Specification Language inter-application dependency definitions advantageously can be used instead of settling times.

The QoS Managers FG44A–FG44N also receive application status and state information from Program Control FG50, which periodically sends application status updates for all running applications and also sends immediate indications of any applications which have been started or stopped. This information is used by the QoS Managers FG44A–FG44N, along with the instrumented performance data being received via the QoS Monitor FG29 and Instrumentation Correlator FG34, to determine the exact state of all monitored applications that are running. This information is also used to determine when (and if) requested actions have been implemented by the Resource Manager FG42. The information is also used for setting up and discarding internal data structures used for monitoring the performance of each application A1–NM.

It will be appreciated that the QoS Managers FG44A–FG44N also receive application-level instrumentation data indicating current application performance values from the Instrumentation Correlators (Brokers) FG26A–FG26N, the Instrumentation Brokers FG28A–FG28N, and/or the Jewel Instrumentation Broker (QoS Monitor) FG29. The instrumentation data that is received contains (at a minimum) (1) the timetag when the data was generated, (2) the hostname and IP address of the host where the application that the data is associated with is running, (3) the process id (pid) of the application that the data is associated with, and (4) the event number of the instrumentation message. Preferably, the event number of the instrumentation message specifies the type of instrumentation data that has been received; the hostname, IP address, and pid are used, in conjunction with the application data received from Program Control FG50, to determine the specific application that the data is associated with.

When the contents of the instrumentation message match any of the application performance requirements that are currently being monitored by the QoS Managers FG44A–FG44N, the data value is added to the proper requirement sliding window for the specified application. The sliding window algorithm is then checked to determine if the new sample triggered a violation of either the high or low sliding window. If a high threshold sliding window violation occurs and the application does not already have the maximum number of copies running, a determination is made as to whether performance can be best improved by starting a new application (scale up) or by moving an existing copy to a different host. The corresponding action recommendation will then be sent to the Resource Manager FG42. In an exemplary case, the criteria for determining whether an application should be moved rather than scaled up is based on relative performance of the replicated applications. More specifically, if one application is performing much worse [>50%] than the other copies, the recommendation will be to move the application. Likewise, if the new sample triggers a low threshold sliding window violation and the application has more than the minimum number of copies running, a recommendation will be sent to the Resource Manager FG42 requesting that the copy of the application that is experiencing the worst performance be scaled down.

FG5—Resource (Application) Control Functional Group

As discussed above, the Resource Control capabilities provided by the Resource Management Architecture consist of controlling application startup, configuration, and shutdown on hosts within the distributed environment. This capability, known as Application Control or Program Control (hereafter referred to as Program Control) provides a powerful distributed configuration capability. The Program Control capabilities permit an operator to startup and control applications running on platforms throughout the distributed environment via an easy-to-use interactive display. These capabilities are provided by the Application Control functional group FG5.

More specifically, the Application Control functional group provides application control (i.e., Program Control) capabilities which permit starting, stopping, and configuring applications on each of the hosts in the distributed environment. The functional group provides both interactive operator control of the distributed environment as well as automatic control via configuration orders received from the Resource Allocation Decision-Making functional group FG4, i.e., the Resource Manager component. The interactive controls allow an operator to create, load, save, and edit pre-defined system configurations, e.g., lists of applications that are to be run, with or without specific host mappings, determine the status and configuration of currently running programs, and start and stop any or all applications. Both static (operator-entered) mappings of applications to hosts and dynamic mappings of applications to hosts (where the Resource Allocation Decision-Making functional group FG4 will be queried to determine the proper mapping at run-time) advantageously can be defined. The functional group also provides application fault detection capabilities which are triggered by the unexpected death, i.e., fault, of an application that was started by the functional group. A basic host fault detection capability is also provided which is triggered based on failure to receive heartbeat messages from functional group components running on a particular host.

Figure 4:
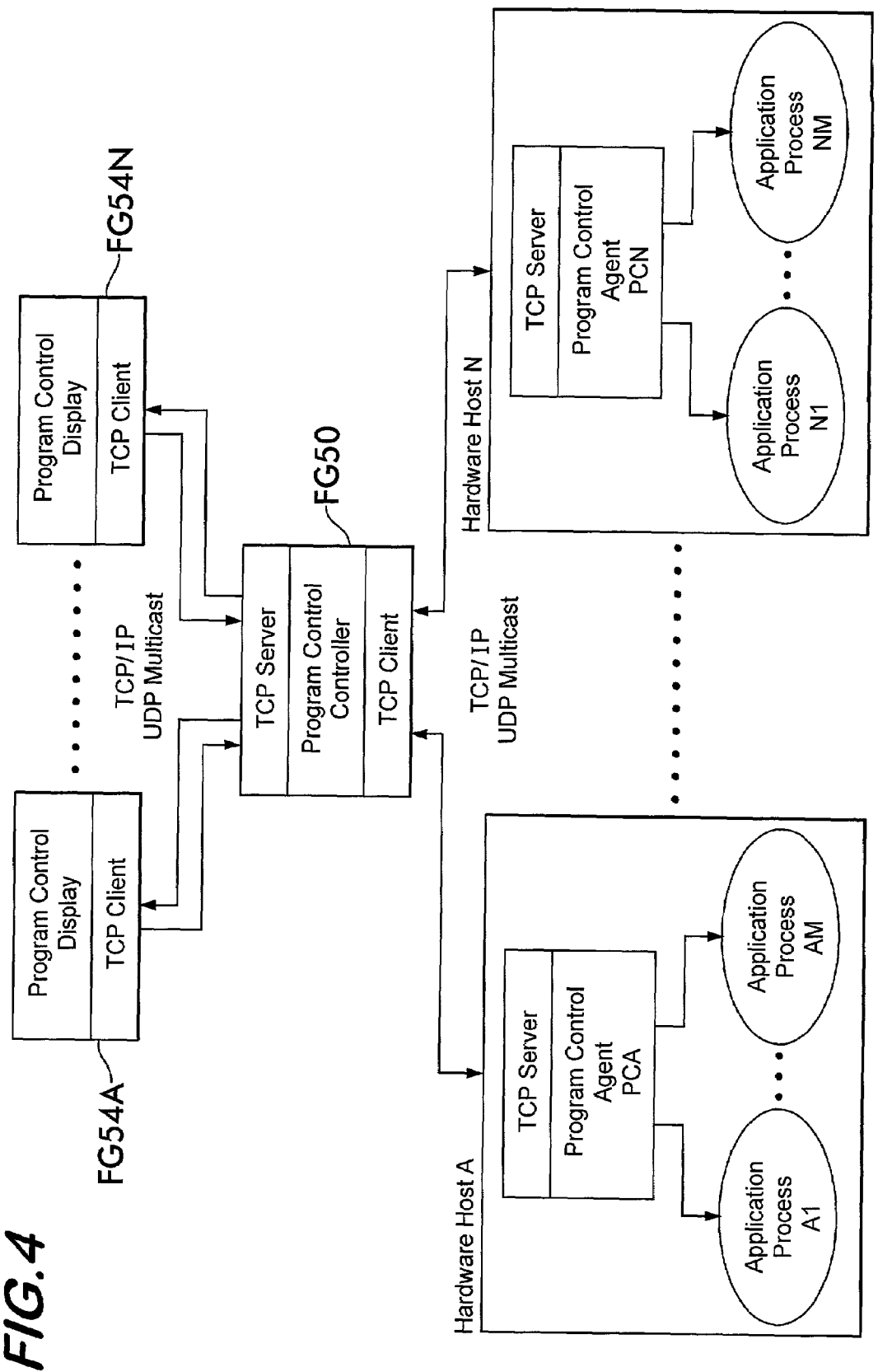
FIG. 4 is a block diagram illustrating one technique for implementing the Resource (Application) Control functional group FG5 in FIGS. 2A, 2B using discrete software components.

A brief description of each function provided by the functional group FG5 is provided below; a detailed discussion of the Resource Control functional group FG5 and associated data flow will be provided in discussing FIG. 4.

1) Program Control Agents FG52A–FG52N: A Program Control agent generally denoted FG52 resides on each of the hosts A–N (i.e., PCA–PCN). Each agent is responsible for providing direct control over application startup and shutdown of applications on its respective host. The agent receives control orders from the Program Control function FG50 and is then responsible for implementing the orders. In an exemplary case, the agents implement the orders via system call mechanisms specific to the particular operating system. In addition, the agent also provides feedback to the Control function FG50 regarding the current status of all applications running on a particular host.

2) Program Control FG50—maintains the application state information for the Program Control functional group FG5. It also serves as the decision-making component of the Program Control functional group. The Control function FG50 receives application control (startup, shutdown, or configuration) requests from the Program Control Displays FG54A–FG54N and from the Resource Management functional group FG4. Using information from the Specification Files FG32, these high-level control function requests are dynamically translated into specific control orders which are sent to the individual Program Control agents FG52A–FG52N. The program Control FG 50 also provides application status and configuration information back to the Resource Manager FG42.

3) Program Control Displays FG54A–FG54N—serve as the GUI for interactive control of distributed applications. The Program Control Displays FG54A–FG54N allow an operator to see and control the status of applications running on each host in the distributed environment. The Program Control Displays FG54A–FG54N also provide the user the ability to determine the status of each of the components of the Program Control architecture. Predefined scenario configurations defined in Program Control Configuration Files FG56 advantageously can be loaded and edited via the Displays. It should be mentioned that new Program Control Configuration Files can also be created and saved via the Displays. As illustrated in FIGS. 2A, 2B, Program Control Displays FG54A–FG54N can be run simultaneously with application status changes being reflected at each display.

4) Configuration Files FG56—contain an ordered set of applications that can be loaded at the Program Control display and then either edited or executed. The Configuration Files can contain both dynamic and static application-to-host mappings. For static application-to-host mappings, an application will, by default, be started on a specified host. For dynamic application-to-host mappings, the application will have a default host to start on but the Resource Manager FG42 will be queried at run-time to determine where the application actually should be placed. The Configuration Files FG56 also contain all information on how to start, stop, and configure an application, with the exception of environment variable settings for the application which are set based on the System Specification Files FG32.

It should be mentioned here that the Program Control functional group employs the application startup and shutdown information defined in the System Specification Files FG32. When an application entry is first created interactively at one of the Program Control Displays FG54A–FG54N, all of the startup and shutdown information for that application, as specified in the System Specification Files FG32, are loaded in as default settings. Once a configuration file entry has been created, all configuration information on the application is read in from the configuration file except for the application environment variable settings which are still set based on the System Specification Files FG32.

As mentioned above, a Program Control agent resides on each host. The agent is responsible for providing direct control over application startup and shutdown. The agent receives control orders from the Control component and is then responsible for implementing the orders. Each of the PC Agents FG52A–FG52N implements application startup and shutdown orders via system call mechanisms specific to the particular operating system of the host. For example, on the Unix platforms, to start an application, the fork( ) and execv( ) function calls are used to create the application. The csh command is executed to start up the applications. Moreover, if the application needs to run in a console, an xterm is configured for the application to run in. In addition, if logging of either stdout or stderr is specified, the proper redirection operators are configured and the output log file is set to "/usr/tmp/<userid>_<appname>_<pid>.log". All environment variables needed by the application are also configured and passed in at the execv( ) call. The current working directory is also set by the chdir( ) command, and the new application is made a process group leader via the setpgid( ) function. Other operating systems invoke applications using different calls.

In order to stop an application on the Unix platforms, if a signal is to be sent to the application, the killpg( ) function is used, or else if a script or command is to be executed to shutdown the application, the csh command is executed (via the system( ) function) specifying the full path and executable name of the command along with any arguments for the command. It should be noted that if the application default shutdown time elapses and the application has not died, the respective one of the Program Control Agents FG52A–FG52N advantageously sends a SIGKILL signal to the application by calling killpg( ).

As illustrated in FIGS. 1A, 1B, the Program Control Agents (PCA–PCN) advantageously can be instantiated on stand-alone hosts A–N. In that case, the Program Control Agents PCA–PCN (FG52A–FG52N in FIGS. 2A, 2B) send heartbeat messages to Program Control FG50 approximately once per second to indicate that they are still "up and running." Moreover, every ten seconds, the Program Control Agents PCA–PCN (FG52A–FG52N) send complete configuration information on all running applications to Program Control FG50. It should be noted that the terminology employed in FIGS. 1A, 1B differs from that in FIGS. 2A, 2B to emphasize the distinction between software instantiated on a host and a function provided by the Resource Management Architecture.

The Program Control function FG50 is the decision-making component of the Program Control functional group FG5. It maintains complete information on everything that is running across all platforms in the distributed environment. The Program Control function FG50 receives input data from PCA–PCN (FG52A–FG52N), the Program Control Displays FG54A–FG54N, the Resource Manager FG42, and the Host Discovery function FG14.

It will be appreciated from the preceding discussion that the Program Control FG50 provides startup and shutdown orders to the Program Control Agents FG52A–FG52N based on operator or Resource Manager-initiated orders. If the Program Control Agents report that an application has terminated abnormally, the Program Control FG50 provides a notification to the Resource Manager FG42, to the Program Control Displays FG54A–FG54N, and to any other component to which it is connected. When the Program Control function FG50 is first brought up, it can be configured to attempt to start Program Control agents on every host defined in the System Specification Files. The Program Control function FG50 will also attempt to start a Program Control Agent on a newly discovered host (discovered via the Host Discovery function FG14) if Host Discovery has been enabled on the Program Controlays FG54A–FG54N.

The Program Control function FG50 also receives periodic heartbeat messages, e.g., once per second, from each of the Program Control Agents FG52A–FG52N, as discussed above. If Fault Detection has been enabled at the Program Control Displays FG54A–FG54N, if three consecutive heartbeat messages from an Agent, e.g., FG52A, are missed, the host that the agent is running on is declared down and all linked functions, including the Resource Manager FG42 and the Displays FG54A–FG54N are notified.

As mentioned above, the Program Control function FG50 sends out periodic application status updates as well as immediate notification when applications are started up, are shutdown, or fail. These notifications are sent out to all linked functions.

It should be noted that the Program Control function FG50 uses the same message traffic and internal processing for handling application startup and shutdown orders received from either the Resource Manager FG42 or from the Program Control Displays FG54A–FG54N. However, if a startup order received from one of the Program Control Displays FG54A–FG54N indicates that the Resource Manager FG42 should determine where to run the application, a request to allocate the application is sent to the Resource Manager FG42. When no response is received from the Resource Manager FG42 within a predetermined timeout period, the Program Control function FG50 will automatically start the application on the default host. Moreover, when an application startup cannot proceed due to an unfulfilled application startup dependency, a request will be made to the Resource Manager FG42 to attempt to resolve the dependency. If the Resource Manager FG42 either cannot resolve the dependency or no response is received within a predetermined timeout period, the application startup will fail, and a "dependency failed" indication will be sent to the Display. It will be appreciated that this will cause the application status to be displayed in, for example, yellow and post an alert to the Alert window on one of the Program Control Displays FG54A–FG54N.

Preferably, Program Control function FG50 also handles simple startup timing dependencies between applications and will reorder a list of applications that were selected to be started simultaneously if doing so will resolve startup order dependencies between the applications. Otherwise, the Program Control function FG50 sends a request to the Resource Manager to attempt to resolve the dependencies.

Figure 5A:
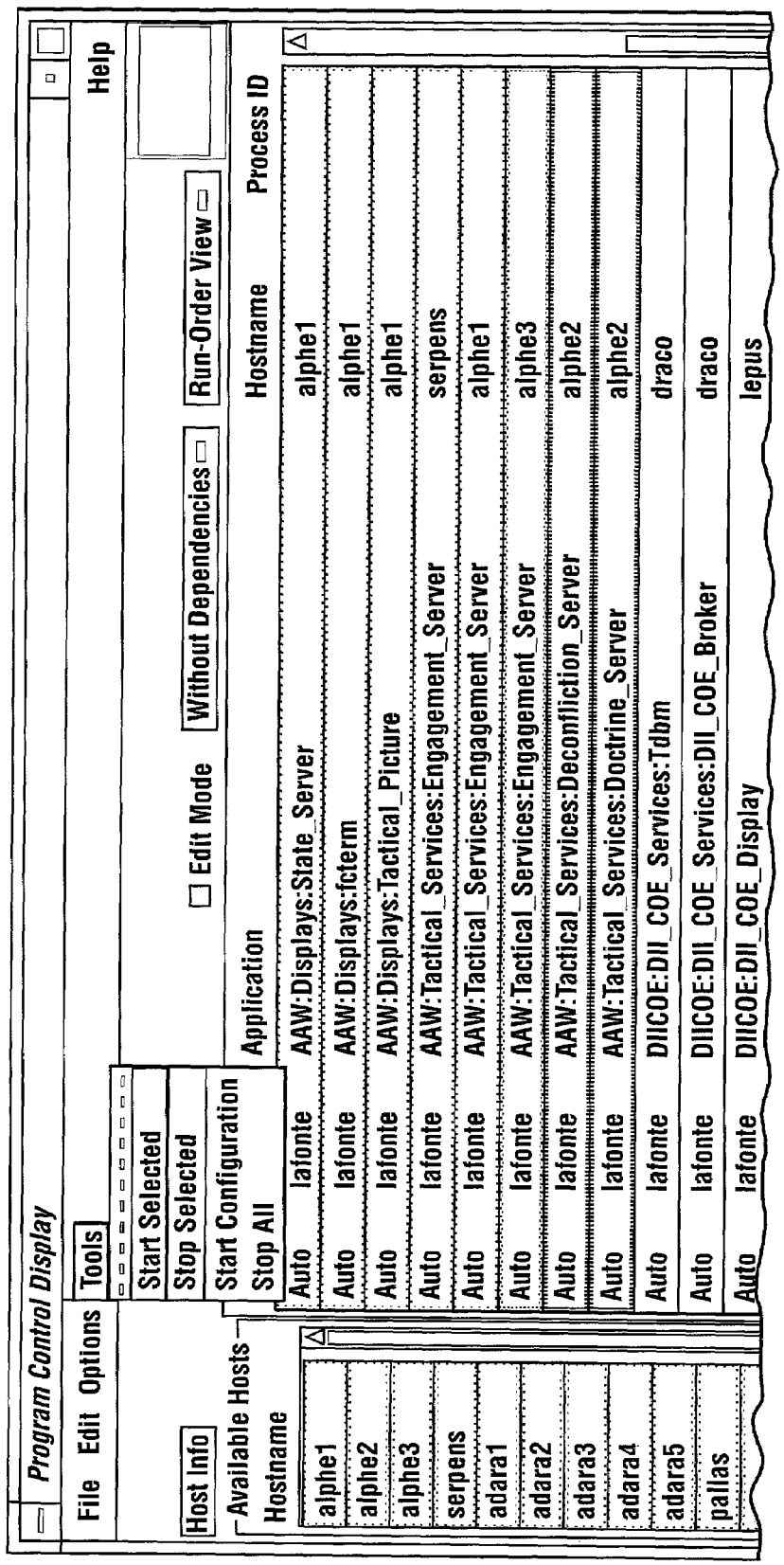
FIGS. 5A, 5B represent a screen capture of a program control display FG54 generated by the software components illustrated in FIG. 4.
Figure 5B:
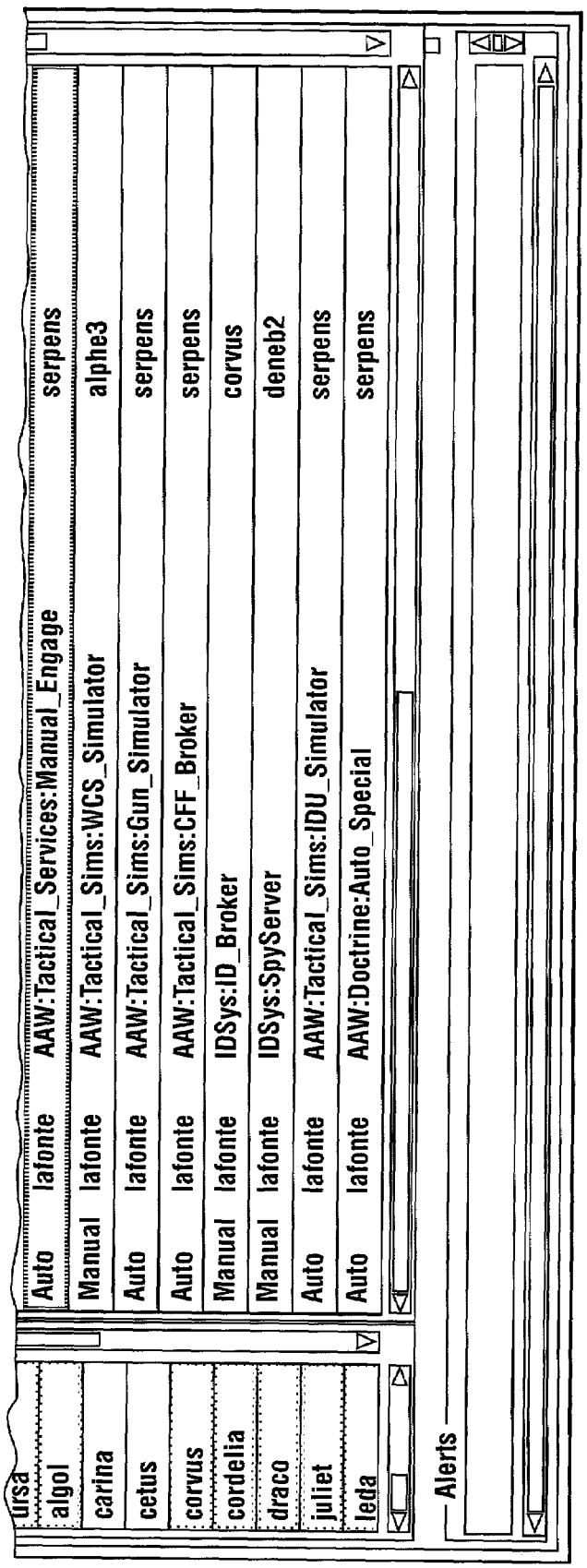

The Program Control Display serves as the operator console for controlling the distributed environment. From the Display, shown in FIGS. 5A, 5B, the operator can:

1) see the status and configuration of currently executing applications A1–NM;
2) see the status of Program Control Agents PCA–PCN on each host A–N;

3) see and browse the application system structure defined in the System Specification Files FG32;
4) load configuration files FG56
5) save configuration files FG56
6) edit the configuration of applications that are not currently running;
7) create new application entries by dragging an application, application system, or application subsystem icon onto the application status area;
8) manually start specific applications;
9) manually stop specific applications;
10) manually start all applications that have the "Start All" flag set;
11) manually stop all applications;
12) turn host fault detection on or off(if on, loss of 3 consecutive heartbeats from a Program Control Agent will result in declaring the host down); and
13) turn host discovery on or off (if on, a new host message from the Host Discovery component will result in attempting to start up a Program Control Agent on the new host).

It will be appreciated from FIGS. 2A, 2B that multiple Program Control Displays FG54A–FG54N advantageously can be run simultaneously. If this is done, any configuration change actions will be reflected on all the displays. Whenever application stop or start actions are taken by the display operator, a message is sent to the Program Control function FG50 which is responsible for enacting the start or stop action. The Program Control function FG50 also sends indications of any status changes to the Program Control Displays FG54A–FG54N as soon as the status changes are seen. In addition, periodic status updates are also sent to the Program Control Displays FG54A–FG54N.

The Program Control Configuration Files are text files that are read in by the Program Control Display when the operator wishes to load a new application configuration. A Configuration File is an ASCII file containing a list of applications. The format of an entry in a Configuration File is shown in Table 1 below.

TABLE 1

| Application | TACFIRE:tacfire |
|---|---|
| Host | electra1 |
| Display | umbriell:0.0 |
| Auto_Start | 0 |
| RM_Start | 0 |
| Console | 1 |
| Time_Delay | 1 |
| StartupDir | "$ENV_SIM_VERSION/TACFIREprocessor" |
| StartupExe | "$ENV_SIM_VERSION/TACFIREprocessor/tacfire" |
| StartupArgs | "-disport $DIS_PORT_NUM -cffhost % (HOSTNAME, AAW:Tactical_Sims:CFF_Broker)" |
| ShutdownExe | SIGINT |
| LogType | STDOUT |
| LogDir | "/usr/tmp" |

The Configuration file advantageously can include the following fields:
1) The Application field, which identifies the full application name as defined in the System Spec. Files FG32 (i.e., System:Subsystem:Application).
2) The Host field, which is the desired or default host that this application should be started on.
3) The Display field, which is an optional field used when graphical display output from an application needs to be rerouted to a display on a different host.
4) The Auto_Start flag, which identifies whether the application is to be started automatically if the "Start All" action is selected by the operator from the Program Control Display. (If the flag were set to "1", then the application would be started. If the flag were set to "0," it would not be started.)
5) The RM_Start flag, which identifies whether the Resource Manager should be queried at run-time to determine what host the application should be started on. The valid values are "0" for "NO" and "1" for "YES".
6) The Console flag, which identifies whether the application needs to be started in an Xterm window. The valid values are 0 for "NO" and 1 for "YES".
7) The Time_Delay field, which identifies how many seconds to wait after the previous application has been started before starting this application.
8) The StartupDir field, which identifies the current working directory that is to be set prior to starting up the application. This directory is usually the same as the directory where the executable for the application resides but does not have to be. As this example shows, environment variables may be used in the path.
9) The StartupExe field identifies the entire path and name of the application executable.
10) The StartupArgs field, which contains all the argument values needed for this particular application. As this example indicates, the argument values can be dynamically set at run time if needed. Environment variables may also be used within the argument list. In this example, the % (UNIQUE, 1, 40, Isis) argument would yield a number from 1 to 40 which is unique within a context named "Isis". Another resolution of % (UNIQUE, 1, 40, Isis) would yield a different number.
11) The Shutd wnExe field, which identifies which signal defined within the application that program control is to use to shutdown this application. Some examples would be SIGINT, SIGTERM, or SIGKILL. A shutdown script can also be used to shutdown the application. (In that case, there would be ShutdownDir, ShutdownExe, and ShutdownArgs fields listed. The usage for the shutdown fields would be used exactly the same as the startup fields.)
12) The LogType field, which identifies which outputs are to be written to the specified log file. The valid values are STDOUT, STDERR, and LOG_ALL. STDOUT is the normal output of the application (stdout). STDERR is the error output of the application (stderr). LOG_ALL writes both stdout and stderr outputs to the file.
13) The LogDir indicates the directory where the log file will be written. Again, environment variables may be used here. The log file name will be "<userid>_<appname>_<pid>.log" where <appname> is the full application name as specified in the Application field, <userid> is the userid of the current user under which the program control application is running, and <pid> is the system assigned process id of the application being executed.

FG6—Display Functional Group

A number of displays which show system configuration data and instrumentation data in near real-time are included as part of the Resource Management Architecture. These displays support operator and user monitoring of the operation of the distributed environment including host and network statuses and performance, application system statuses and performance, as well as the status and performance of the other Resource Management architecture functions.

Most of the displays use OpenGL and Motif, the latter being built with ICS's Builder Xcessory toolkit, and run on Silicon Graphics (SGI) platforms in an exemplary case. Several of the displays can also run on the Sun Solaris platforms. The displays that make up the display functional group FG6 include:

1) Host Displays FG62A–FG62N. Show layout of hosts along with host status, network connectivity, and process statuses.
2) Path Display FG64. Shows the status of applications in key end-to-end data flow paths along with performance and load graphs.
3) Resource Management Decision Review Display FG68. Shows a summary of allocation decisions made by the Resource Management system along with timing information and host fitness scores.
4) Graph Tool Instrumentation Displays FG69A–FG69N. Provides a user-configurable set of display widgets used for run-time monitoring of instrumented status and performance information.
5) System Readiness Display FG66. Shows the status of each hardware and software system, subsystem, and application defined in the System Specification Files and allow the operator to interactively change system and subsystem priorities.

Figure 6B:
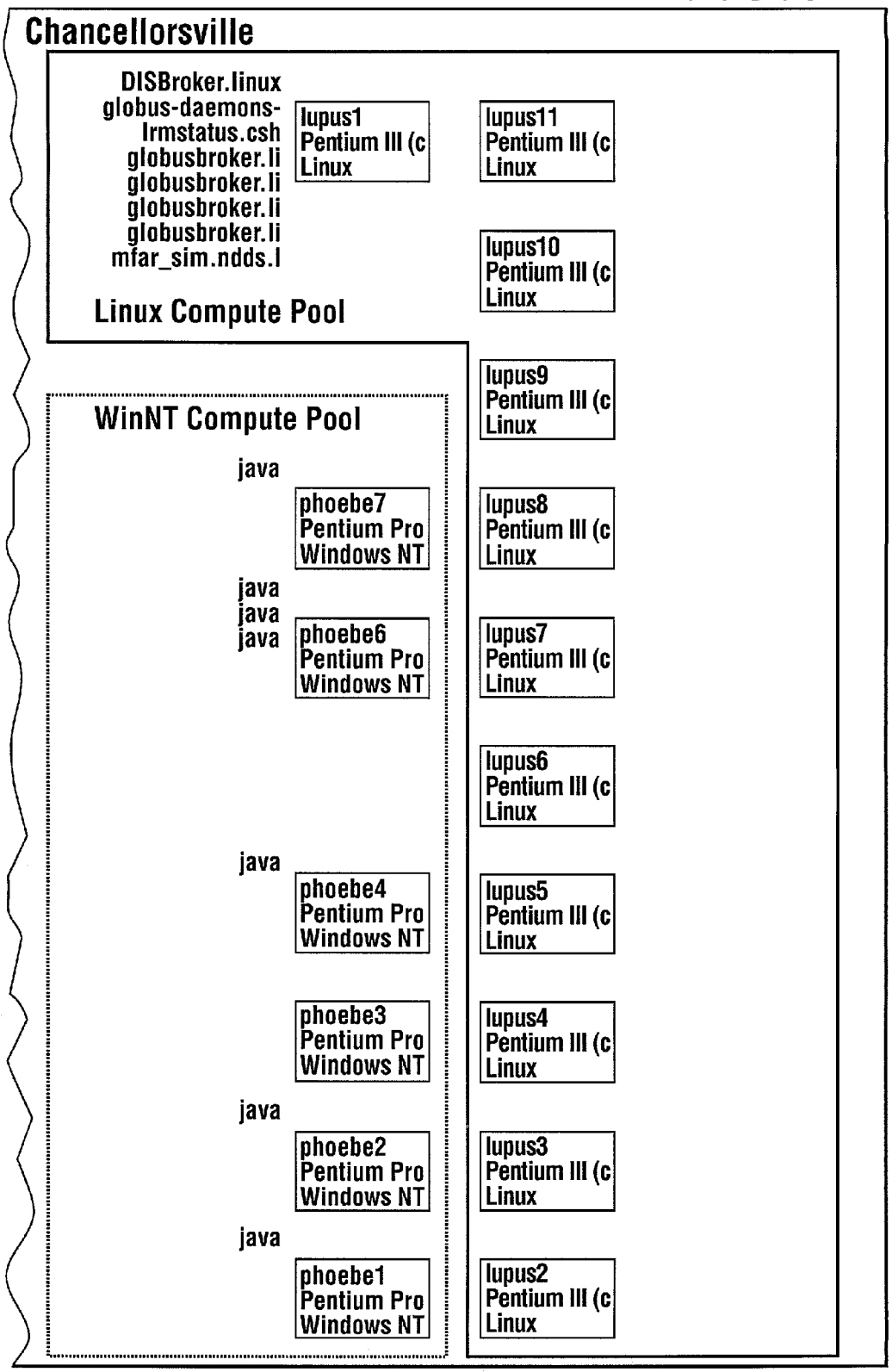
Figure 7B:
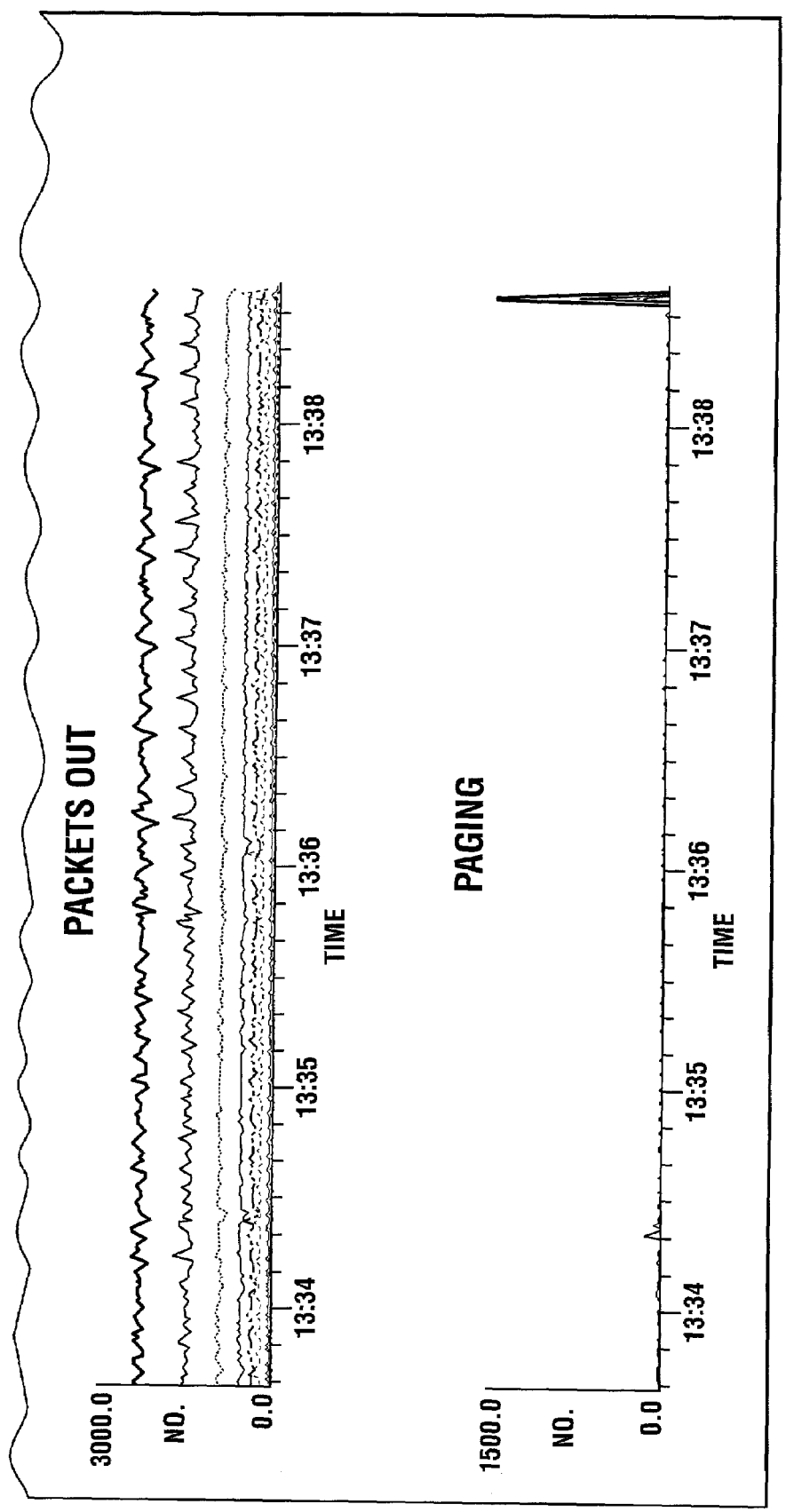

FIGS. 6A, 6B represent a screen capture of an exemplary one of the Host Displays FG62A–FG62N, which provide graphical representations of various sets of the hosts A–N in the distributed environment. The Host Displays show the status of each host, host network connectivity, and the status of interesting processes running on the hosts. The Host Display operator can also select hosts shown on the Host Display and bring up real-time graphs of system performance for the selected hosts including CPU utilization, memory utilization, network packets in, network packets out, and paging activity. A screen capture of host specific performance information is provided in FIGS. 7A, 7B.

Figure 8A:
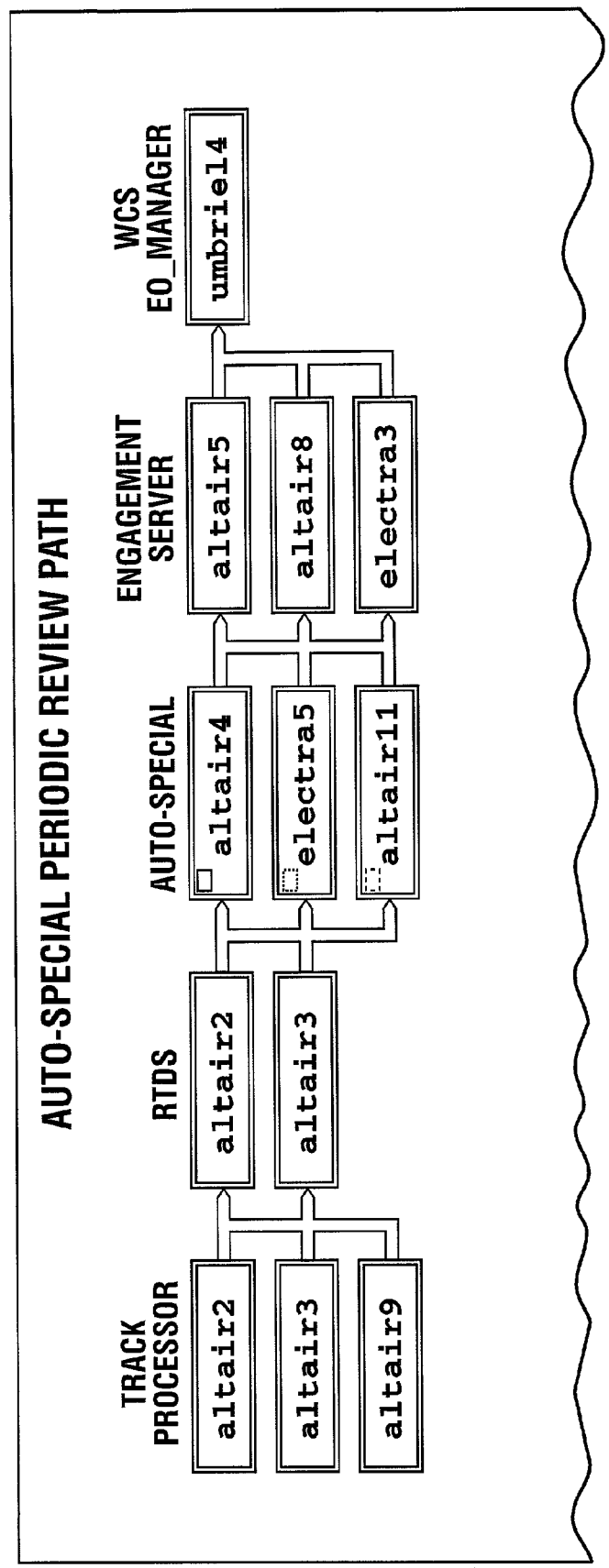
FIGS. 8A, 8B represent a screen capture of a path display generated by the Resource Management Architecture according to the present invention.
Figure 8B:
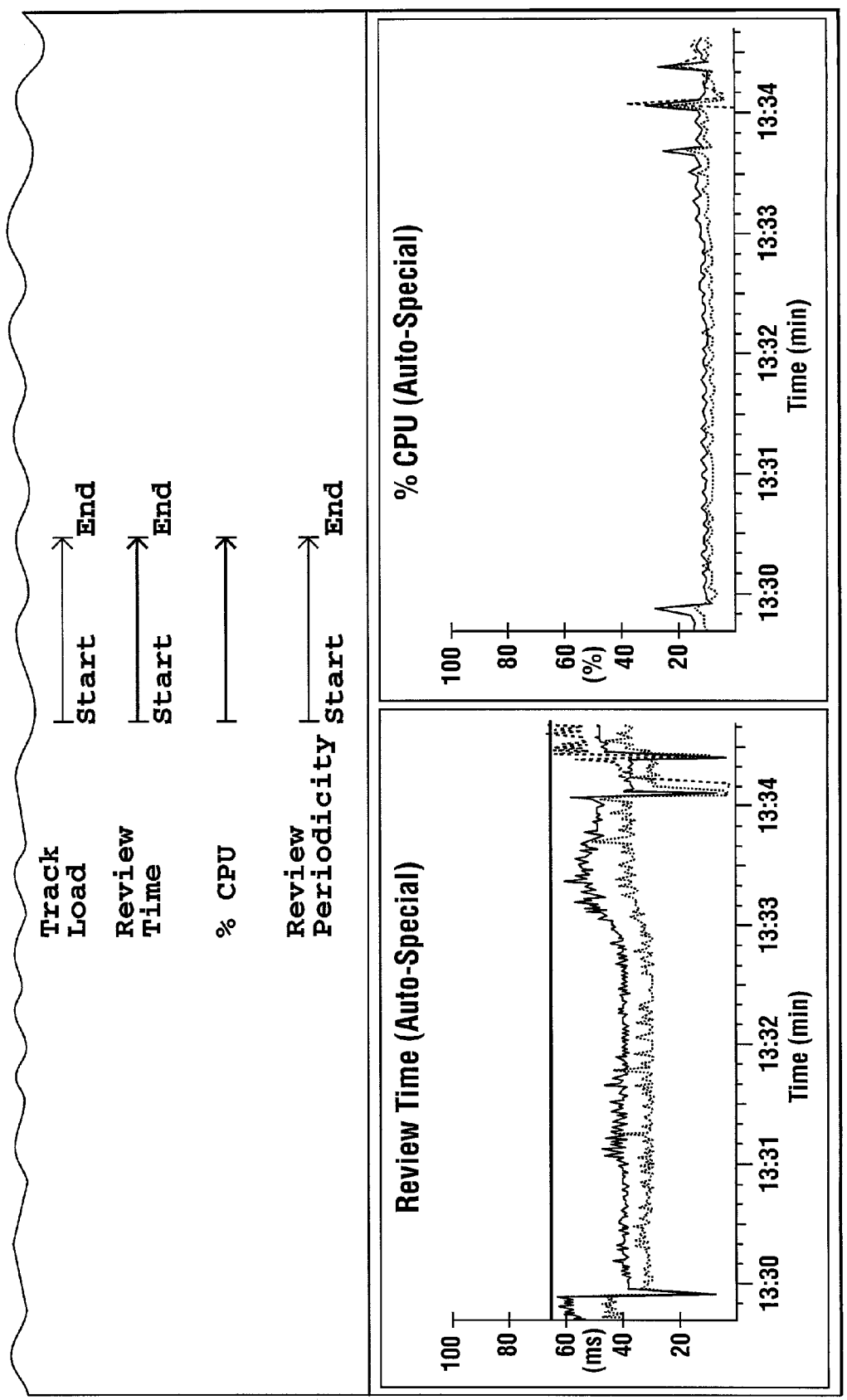

FIGS. 8A, 8B represent a screen capture of a representative Path Display FG64, generated by the Resource Management architecture, which shows the status of key system data flow paths consisting of multiple application stages. The number of copies of each application in the path is shown labeled with the host on which the application is running. In addition, it should be mentioned that as many as three real-time graphs can be produced to depict run-time performance and load metrics related to the applications in the selected data path.

Figure 9A:
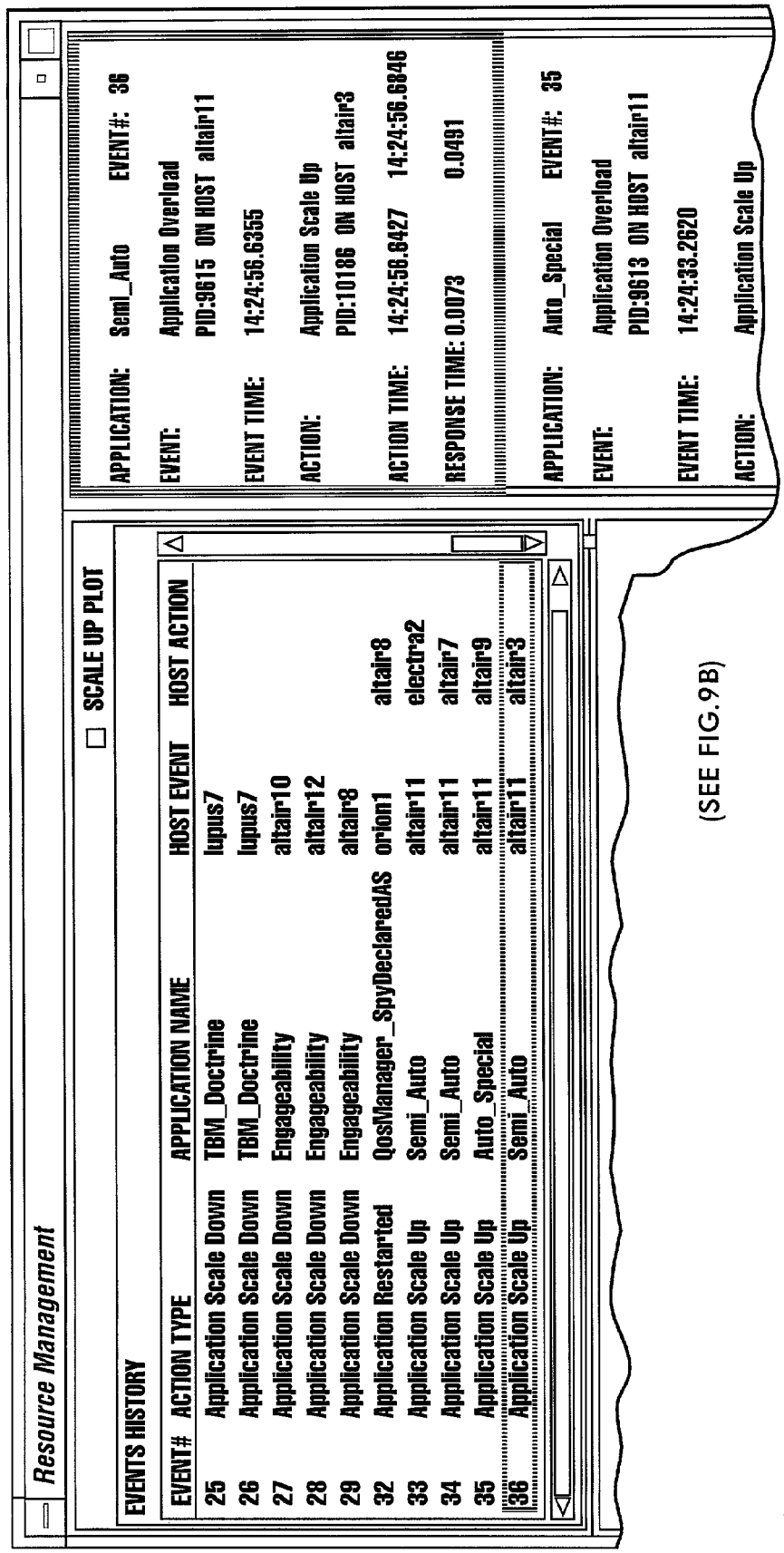
FIGS. 9A, 9B represent a screen capture of the Resource Management Decision Review Display, which provides a summary of allocation and reallocation actions taken by the Resource Manager.
Figure 9B:
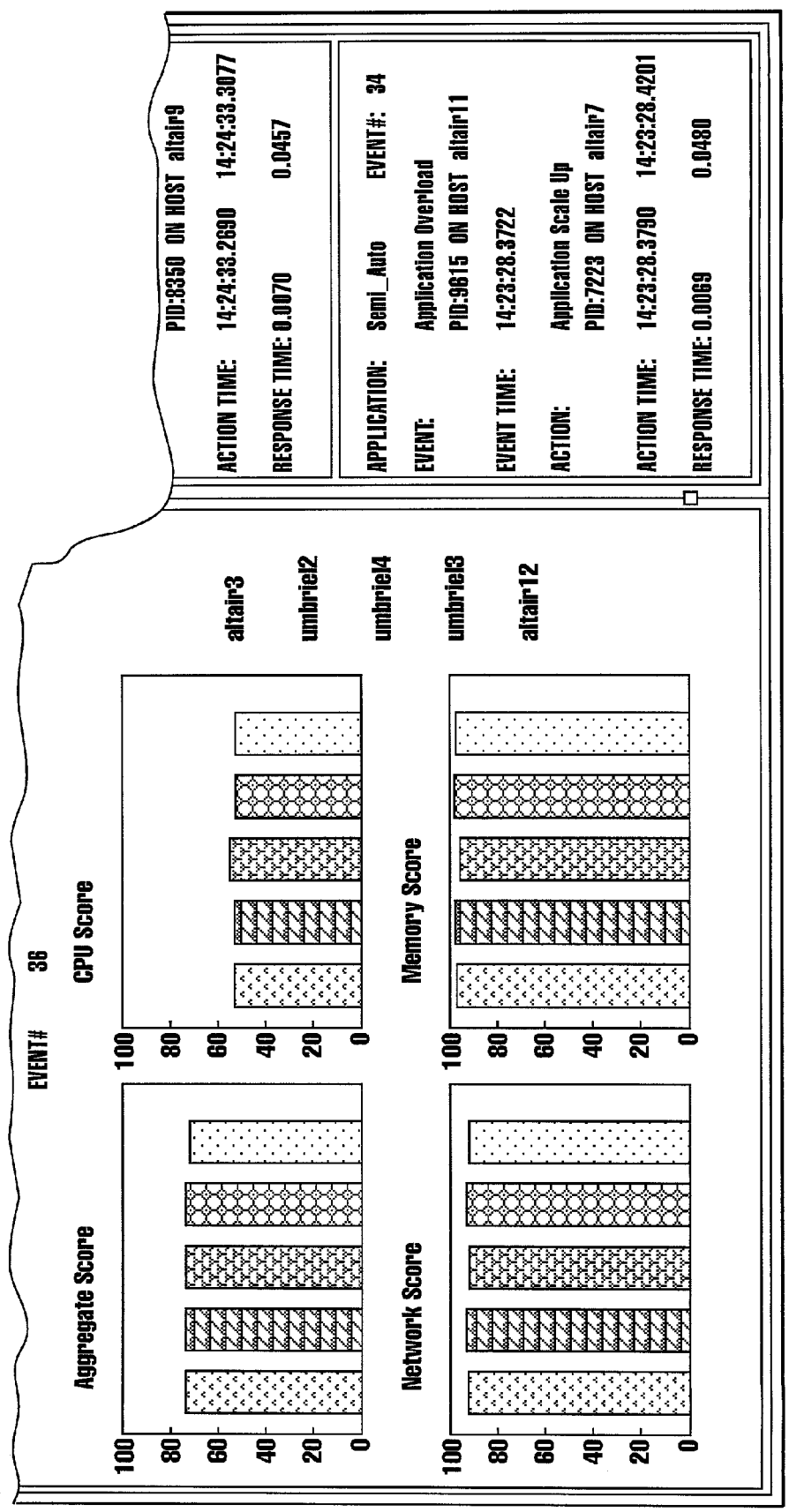
Figure 10A:
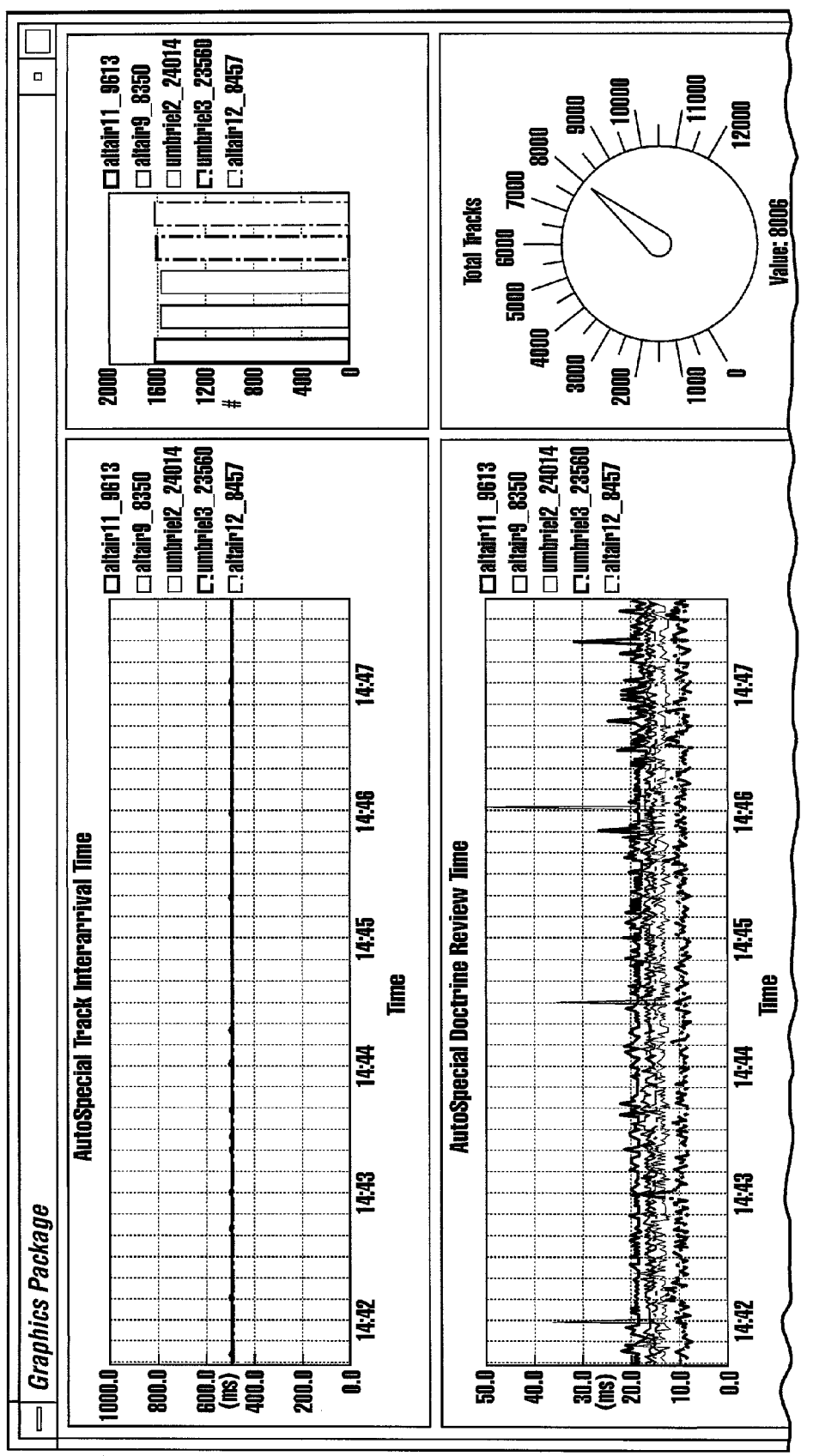
FIGS. 10A, 10B and 11A, 11B represent screen captures illustrating alternative, user-configurable displays generated from received data via standardized message formats and open interfaces.
Figure 10B:
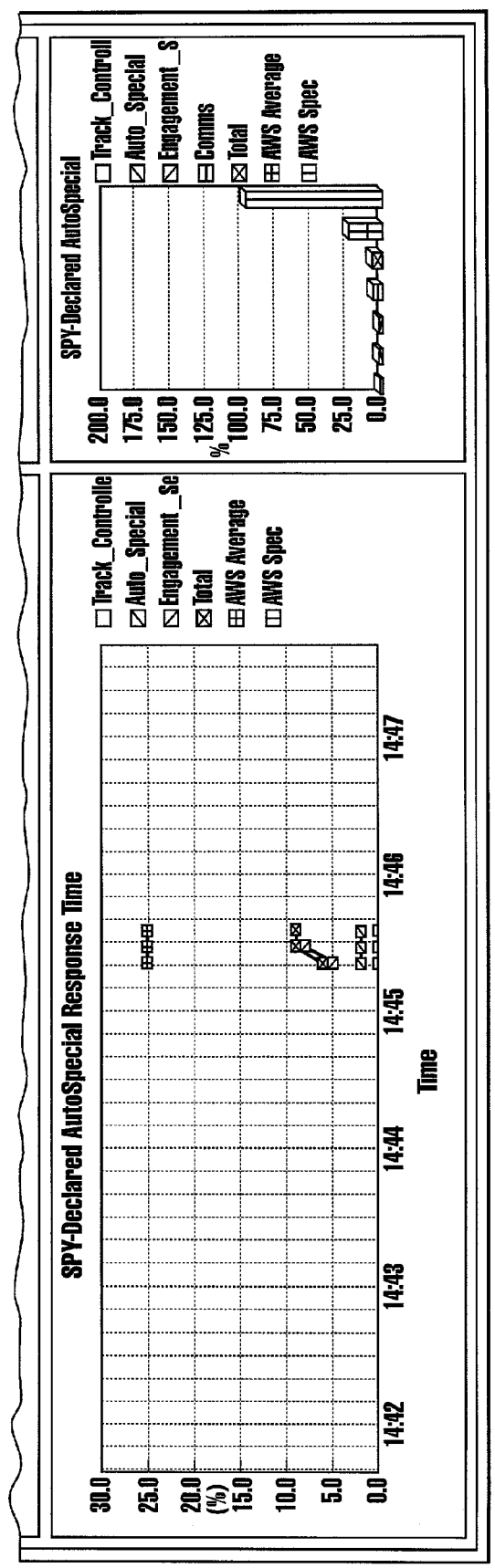
Figure 11A:
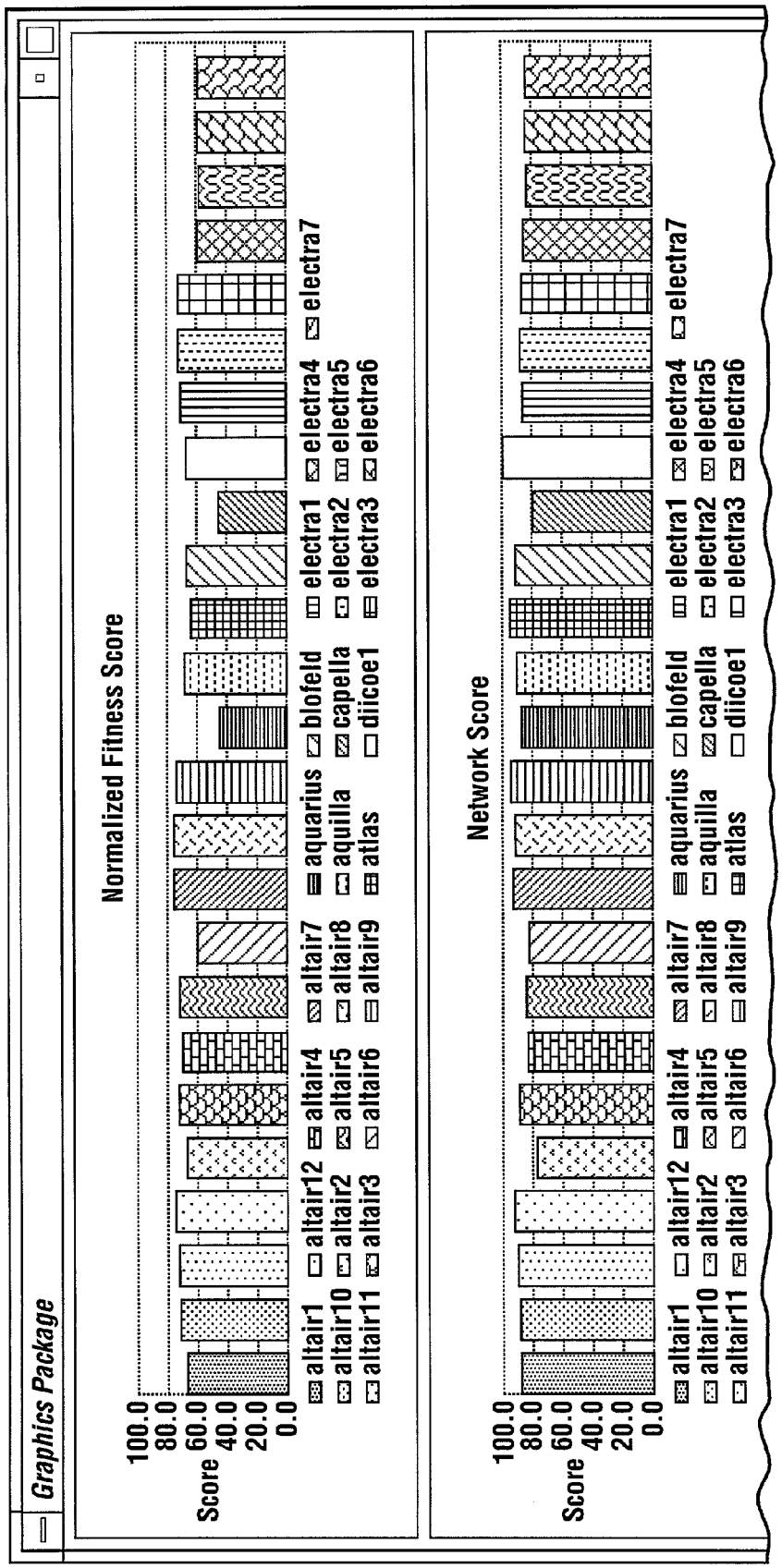
Figure 11B:
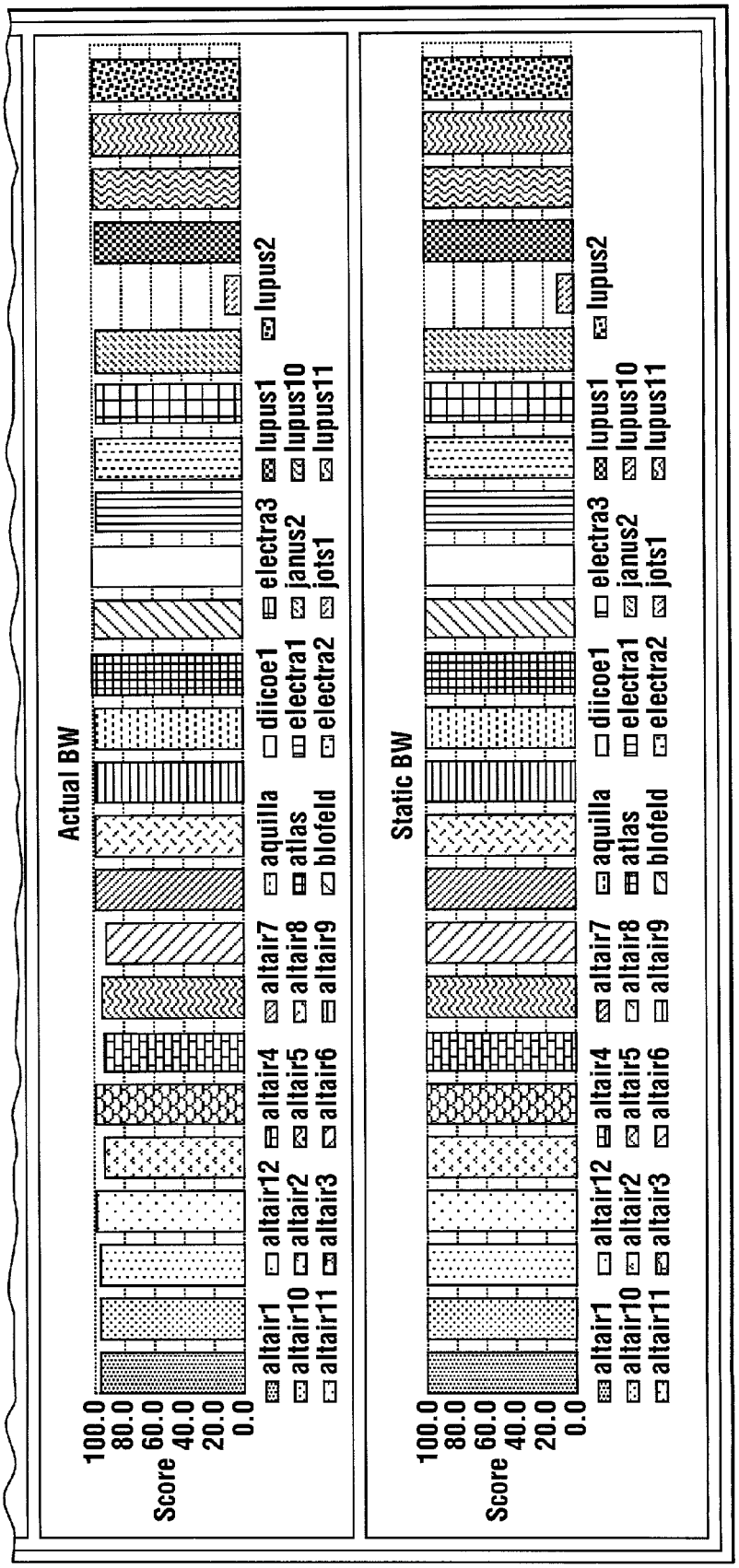

FIGS. 9A, 9B represent a screen capture of the Resource Management Decision Review Display FG68, which advantageously can provide a summary of allocation and reallocation actions taken by the Resource Manager FG42. For each action, timing information regarding how long it took the Resource Management functions, e.g., the Resource Manager FG42 and the Program Controller FG50, to both arrive at a decision and to enact the decided action are shown along with host fitness scores that were used in arriving at the allocation decision.

FIGS. 10A, 10B and 11A, 11B are screen captures of the Graph Tool Instrumentation Displays FG69A–FG69N, which depict user-configurable displays capable of receiving data via standardized message formats and open interfaces. The Graph Tool Displays FG69A–FG69N allow the operator to select and configure various display widgets (line graphs, bar charts, pie charts, meters, and text boxes) to build a desired display layout. Data sources for driving the widgets can also be selected interactively.

Figure 12A:
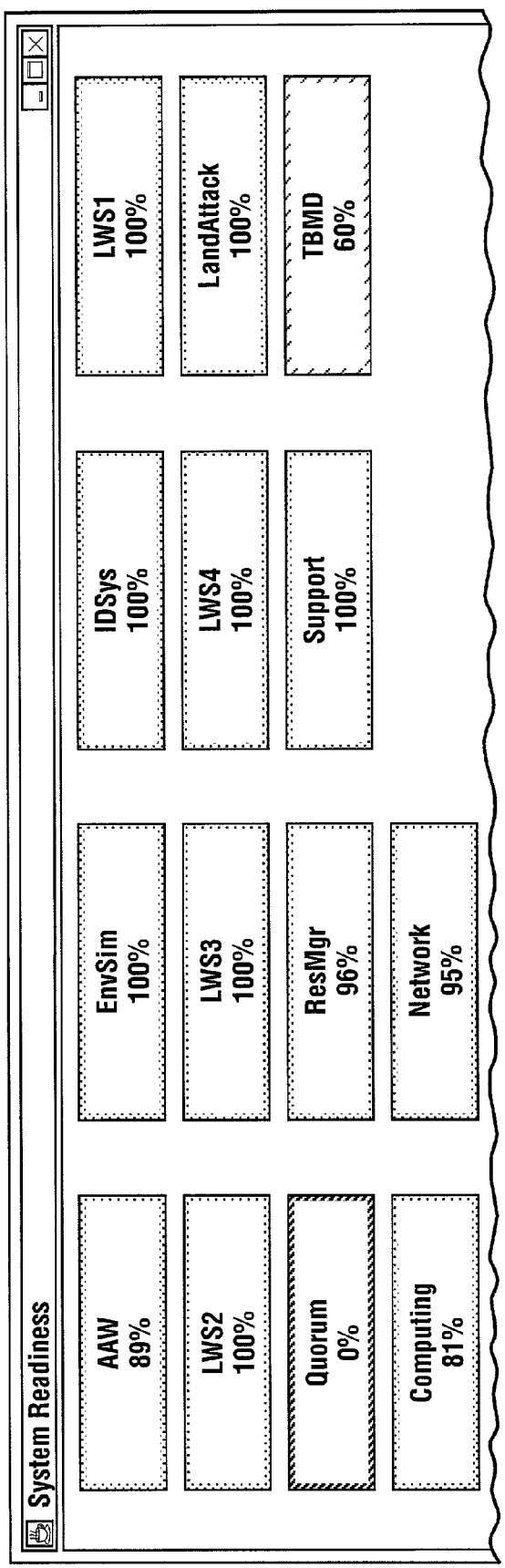
FIGS. 12A, 12B represent a screen capture of an exemplary version of the Readiness Display FG66 according to the present invention.
Figure 12B:
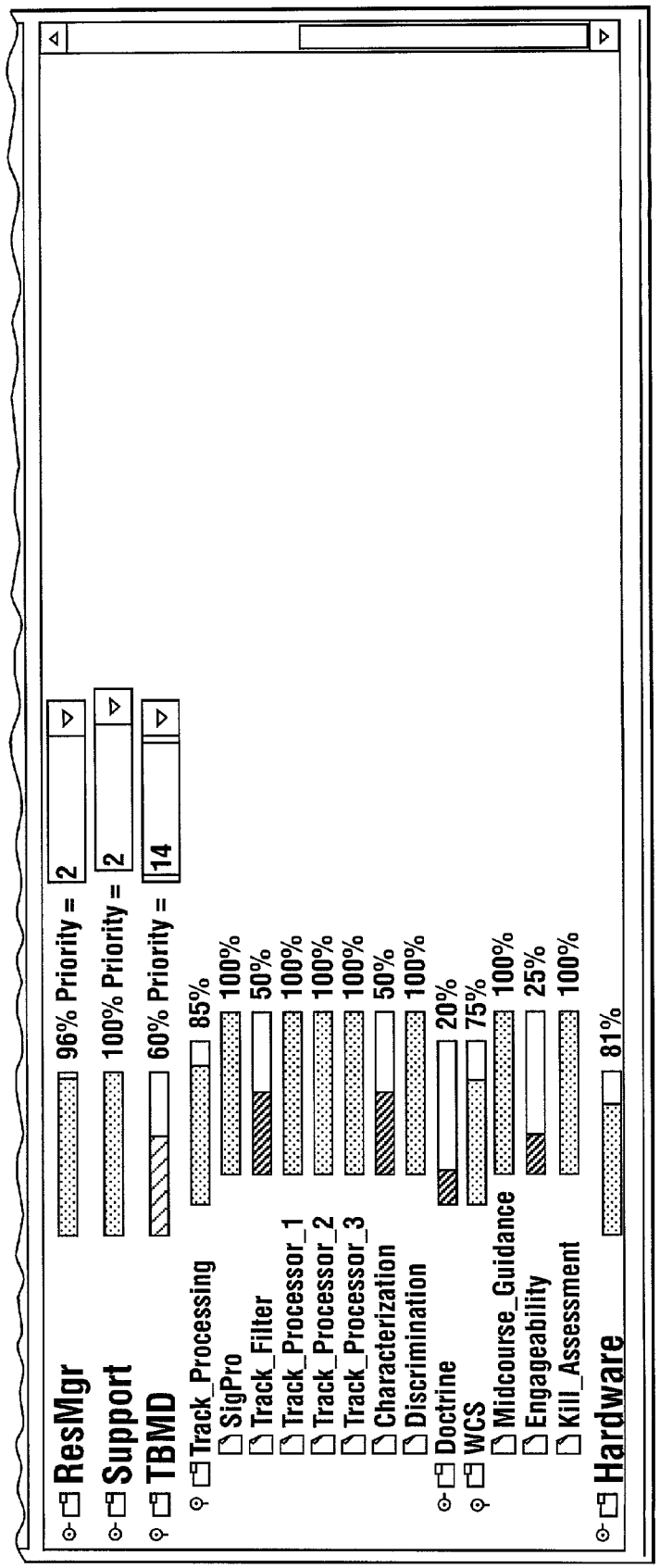

FIGS. 12A, 12B represent a screen capture of the System Readiness Display FG66, which advantageously can be a Java™ display with a CORBA™ interface. The display FG66 shows the status of each hardware system, host, application system, application subsystem, and application defined in the System Specification Files. The top portion of the display shows a summary status for each defined application system. It should be noted that the display operator can also change system and subsystem priorities and send the changed priorities to the Resource Manager function FG42.

As mentioned above, the RMComms middleware package provides object-oriented client-server services for message communication between distributed applications and function modules. The middleware provides location transparency and automatic socket connections and reconnections between client and server applications. These services advantageously can be accessed through an object-oriented API which allows client and server objects to be easily created and exchange user-defined message data. The abstraction provided by the API allows the user to quickly and easily create distributed applications without needing to be aware of the details of the underlying network mechanisms. The RMComms middleware provides the following functions:

provides location transparency between clients and servers
provides a simple powerful object-oriented client-server API
supports reliable transport of user-defined message data based on Berkeley sockets
    uses TCP for message transport
    uses UDP multicast for identification of new clients or servers
    servers identified by unique assigned UDP/TCP port numbers
provides general purpose callback function registration capabilities
    user-specified message callback functions invoked when specified messages arrive
    user-specified connection status callback function invoked when new client-server connections are established or existing connections are broken
support for multi-threading
    supports both polled and asynchronous I/O
    thread-safe
provides automatic connections between clients and servers
    supports multiple client and server connections within the same application
    provides automatic connections to new clients/new servers
    supports simultaneous many-to-many client-server connections
no separate "naming service" or "application registration" components
provides automatic client-server connection fault detection and recovery
    provides fault detection mechanisms based on timeouts and broken connections
    supports fault recovery via automatic reconnections between clients and servers
provides basic support for data marshalling between machine architectures
    byte-swapping
    explicit message data type specification
    all message data sent out using network byte order provides basic capabilities for reading the system clock and performing time conversions allows registration of user-defined signal (interrupt) handler functions layered object-oriented design and implementation cross-platform support:
SGI IRIX 6.3/6.4/6.5
Sun Solaris 2.5.1/2.6/2.7/0.2.8
HP HP-UX 10.20
Linux 2.1/2.2
Windows NT 4.0
Windows 95/98/2000
Solarisx86 2.7

C++ language support using native and GNU compilers

The RMComms middleware is implemented as a shareable object-oriented C++ library. The library provides four primary object classes, which are detailed in Attached Appendix C. It will be appreciated that the applications link with this library and can then instantiate client and server objects for communicating with other local or remote applications. It should be mentioned that the application source code must also include a set of header files that allow connections between client and server objects, where each server type is assigned a server port number. For clients and servers that want to communicate, both the client and the server objects are created specifying the same server port number. Multiple servers of the same type can also be created, which all use the same server port number. This advantageously provides the ability for many-to-many client-server connections to be established, as illustrated in FIG. 4. Control of which servers the clients actually connect to is handled on the client side; clients can specify whether they wish to establish connections with all servers in the distributed environment, with a particular set of servers, or with all servers running on a particular set of hosts.

The operation of the Resource Management Architecture will now be described while referring to FIGS. 13A–13C, which illustrate various operations in the distributed environment. More specifically, the Resource Management Architecture of the system illustrated in FIG. 13A includes hosts A–N, where host A provides a video source server application A-1, host B provides a video distribution application B-1, a contract application B-2, and a host load monitor B-3, and host C provides a display broker application C-1 applying video signals to a display driver C-2. It will be appreciated that host D is idle and that the connections between the various hosts constitute the network 100'. In addition, the Resource Management Architecture of FIG. 13A instantiates various functions, e.g., an instrumentation broker FG26', a QoS manager FG44', a resource manager FG42' and a program control FG50'. The instrumentation broker FG26' receives data from each of the applications running in the distributed environment, although only the lines of communication between the applications running on host B are actually depicted. From the discussion above, it will be appreciated that each of the applications is linked to an Instrumentation API.

Figure 13B:
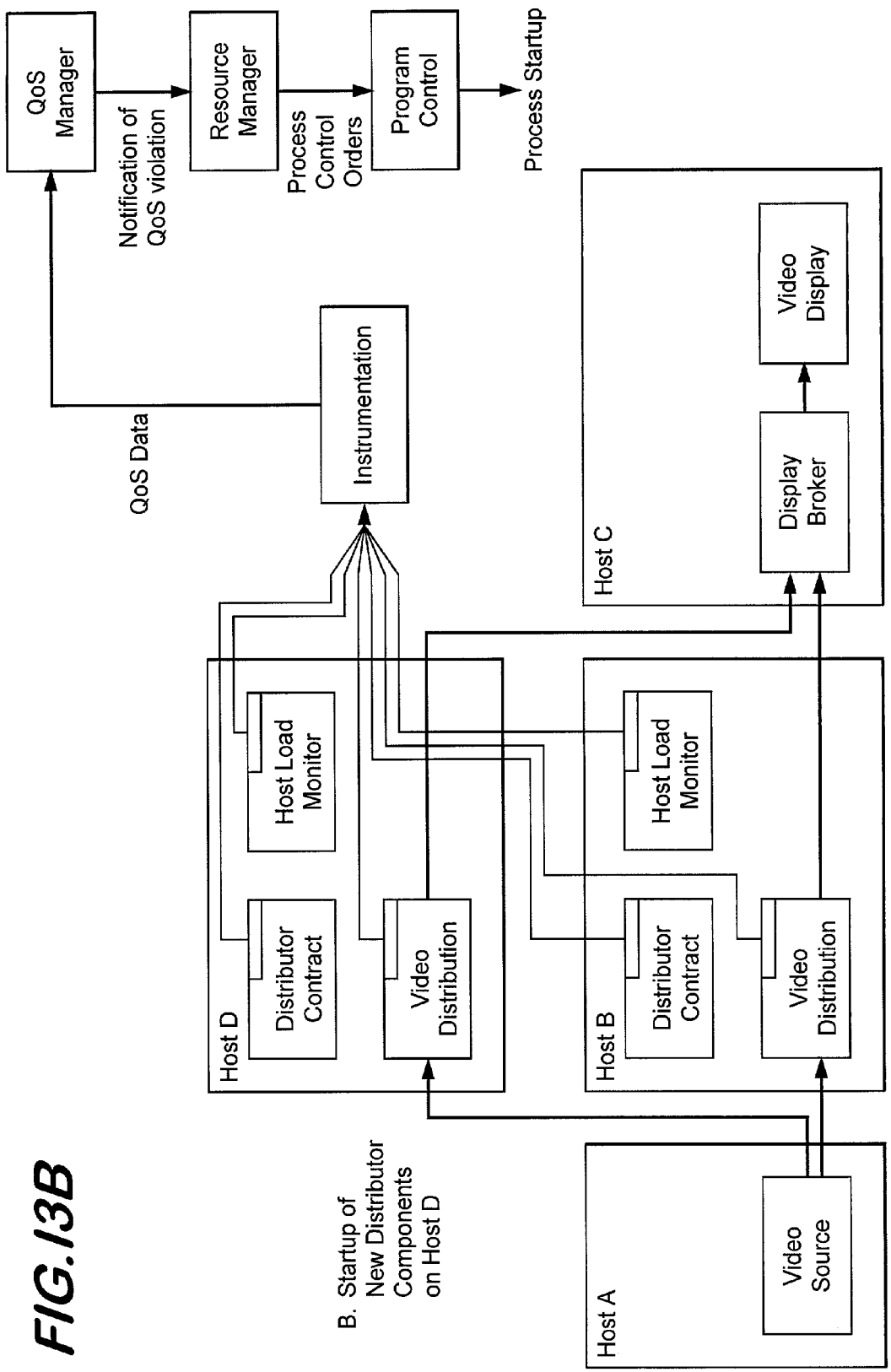
Figure 13C:
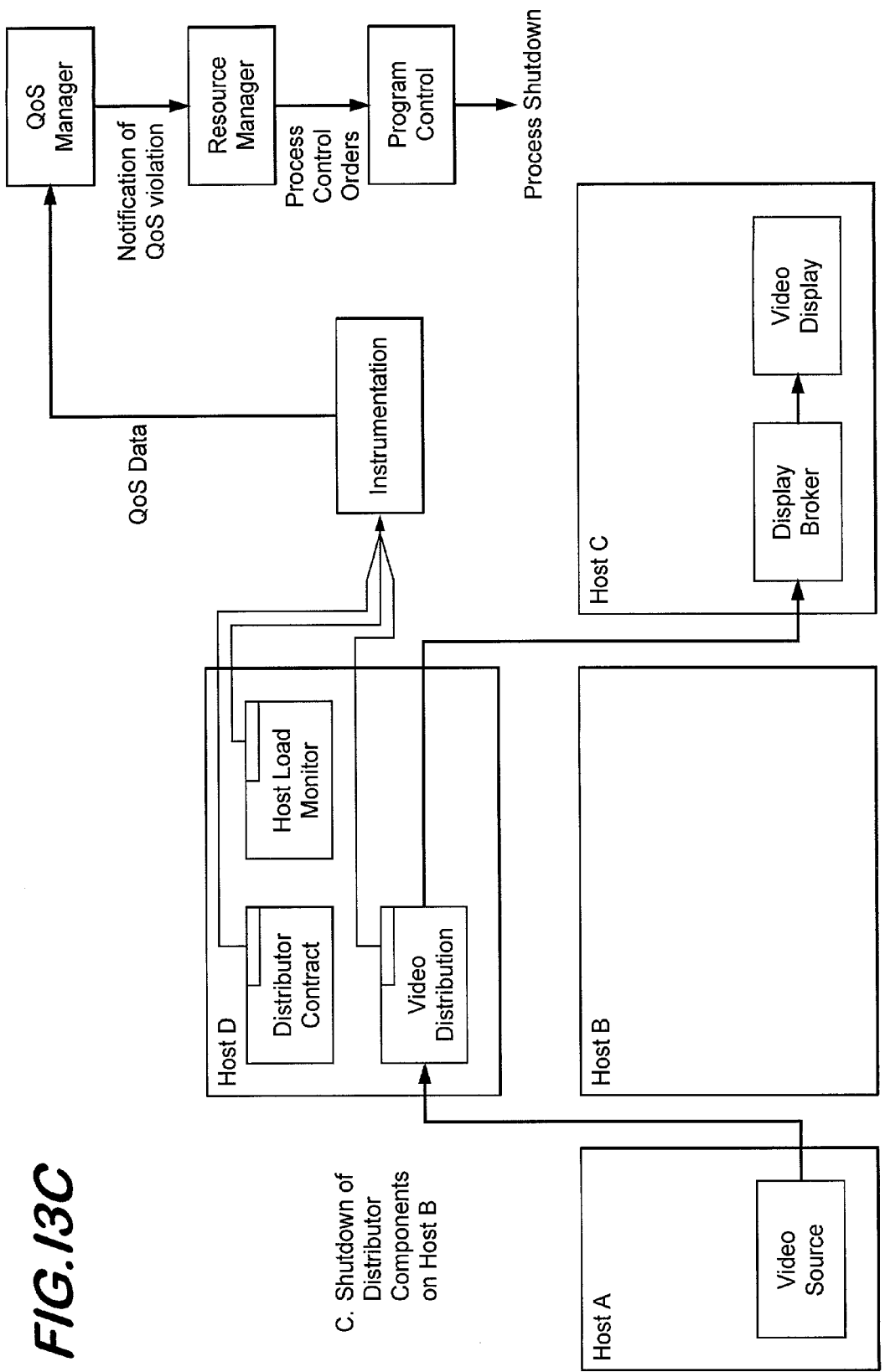

Referring now to FIG. 13B, a QoS violation and its consequences is depicted. In particular, the Instrumentation broker FG26' provides data to the QoS manager FG44' which is indicative of a QoS violation. The QoS manager FG44' notifies the resource manager FG42' of the violation; the resource manager determines that duplicate copies of the applications running on host B are required and that these copies should be placed on host D. The resource manager FG42' transmits instructions to the Program Control function FG50', which starts copies of the running applications, i.e., a video distribution application D-1, a contract application D-2, and a host load monitor D-3, on host D. FIG. 13C illustrates shutdown of the application copies running on host B. It will be appreciated that this shutdown may be initiated responsive to the original QoS violation, another QoS violation, or a query from the user.

Having discussed the various functions and features of the Resource Management Architecture in gross, selected functions and features will now be described in detail. It will be appreciated that the discussion of the various functions will be signaled using the designations established with respect to FIGS. 2A, 2B.

FG42—Resource Manager Function

As mentioned above, the Resource Manager FG42 is the primary decision-making component of the Resource Management functional group. It is responsible for:

(1) responding to application and host failures by determining if and what recovery actions should be taken;

(2) determining if and where to place new copies of scalable applications or which scalable applications should be shutdown when the QoS Managers indicate that scale-up or scale-down actions should be taken based on measured application performance:

(3) determining where new applications should be placed when requested to do so by Program Control: and (4) determining which and how many applications should run based on application system (mission) priorities.

In order to accomplish these tasks, the Resource Manager FG42 maintains a global view of the state of the entire distributed environment including status information on all hosts, networks, and applications. In addition, the Resource Manager FG42 also calculates software and hardware readiness metrics and reports these readiness values for display purposes.

The Resource Manager FG42 is an object-oriented multi-threaded application written in C++, which uses the RMComms middleware for all external communication. The Resource Manager FG42 communicates with the various software components instantiating the (1) Program Control FG50, 2) Hardware Broker FG40, 3) QoS Managers FG44A–FG44N, 4) QoS Specification Control FG29, 5) Readiness Broker in Readiness Display FG66, 6) Globus Broker (not shown), and 7) RM Decision Review Displays FG68A–FG68N.

It will be appreciated that the Resource Manager FG42 receives status and failure information about hosts and networks from the Host and Network Monitoring functional group FG1, and applications from the Program Control functional group FG5. This information includes periodic status updates as well as immediate updates when statuses change, e.g., when a new host is detected or an application fails. In the case of any application shutdown, information as to whether the applications were intentionally shutdown or whether the application actually failed advantageously can be provided. The Program Control function FG50 also issues requests to the Resource Manager FG42 whenever new applications need to be dynamically allocated and whenever the Program Control function FG50 determines that the Resource Manager FG42 needs to assess and attempt to resolve inter-application dependencies (e.g., one application which needs to be running prior to starting up another application).

The Resource Manager FG42 responds to applications faults and host failures by determining whether the failed applications can and should be restarted and attempting to determine where (and if) there are hosts available that the application can run on. When a decision is made by the Resource Manager FG42, a message is sent to Program Control function FG50 specifying what application to start and where to put it. The same general mechanism is used when the Program Control function requests that the Resource Manager FG42 determine where to start new applications and/or how to resolve inter-application dependencies; the Resource Manager FG42 responds with orders indicating what applications to start and where to start them. The Resource Manager FG42 advantageously can send application shutdown orders to the Program Control function FG50 requesting that a certain running application be stopped; this can occur when the QoS Managers indicate that certain scalable applications have too many copies running or when application system priority changes (to lower priorities) occur resulting in scaling back the application system configuration. See FIGS. 13B and 13C and the associated discussion above.

The Resource Manager FG42 receives host load and host fitness information from the Hardware Broker (Host Load Analyzer) function FG40. This information includes overall host fitness scores, CPU-based fitness scores, network-based fitness scores, and memory and paging-based fitness scores along with the SPEC95 rating of the hosts. This information is received approximately once a second and includes information on all known hosts in the distributed system. These scores are used by the Resource Manager FG42 for determining the "best" hosts for placing new applications when:

(1) responding to requests from the QoS Managers to scale up additional copies of an application;
(2) attempting to restart failed applications;
(3) responding to requests to dynamically allocate certain applications; and
(4) responding to application system (mission) priority changes which require scaling up additional applications.

Advantageously, the Resource Manager FG42 also receives requests from the QoS Managers FG44A–FG44N for scaling up, moving, or scaling down specific applications. The Resource Manager FG42 responds to these requests by determining whether the request should be acted upon and, if so, determines the specific action to take and issues orders to the Program Control function FG50 to start up or shutdown specific applications on specific hosts. The QoS Managers FG44A–FG44N are responsible for monitoring specific system performance metrics (e.g., quality of service, or QoS, requirements) via instrumentation and determining if performance can be improved by scaling up or moving certain applications. When this occurs, the QoS Managers send a request to the Resource Manager FG42 indicating that a new copy of a specific application should be started. If the QoS Managers determine that the performance of a scalable application can be improved by moving an application, a scale up request is first sent to the Resource Manager FG42 and when the new application has been started, a scaledown request is then sent to the Resource Manager FG42. Moreover, when the QoS Managers FG44A–FG44N determine that there are more copies of scalable application running then are needed, requests to shutdown specific applications are sent to the Resource Manager FG42.

It will be appreciated that the Resource Management Architecture distributes functionality between the QoS Managers FG44A–FG44N and the Resource Manager FG42. Thus, the QoS Managers determine what actions would potentially improve performance, while the Resource Manager FG42 has final authority to determine whether to implement the requested actions.

It should be noted that when the Resource Manager FG42 is first started, it reads in the System Specification Files FG32 (via calls to the System Specification Library (SSL) FG34) which contains the list of hosts that are known to be (operating) in the distributed environment and information on all applications that can be run in the distributed environment. The application-level information includes where specific applications can be run, which applications are scalable, which applications can be restarted, and any dependencies between applications. In addition, the Resource Manager FG42 receives updated application survivability specifications from the QoS Specification Control function. This information overrides the application survivability information that was initially loaded in from the System Specification Files FG32 for the specified application. The information is used by the Resource Manager FG42 to determine whether the specific application will be restarted if it fails at run-time.

It should also be noted that the Resource Manager FG42 sends application system and hardware system readiness and system (mission) priority information to the Readiness Broker, which is a translator withing the Readiness Display FG66 and to the Globus Broker (another Broker (not shown)). The Readiness Broker is responsible for driving a GUI/display FG66, which shows the current readiness data and allows the system (mission) priorities to be changed and sent back to the Resource Manager FG42. The Globus Broker provides basically the same functionality except that only a high-level subset of the readiness data provided to the Readiness Broker is provided to the Globus Broker. The readiness information sent to the Readiness Broker consists of readiness values for each application, application subsystem, and application system defined in the System Specification Files FG32. The scores advantageously can be based on the status (up/down) of the applications and the percentage of potential copies of scalable applications that are currently running. Host and network readiness scores are determined based on the host loads and host fitness scores received from the Hardware Broker FG40.

The Resource Manager FG42 also sends information about allocation and reallocation decisions to the RM Decision Review Display FG68 (FIGS. 9A, 9B). Information on the decision that was made, what event the decision was in response to, and how long it took to both make the decision and implement the decision are sent to the display. In addition, information about the top choices for where an application could have potentially been placed is also sent (if applicable); this information includes the host fitness scores for the selected host and other hosts which could have been selected.

As described above, the Resource Manager function FG42 communicates with Program Control FG50, the Hardware Broker FG40, the QoS Managers FG44A–FG44N, QoS Specification Control (not shown—legacy function), the Readiness Broker of the Readiness Display FG66, the Globus Broker (not shown), and the RM Decision Review Display FG68 using the RMComms middleware. The message formats and contents of each message that is exchanged between the Resource Manager function FG42 and other functional elements of the Resource Management architecture are described in CD-Appendix D. The timing and/or event trigger for each message is also described.

FG40—Host Load Analyzer (Hardware Broker) Function

Figure 14:
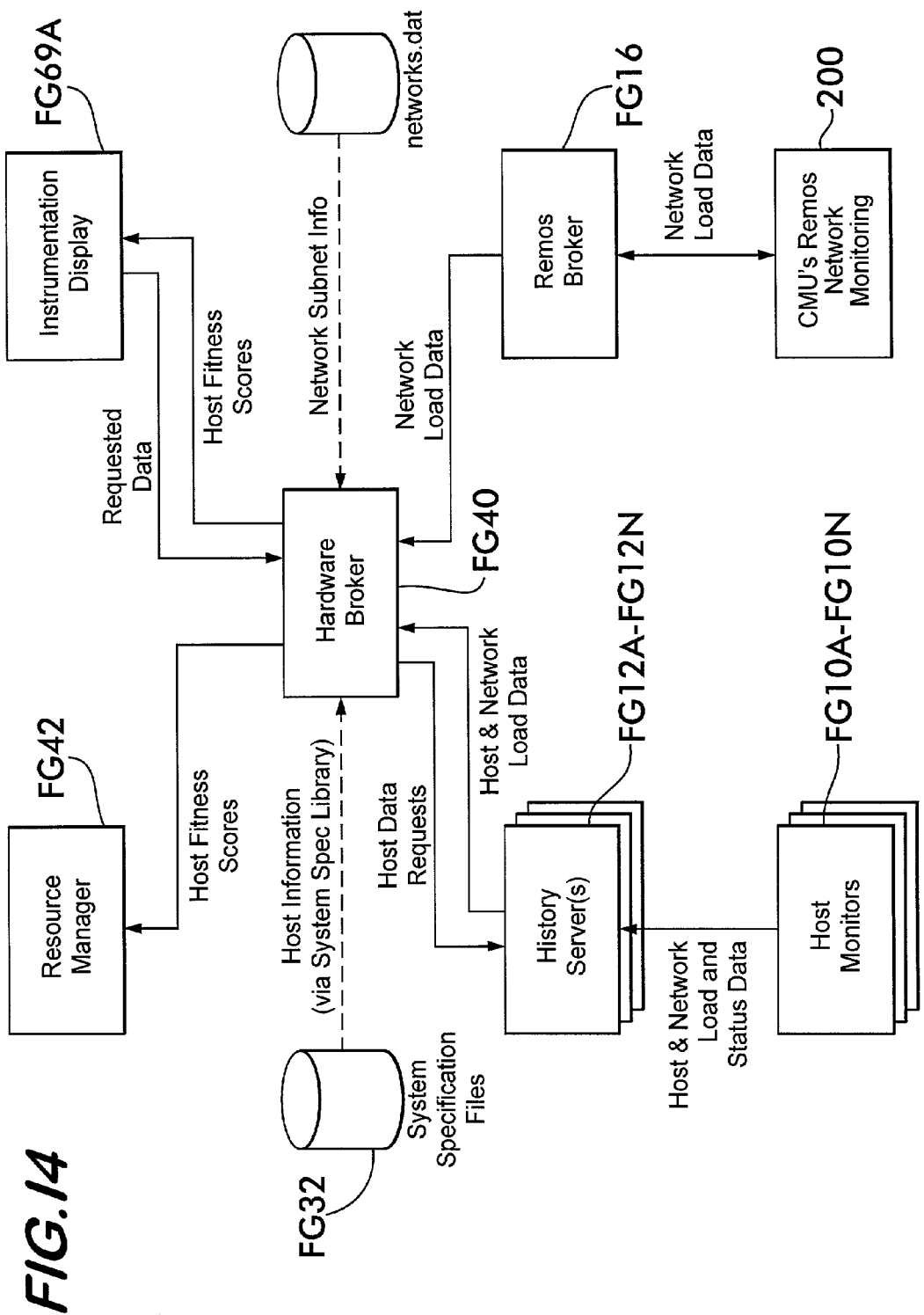
FIG. 14 is a high-level block diagram illustrating connectivity and data flow between the Hardware Broker and the other Resource Management and Resource Management-related functional elements in the Resource Management Architecture.

The Hardware Broker FG40 provides the host load analysis function of the Resource Management functional group FG4. It is responsible primarily for determining the host and network loads on each host within the distributed computing environment. The Hardware Broker FG40 assigns a set of fitness scores for each host and periodically provides the list of fitness scores to the Resource Manager FG42. FIG. 14 illustrates the connectivity and high-level data flow between the Hardware Broker and the other Resource Management and Resource Management-related components.

The Hardware Broker FG40 is an object-oriented multi-threaded application written in C++, which uses the RMComms middleware for all external communication. It receives operating system-level statuses and statistics for each host from the History Server(s) FG12A–FG12N. This information is used for calculating CPU, network, memory, paging activity, and overall fitness scores for each host. The Hardware Broker periodically (once per second) sends the list of host fitness scores to the Resource Manager FG42.

When the Hardware Broker FG40 is first started, it reads in the System Specification Files FG32 (via calls to System Specification Library (SSL) FG34) which contain the list of hosts that are known to be in the distributed environment. The Hardware Broker also reads in the file networks.dat which contains a list of information about the bandwidth and maximum packet sizes on known network subnets. It should be mentioned that this data is used for converting host network load information based on packet counts to load information based on bytes per second and percentage of available bandwidth.

It should be mentioned that there are two other RMComms interfaces that the Hardware Broker FG40 uses. Periodically (approximately every three seconds), the Hardware Broker FG40 sends a list of overall and network host fitness scores to the Hardware Broker Instrumentation Display FG69A–FG69N. As mentioned above, these displays were constructed using the Graph Tool described in the Instrumentation Graph Tool Display. Additionally, the Hardware Broker FG40 can receive host-based network load data from the Remos Broker FG16, which receives network data via the Remos Network Monitoring software (denoted 2 in FIGS. 2A, 2B). If Remos network data is available for any of the hosts that are being monitored, the Remos data is used for the network fitness score calculation for that host rather than the host network data received from the History Server(s).

The exemplary instance of the Hardware Broker FG40 is an object-oriented multi-threaded application. At the highest level, the Hardware Broker object contains the elements listed in Table II below. It will be noted that Table II contains a brief description of each of these objects. Additional details are provided in CD-Appendix E.

TABLE II

| No. | Title | Description |
|---|---|---|
| 1 | Host Fitness Database object (FitnessDB class) | The Host Fitness Database object stores load history data and fitness score information for each host. The Host Fitness Database is updated and fitness scores are recalculated when new History Server Host Status Response Messages are received. For each host, a circular queue of host load history data (HostInstance class) is maintained with the newest data being placed at the end of the queue; this history data is used for recalculating host fitness scores. The Host Fitness Database also contains a System Specification Library (SSL) object which is used to access SPEC rating information for the hosts. |
| 2 | Signal Registration object (SignalRegistry class) | The Signal Registration object allows for a user-defined SIGINT signal handler to be registered in order to permit the Hardware Broker FG40to be shutdown gracefully. |
| 3 | Network Subnet Information Database object (SubnetDB class) | The Network Subnet Information Database object is used to store IP address, maximum bandwidth, and MTU size for each network specified in the networks.dat file. This information is used for converting network packet load information to bytes/second network load information. |
| 4 | Remos Host Network Bandwidth Database object (RemosDB class) | The Remos Host Network Bandwidth Database object stores the latest Remos-reported network bandwidth information for each host being monitored. The information stored consists of available bandwidth as well as maximum potential bandwidth on a specific host network link. If Remos bandwidth information is available for a host and the latest data is less than 5 seconds old, the Remos data will be used for calculating the network fitness score for the host. |
| 5 | History Server Interface object (HistServInterface class) | The History Server Interface object inherits from the RMComms TCPCommClient class and is responsible for maintaining connections to the History Server(s), for registering status and message handler callback functions, for sending messages to the History Server(s), and for invoking the status and message handler callback functions when connections to History Servers are either established or broken or new messages are received from a History Server. |
| 6 | Instrumentation Graph Tool Display Interface | The Instrumentation Graph Tool Display Interface object inherits from the RMComms TCPCommServer |

TABLE II-continued

| No. | Title | Description |
|-----|-------|-------------|
|     | object (InstrInterface class) | class and is responsible for maintaining connections to the Graph Tool Display(s), for registering status and message handler callback functions, for sending messages to the Graph Tool Display(s), and for invoking the status and message handler callback functions when connections to Graph Tool Displays are either established or broken or new messages are received from a Graph Tool Display. |
| 7 | Resource Manager Interface object (ResMgrInterface class) | The Resource Manager Interface object inherits from the RMComms TCPCommServer class and is responsible for maintaining connections to the Resource Manager for registering status and message handler callback functions, for sending messages to the Resource Manager, and for invoking the status and message handler callback functions when connections the Resource Manager are either established or broken or new messages are received from the Resource Manager. |
| 8 | Remos Broker Interface object (RemosInterface class) | The Remos Broker Interface object inherits from the RMComms TCPCommClient class and is responsible for maintaining connections to the Remos Broker for registering status and message handler callback functions, for sending messages to the Remos Broker, and for invoking the status and message handler callback functions when connections the Remos Broker are either established or broken or new messages are received from the Remos Broker. |

FG44: Quality-of-Service (QoS) Manager Function

The QoS Managers FG44A–FG44N are responsible for monitoring application-level performance requirements, which requirements are defined in the System Specification Files FG32 and are monitored primarily via instrumentation data obtained directly from the application code. The QoS Managers FG44A–FG44N advantageously determine if applications or application paths are satisfying their assigned requirements. When an application is not meeting its performance requirements and the application is scalable (in the sense that multiple copies can be run and the copies will perform load-sharing across the copies), the QoS Managers FG44A–FG44N will either request that the Resource Manager FG42 scale up a new copy of the application or move the application to a new host (which hopefully will result in better performance). Moreover, if there are multiple copies of a scalable application running, and all copies are performing below the specified requirement threshold, the QoS Managers FG44A–FG44N will request that the Resource Manager shutdown a specific copy.

The QoS Manager is a single-threaded application written in C/C++. It should be noted that the application can be scaled for both redundancy and/or load-sharing. In an exemplary case, each copy of the QoS Manager monitors all of the requirements associated with a single application path defined in the System Specification Files FG32. It will be appreciated that the specific path to be monitored can be specified via command-line parameters. By default, without specifying a path via the command-line, the QoS Manager will monitor all requirements for all defined paths.

As mentioned above, the QoS Manager advantageously uses a sliding window algorithm to determine when to declare that applications should be scaled up or scaled down. The inputs to the algorithm define both high and low sampling window sizes, the maximum number of allowed violations within the sampling window, and violation thresholds as a percentage of the actual specified requirement value. It will be appreciated that the sliding window algorithm was selected in an effort to damp out unexpected "noise" or "spikes" in the measured performance data. Use of threshold value states as a percentage of the actual requirement value was selected in order to scale up, or scale down, prior to violating the specified hard requirement. It will be understood that the success of this approach is highly dependent on the rate of change and noisiness of the measured data.

Again, the QoS Manager uses the RMComms middleware for all external communication. Each copy of the Resource Manager talks to (1) Resource Manager FG42, (2) Program Control FG50, (3) QoS Specification Control (not shown), (4) QoS Monitor FG29, (5) Instrumentation Correlators FG26A–FG26N, (6) Graph Tool Instrumentation Displays FG69A–FG69N, and (7) History Servers FG12A–FG12N. In an exemplary case, the QoS Managers FG44A–FG44N advantageously can receive configuration orders from the Resource Manager FG42, which allows the Resource Manager FG42 to configure each QoS Manager to monitor specific application paths and also set the sliding window criteria to be used by each respective QoS Manager.

Each copy of the QoS Manager advantageously can transmit application scale up and scale down requests to the Resource Manager FG42 when the measured performance data for a respective application violates either the high (scale up) or low (scale down) sliding window criteria for a specific requirement. A scale up request indicates which application on which host has violated the performance criteria, and a scale down request indicates which application on which host is recommended to be shutdown. Each copy of the QoS Manager can also request that the Resource Manager move an application. This will occur in the case where one copy of an application is performing much worse than all other running copies. The move request is implemented as a scale up request followed by a scale down request (of the badly performing copy); the scale down request is not transmitted to the Resource Manager FG42 until the scale up action has been implemented.

The QoS Managers FG44A–FG44N use the application "settling times" defined in the System Specification Files to ensure that once a requested action has been sent to the Resource Manager that no additional actions are requested until after the application settling time has elapsed. This provides time for initialization and configuration among the application copies to occur. In future releases, the inter-application dependencies will be used instead.

The division of responsibility between the QoS Managers FG44A–FG44N and the Resource Manager FG42 is as follows:

(1) the QoS Managers FG44A–FG44N determine what actions would potentially improve performance; and
(2) the Resource Manager FG42 has final authority to determine whether to implement the requested actions It should be mentioned that there is a Request Acknowledge message from the Resource Manager FG42 which has been defined and implemented within the QoS Manager code. This message is intended to provide feedback to the QoS Manager indicating that the request had been successfully received and whether the Resource Manager FG42 intends to implement the request.

As previously mentioned, the QoS Managers FG44A–FG44N receive application status and state information from the Program Control function FG50. Program Control periodically sends application status updates for all running applications and also sends immediate indications of any applications which have been started or stopped. This information is used by the QoS Managers FG44A–FG44N, along with the instrumented performance data being received via the QoS Monitor FG29 and Instrumentation Correlators FG26A–FG26N, to determine the exact state of the monitored applications A1–NM that are running. This information is also used to determine when (and if) requested actions have been implemented by the Resource Manager FG42. The information is also used for setting up and discarding internal data structures used for monitoring the performance of each application.

The QoS Managers FG44A–FG44N also receive application-level instrumentation data indicating current application performance values from the Instrumentation Correlators FG24A–FG24N, the Instrumentation Brokers FG26A–FG26N, and/or the Jewel Instrumentation Broker (QoS Monitor) FG29. The instrumentation data that is received contains (at a minimum):

(1) the timetag regarding when the data was generated;
(2) the hostname and IP address of the host where the application that the data is associated with is running;
(3) the process id (pid) of the application that the data is associated with; and
(4) the event number of the instrumentation message.

The event number of the instrumentation message specifies the type of instrumentation data that has been received and the hostname, IP address, and pid are used, in conjunction with the application data received from Program Control, to determine the specific application that the data is associated with.

If the contents of the instrumentation message match any of the application performance requirements that are currently being monitored by the QoS Manager, the data value is added to the proper requirement sliding window for the specified application. The sliding window algorithm is then checked to determine if the new sample triggered a violation of either the high or low sliding window. If a high threshold sliding window violation occurs and the application does not already have the maximum number of copies running, a determination is made as to whether performance can be best improved by starting a new application (scale up) or by moving an existing copy to a different host. The corresponding action recommendation will then be sent to the Resource Manager. In an exemplary case, the criteria for determining whether an application should be moved rather than scaled up is based on relative performance of the replicated applications. Thus, if one application is performing much worse [>50%] than the other copies, the recommendation will be to move the application. Likewise, if the new sample triggers a low threshold sliding window violation, and the application has more than the minimum number of copies running, a recommendation will be sent to the Resource Manager FG42 requesting that the copy of the application that is experiencing the worst performance be scaled down.

It will be appreciated from the discussion above that when a copy of the QoS Manager is first started, it reads in the System Specification Files FG32 (via calls to System Specification Library (SSL) FG34), which contain the list of hosts that are known to be in the distributed environment and information on all applications that can be run in the distributed environment. The application-level information includes where specific applications can be run, which applications are scalable, which applications can be restarted, and any dependencies between applications.

It should also be mentioned that the Resource Manager FG42 receives updated application survivability specifications from the QoS Specification Control component. This information overrides the application survivability information that was initially loaded in from the System Specification Files for the specified application. The information is used by the Resource Manager FG42 to determine whether the specific application will be restarted if it fails at run-time.

As described above, the QoS Managers FG44A–FG44N communicates with the Resource Manager FG42, Program Control FG50, the QoS Specification Control (not shown), the QoS Monitor FG29, an Instrumentation Correlator (generally denoted FG24), a Graph Tool Instrumentation Display (generally denoted FG69), and the History Servers FG12A–FG12N using the RMComms middleware. The message formats and contents of each message that is exchanged between the QoS Managers FG44A–FG44N and these other functional components are described in greater detail in CD-Appendix F. Additional details regarding the timing and/or event trigger for each message is also described in the Appendix.

FG3: System Specification Language & System Specification Library (SSL) Functions In order to effectively manage a pool of computing resources, the Resource Manager FG42 requires some means or mechanism of determining the capabilities and configuration of the computing resources under its control, as well as the software components that need to be executed and the dependencies of these software components on both hardware and software resources. Additionally, the Resource Manager FG42 requires the capability to determine the expected mission-level and application-level requirements. Furthermore, the Resource Manager FG42 must be able to determine what control capabilities are available to be used to attempt to recover from fault or QoS violation conditions.

In order to address these needs, a System and Software Specification Grammar has been developed to capture the "static" information needed by the Resource Manager FG42 for effectively managing a pool of distributed resources. The grammar captures the following information:

Hardware and Operating Systems
 Hardware Configuration
 Network Configuration
 Operating System and Version
Software
 Systems, Subsystems, Applications, Processes
 Resource Requirements
 QoS Requirements (Events)
 Survivability Requirements
 Path Information: Structure and QoS Requirements As part of the grammar development effort, a specification library has also been developed that parses the specification files and provides an API for accessing the specification information. It will be noted that the specification library was written in C++ and has been ported for all development platforms including Solaris 2.6, Solaris 2.7, Irix 6.5, HP-UX 10.20, Red Hat Linux 6.0, and Windows NT 4.0. The library advantageously can be used by substantially all of the Resource Management functional elements, including Program Control FG50, Resource Manager FG42, Path QoS Managers, Hardware Broker FG40, and History Servers FG12A–FG12N.

Figure 3:
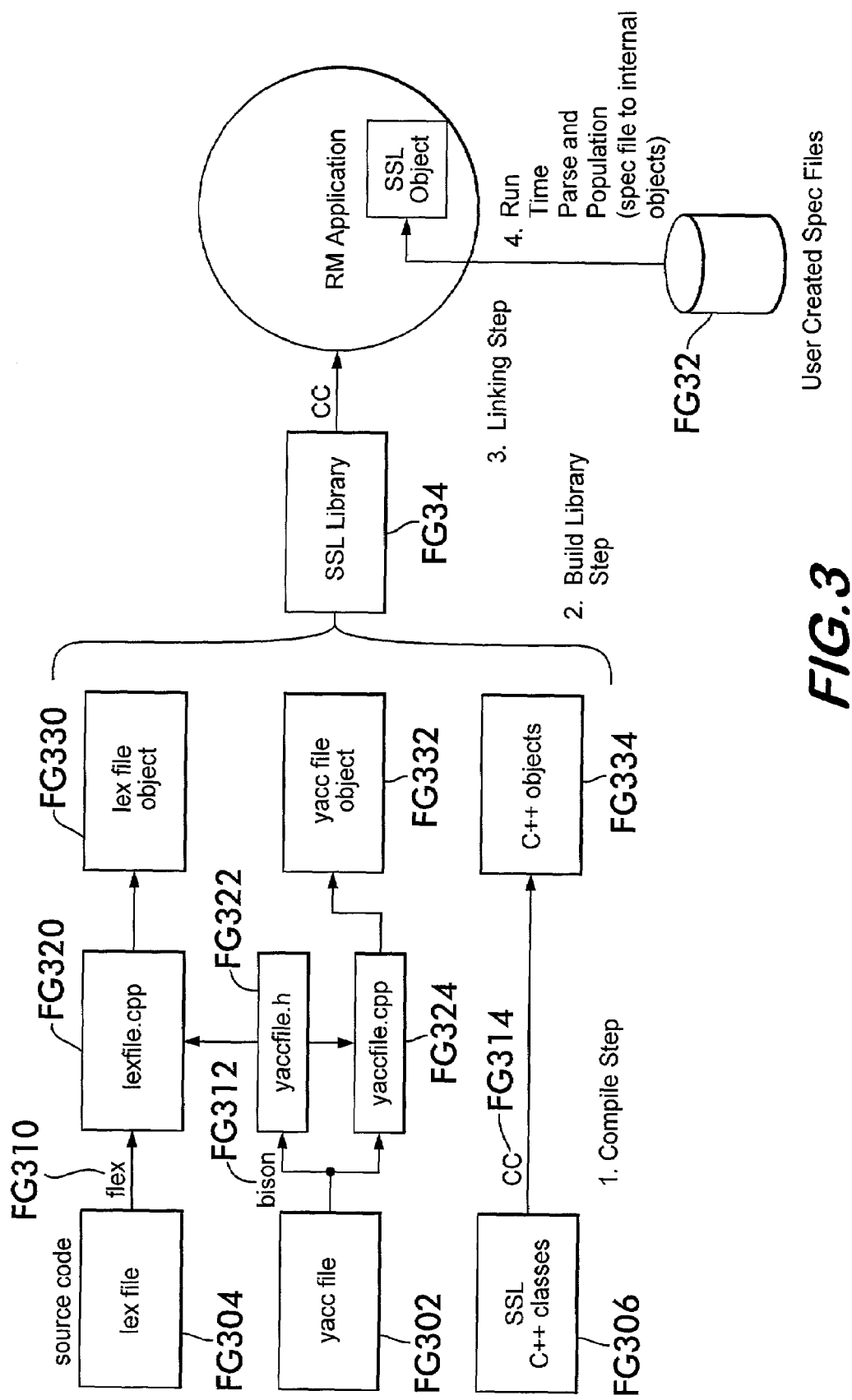
FIG. 3 is a functional block diagram illustrating functional elements included in the system specification library (SSL) implementation of the Resource Management System according to the present invention.

As illustrated in FIG. 3, the API library consists of a yacc file FG302 that defines the BNF grammar, a lex file FG304 that defines the tokens of the language, and a set of C++ classes FG306 that store the spec file information. The lex file FG304 is compiled with the GNU tool flex FG310 and it creates a C++ source file FG320. The GNU tool bison FG 312 compiles the yacc file FG302 and creates C++ source and header files FG322 and FG324. It will be noted that the lex source file FG304 includes the yacc header file FG322. The C++ compiler FG314 then compiles these two source files to create lex and yacc objects FG330 and FG332. The C++ compiler FG314 also compiles the C++ storage classes FG334. All of these objects are linked into a single library FG34 to be utilized by an application. FIG. 3 illustrates this process flow.

The Software Specifications Grammar (SSG) provides techniques for describing the characteristics and requirements of dynamic, path-based real-time systems as well as providing abstractions to describe the properties of the software, such as hierarchical structure, inter-connectivity relationships, and run-time execution constraints. The SSG also allows description of the physical structure or composition of the hardware such as LANs, hosts, interconnecting devices or ICs (such as bridges, hubs, and routers), and their statically known properties (e.g., peak capacities). Furthermore, the Quality-of-Service (QoS) requirements on various system components advantageously can be described.

At the highest level, a specification consists of a collection of software systems, hardware systems, and network systems. The language rules for specifying systems are described generally below and in detail in CD-Appendix G. The system specification language hierarchy is shown below; selected details will be presented immediately following.

Software Specifications
 Application
  Security
  Configuration
   Hardware Requirements
   Startup Info
    Dynamic Arguments
   Shutdown Info
   States -continued Dependencies
   Initial Load Estimate
   QoS Info
    Survivability
    Scalability
  Hardware Specifications
   Host Info
   Network Info
    LANs
    Network Devices (Interconnects)
  Path Specifications
   Data Flow Graph
   Data Flow Info
   QoS Requirements It will be appreciated that a software specification is a collection of software systems, each of which consists of one or more software subsystems. Specification files are provided by the developer to capture as much knowledge about their software system as possible. These files provide a model of the actual systems which can be used by the Resource Manager FG42 at run-time.

In contrast, an application is an executable program that can be started as an autonomous process on a host. Application attributes include all information necessary to startup and shutdown the application. Associated startup block and the shutdown blocks describe how to start and stop the application and includes information such as the directory and name of the application, command line options, and environment variable settings.

An application instantiates an SSL object by calling its constructor. This parses the spec files in the specified directory and populates the object hierarchy to provide the data to the application. The SSL class contains an SSL_Container member, that holds the spec file data in its lists and maps. All the systems from the spec files are contained in the appropriate list, software systems in the swSysList, hardware systems in hwSysList, and network systems in nwSysList. The pathList contains all the paths in the spec files. The hostList contains all the hosts in the spec files; this list is also available from the entries in hwSysList. The processList contains a list of processes from the CONFIGURATION block. Moreover, it should be noted that one or more configuration blocks can exist per application. For example, an application that runs on more than one platform would have multiple CONFIGURATION blocks with different platforms in each HARDWARE block.

The application startup block contains all the information necessary to, automatically or manually, start an application. This information includes supported hardware (host) type, operating-system type, and operating-system version(s). This may be further constrained by an optional list of the names of hosts that can run the application. The startup information also includes the working directory for reading and writing data files, the name of the executable, and an ordered list of arguments that must be passed on the command line when the application is started. Last is a list of processes expected to be seen on the system when the application is running.

An application shutdown block indicates the command(s) to be used for termination of the application. A shutdown command may be a POSIX signal name or may be a shell script or batch file. Supported signals include SIGKILL, SIGQUIT, SIGHUP, SIGUSR1, SIGUSR2, SIGSTOP, SIGINT, and SIGTERM. The ShutdownTime parameter is the maximum time to wait for the an application to die gracefully before forcing the application to terminate via the SIGKILL signal.

Other blocks are available. For example, a dependency block indicates any dependencies the application may have with the startup and/or shutdown of other applications (e.g., it may be required that a particular application be started before another application can be started). It will be noted that the dependency block is used by both Application Control FG50 and the Resource Manager FG42 to determine whether or not it is safe to start an application, stop an application, or let an application continue to run.

The scalability specification for an application indicates whether an application can be scaled via replication. Scalable applications are programmed to exploit load sharing among replicas, and can adapt dynamically to varying numbers of replicas. The specification also indicates whether an application combines its input stream (which may be received from different predecessor applications and/or devices), and splits its output stream (which may be distributed to different successor applications and/or devices) are also specified. "Combining" and "splitting" are commonly called "forking" and "joining" in parallel computing paradigms.

Specification files advantageously can be provided to describe a given set of networks that exist in a distributed runtime environment. A network system specification describes the LANs and ICs (interconnection devices such as switches, hubs and routers). A system consists of one or more subsystems. A subsystem may contain LANs (each with an associated peak bandwidth specification) and ICs (each containing a description of network membership).

Advantageously, a real-time QoS requirement specification includes timing constraints such as simple deadlines, inter-processing times, and throughputs. A simple deadline is defined as the maximum end-to-end path latency during a cycle from the beginning to the end of the path. Inter-processing time is defined as a maximum allowable time between processing of a particular element in the path. The throughput requirement is defined as the minimum number of data items that the path must process during a unit period of time. Each timing constraint specification may also include items that relate to the dynamic monitoring of the constraint. These include minimum and maximum slack values (that must be maintained at run-time), the size of a moving window of measured samples that should be observed, and the maximum tolerable number of violations (within the window).

CD-Appendix G described a specification grammar for declaring requirements on applications in a dynamic, distributed, heterogeneous resource pool. The grammar allows the description of environment-dependent application features, which allows for the modeling and dynamic resource management of such systems.

A common API was developed to allow Resource Management functions access to the information contained in the spec files. This is an object oriented API is, in an exemplary case, written in C++, with libraries ported to all supported platforms. The object is populated by parsing the spec files using the BNF grammar defined by lex and yacc syntax and compiled with GNU tools flex and bison, as discussed above. Actual population occurs in the semantic actions of the yacc file.

The SSL_System class is a generic class that can hold data for a software system, hardware system, or network system. The type member describes the type of system it contains. It also contains a pointer to its parent (it allows for nested systems of the same type), and a name of the system. The sysList contains its SSL_System children, and compList contains a list of the system's components (a list of hosts, for a hardware system for example).

Preferably, the Application Program Interface (API) for the System Specification Library (SSL) FG34 uses the C++ Standard Template Library for data structures such as linked lists and hash tables (maps). An application first instantiates the SSL object by calling its constructor with the name of the directory where the specification files reside. This object contains functions that allow setting this directory after calling its constructor (setSpecDir(directory name)), clearing the object of all currently held data (clear( )), parsing a specific file (parseSpec(filename)), and rebuilding the object (rebuild( )), implicitly clears the object first). Once instantiated, this object provides access to the data in the specification files. CD-Appendix G provides additional discussion regarding this aspect of the SSL. It will be appreciated that the SSL object provides methods that return all the data it contains. For example, the getSWSystems returns an STL list of all the software systems specified in the specification files. Each entry in this list provides its data by methods such as getSysName( ), and the set of application components (ApplicationSpec) that make up the system. All data can be retrieved in this manner.

FG1: Host and Network Monitoring Functional Group

As mentioned above, extensive monitoring capabilities are provided in the Resource Management architecture at the host and network levels. The information monitored includes statuses, configuration information, performance metrics, and detected fault conditions. Moreover, the Host and Network functional group FG1 consists of four components including:

1) Host Monitors FG10A–FG10N, that reside on each machine in the distributed environment and collect extensive operating system-level data for each host (CPU and memory usage, etc) and provides it to the History Servers via the RMComms TCPCommServer middleware.

2) History Servers FG12A–FG12N that collect data from the Host Monitors, maintain status and performance histories on each host in the distributed environment via an RMComms TCPCommClient, and provide this information to displays and other Resource Management components using an RMComms TCPCommServer.

3) A Host Discovery function FG14 that uses SNMP (Simple Network Management Protocol) calls and ping ICMP calls to determine when new hosts come on-line and if existing hosts go down and providing this information to Program Control via an RMComms TCPCommServer.

4) A Remos Network Data Broker FG16 that collects information on network link bandwidths from Carnegie Mellon University's SNMP-based Remos tool and passes this information by way of an RMComms TCPCommServer to the Host Load Analyzer component of the Resource Allocation Decision-Making subsystem.

It will be appreciated that Network information is collected by both the Remos broker FG16 and indirectly via the Host Monitors FG10A–FG10N. See FIGS. 2A, 2B. The Remos Broker FG16 accesses the Remos network information via the Remos API. As mentioned previously, Remos uses SNMP calls to the LAN switches and hosts. The Host Discovery function FG14 uses both SNMP and ICMP (ping)

calls to each host A–N to determine if a new host(s) has (have) come on-line or previously discovered hosts have gone down. The Host Monitors FG10A–FG10N employ Operating System calls to gather host and network performance statistics. Internally, the History Servers FG12A–FG12N collect data from the Host Monitors FG10A–FG210N. The Monitoring functional group provides its information to the rest of the Resource Management components using RMComms TCPCommServer objects, which are discussed in detail elsewhere. The Remos Broker FG16 sends data to the Host Load Analyzer FG40, the History Servers FG12A–FG12N send data to the Display functional group FG6 and Host Load Analyzer FG40, and the Host Discovery function FG14 provides Program Control FG50 with information on detected or faulted hosts. Additional details on these functional elements are provided immediately below.

FG10A–FG10N Host Monitors

For monitoring the status and performance of hosts, a Host Monitor process runs on each machine within the distributed environment. These Host Monitors FG10A–FG10N use operating system-level mechanisms to retrieve status, configuration, and performance information of each host A–N. The information retrieved includes 1) operating system version and machine configuration, 2) CPU configuration, status, and utilization, 3) memory configuration and usage, 4) network configuration, status, and utilization, 5) filesystem configuration, status, and utilization, and 6) process statuses including CPU, memory, network, and filesystem utilization for each process. While the Host Monitors are primarily responsible for monitoring the status of a particular host, they also provide information on network load as seen by a particular host. In the same manner, the Host Monitors FG10A–FG10N also provide information and statistics concerning any remotely mounted filesystems (e.g., NFS).

Preferably, the information the Host Monitors FG10A–FG10N collect is formatted into operating system-independent message formats. These message formats attempt to provide a pseudo-standardized set of state, status, and performance information which is useful to other components of the Resource Management architecture and such that other components do not have to be aware of or deal with the minor deltas between data formats and semantics. Since not all the state and performance data is available on every platform, to indicate which information is available, a group of flags are set in the host configuration message indicating whether specific data items are valid on a particular platform.

It will be appreciated that the Host Monitors FG10A–FG10N have a very specific interface with the History Servers FG12A–FG12N. It periodically (once a second) sends its data to all History Servers connected to it (this is transparent, a property of the RMComms TCPCommServer); the History Server makes no requests to the Host Monitors.

More specifically, the Host Monitors FG10A–FG10N have been designed and implemented in C++. This decision allows for a completely modular design in which platform-specific code can be restricted to a small number of modules. This approach alleviates any of the problems associated with porting to various platforms. Currently there is support for Sun SPARC based architectures running Solaris 2.6 and 2.7, Silicon Graphics MIPS based architectures running IRIX 6.5, Hewlett Packard PA-RISC based architectures running HP1020, and Pentium based architecture running both WinNT 4.0 Workstation and Red Hat Linux 6.0. The Host Monitor source compiles under the native compilers provided by Sun Microsystems and Silicon Graphics for their respective platforms. The Gnu C++ compiler (version 2.8.1) may also be used on Hewlett Packard PA-RISC based architectures under HP-UX 10.20 and Red Hat Linux. Microsoft Visual C++ compiles the Windows NT Host Monitor. All Host Monitors utilize the I/O library package supported by the Resource Management (RM) group under the NSWC's High Performance Distributed Computing (HiperD) initiative.

The Host Monitors FG10A–FG10N accumulate data on a periodic interval specified at invocation. System process table data is accumulated and then filtered to eliminate "uninteresting" processes (usually meaning processes belonging to user ID 0 or 1). It is important to note that system-wide data is accumulated and processed before the filtering stage, so as to insure a complete picture of system-wide performance. This system-wide data, along with the filtered process list, is then made available to the I/O module for subsequent transmission to client applications.

FG12A–FG12N: History Servers

The History Servers FG12A–FG12N are responsible for collecting information from the Host Monitors and maintaining histories on the statuses, statistics, and performance of each host in the distributed environment. This information can be requested by other Resource Management functional group. Currently, the primary consumers of the status information are the Host Load Analyzer (Hardware Broker) FG40 component of the Resource Allocation Decision-Making functional group FG4, the Host Display(s) FG62A–FG62N, and the Path Display FG64. The Host Load Analyzer FG40 receives information on host configuration and loads (primarily CPU, memory, and network data) and uses this to assign host fitness scores. The Host Displays FG62A–FG62N receive and display current host status information, process status information, and network connectivity information. It should be mentioned that the Host Display can also request that the History Servers provide CPU load information, network load information, paging activity data, and memory utilization information which is used to drive line graph charts for specific hosts selected at the Host Display.

The History Servers FG12A–FG12N are designed so that multiple copies can be run simultaneously. Each History Server can be configured to either monitor all Host Monitors FG10A–FG10N or to monitor only a selected subset of the Host Monitors. It will be noted that the History Servers FG12A–FG12N determine the list of hosts in the distributed environment that could potentially be monitored from the System Specification Library (SSL). In this manner, the History Servers FG12A–FG12N can be used to provide survivability (by having multiple History Servers FG12A–FG12N connected to each Host Monitor) and/or to perform load-sharing (with the History Servers FG12A–FG12N each monitoring only a subset of the Host Monitors). The History Servers FG12A–FG12N can also be configured to periodically record history data to disk. These disk files can then be used for off-line analysis.

The History Server function of Resource Management acts as a data broker between daemons monitoring individual hosts, known as host monitors FG10A–FG10N, and other functional components of Resource Management. The host monitors collect performance information (such as CPU utilization and process status data) from hosts of various platforms (SGI, SUN, HP, Windows NT, and Linux). The host monitors use a RMComms TCPCommServer object to distribute this data. For further information, refer to the host monitor and RMComms documentation. The History Servers FG12A–FG12N collect and store this data from the host monitors FG10A–FG10N and distribute it to other Resource Management Clients, such as the Host Displays FG62A–FG62N, Graph Display FG69A–FG69N, Path Display FG64, and the Hardware Broker. FG40

Each History Server has two modes of operation relating to fault tolerance, scalability, and workload distribution between multiple instances of History Servers. The first mode determines at initialization (through command line arguments or default) the set of hosts to monitor, and this set remains static for the life of the History Server process. The second mode recognizes the existence of other History Server processes and coordinates between them. It allows for dynamic changing of the set of hosts each History Server monitors (example: two History Servers each monitoring half of the hosts, a third History Server starts, and all three History Servers reconfigure to each monitor one third of the hosts.) This also allows History Servers to preserve the data it collected by sending it to the others, providing fault tolerance.

The History Server function is written in C++ with an object-oriented design. The main routine processes the command line arguments, retrieves the list of hosts to monitor using an SSL object, instantiates the main History_Server object, and spawns the Collector, Distributor, Communicator, and Display thread. These threads share the main History_Server object. The Collector thread is responsible for collecting and storing data from the host monitors. The Distributor thread processes requests from RM Clients. The Communicator thread waits for events with other History Servers and takes appropriate actions, including triggering the Display thread to update the History Server Display.

FG14—Host Discovery

The Host Discovery function FG14 advantageously can use a Perl script that makes SNMP (Simple Network Management Protocol) calls and ICMP ping calls. These calls are used to periodically scan each subnet and host address in the distributed environment to attempt to determine whether there have been any host status changes. In an exemplary case, the list of hosts and subnets that are to be monitored is read in from a file.

The host discovery FG14 issues MIB-II SNMP queries to obtain information on the hosts A–N on the network. When a new host is first detected, the new host's operating system configuration is queried via SNMP calls. Information on the newly discovered host and its operating system configuration is then sent to the Program Control function FG50. Likewise, when a host fails to respond to multiple SNMP and ping queries, a message indicating that the host appears to have gone down is sent to the Program Control function.

The Host Discovery function FG14 interfaces with Program Control FG50 using a C++ wrapper class around the Perl script. This wrapper class contains an RMComms TCPCommServer, making the data collected by the SNMP calls available to the rest of the Resource Management components.

FG16—Remos Network Data Broker

The final functional component of the Host and Network Monitoring functional group is the Remos Network Data Broker FG16 which receives information on network link bandwidth and network link bandwidth utilization from the SNMP-based Remos network monitoring tool, as shown in FIGS. 2A, 2B and/or FIG. 14. The network information is accessed via the Remos API library and is then sent on to the Host Load Analyzer (Hardware Broker) function FG40 of the Resource Allocation Decision-Making functional group FG4 using an RMComms TCPCommServer. Remos works by using SNMP to query the switches (via the bridge collector) to collect information on network configuration as well as bandwidth utilization on each link and also issues SNMP MIB-II queries to each host to collect the host's view of network utilization. The network information received from Remos consists of the maximum potential bandwidth and the current bandwidth utilization on specific host network links.

The Remos Broker FG16 provides the following information about the network link for each host. The data is sent to the Host Load Analyzer (Hardware Broker) approximately every 2 seconds. The Remos Broker FG16 uses configuration files listing specific hosts and switches that should be queried.

The functions implemented by Host Monitor functional group FG1 have been designed to provide a system monitoring capability not normally supplied by standard SVR4 or BSD Unix services. Such services include cross-platform reporting of system process loading, CPU performance, network performance and periodic status summary reporting. The Host Monitors were developed to support efforts by the HiperD Resource Management group, attempting to provide a common set of OS level parameters useful for assessing host and network load and status, for supporting resource allocation/reallocation algorithms, and attempting to provide a minimally intrusive, close to real-time capability for gathering this data.

Host Discovery Design

The Host Discovery function FG14 of the Resource Management architecture provides resource discovery of hosts on a network. It identifies new hosts that come online or previously known hosts that have gone offline. The Host Discovery component can determine the hostname, the operating system name and version, and in some cases the machine architecture and manufacturer of a newly discovered host. This information is sent to Program Control so the new host can be added to the pool of resources.

The Host Discovery functional element FG14 consists of a Perl script that contains the resource discovery functionality, and a C++ object that receives the output of the Perl script and provides this information to Program Control via an RMComms TCPCommServer connection. This is described in CD-Appendix H. More specifically, the Perl script host_discovery.pl issues ICMP (ping) calls and MIB-II SNMP queries to discover new hosts. On initialization, the script populates a data structure called Net_info for each of the networks (subnets) it needs to monitor. Currently this information is hard-coded, the subnet is defined as 172.30.1, and the lower and upper limits for the host are 1 and 254 respectively. It then initializes the global variables for the server host and port, network domain, and the executable path for the ping (fping) command The host_discovery.pl script establishes a baseline of existing hosts using the current set of hosts that answer the fping call. For each network/subnet defined in its list of Net_info (Net_info.pm) data structures, it calls fping and builds a list of IP addresses of hosts that answered the ping, known as reachable hosts, and a list for those hosts that did not answer the ping. For each reachable host, a Host_info (Host_info.pm) data structure is populated to store the host's information. (Key fields in the Host_info data structure include IP address, hostname, operating system and version, architecture class, and manufacturer.) Since the IP address of the reachable host is known, a call to gethostbyaddr( ) is used to get the hostname. Other information for the host is obtained by making a MIB-II (Management Interface Base version 2) system Group (Object ID 1.3.6.1.2.1.1.1.0) SNMP call to the SNMP agent on each reachable host. This SNMP query returns information on the configuration of a specific network device (in this case, the configuration of each reachable host).

The host_discovery.pl script makes SNMP calls by using subroutines freely available for public use (freeware), created by Simon Leinen. These subroutines are contained in the files BER.pm and SNMP_Session.pm. The SNMP_Session is configurable for specifying timeouts and number of retries before declaring a host unavailable, and for specifying the SNMP Object Id (OID).

Additional general and specific details regarding functional elements of the Host and Networking functional group FG1 are provided in CD-Appendix H.

FG2: Instrumentation Functional Group

As mentioned above, the NSWC-DD Instrumentation System provides general-purpose application event reporting and event correlation capabilities. The Instrumentation system forms an architecture that allows instrumented application data to be easily accessible by other components of the Resource Management architecture. The major functional components of the Instrumentation System architecture are the following:

1) The Instrumentation API Libraries, which are linked with the applications and provide the function call interfaces by which the application sends instrumentation data.
2) An Instrumentation Daemon, one copy of which resides on each host in the distributed environment and is responsible for reading instrumentation data sent by the applications, reformatting the data into instrumentation event messages and sending the messages to the Instrumentation Collectors.
3) The Instrumentation Collectors, which connect to the Instrumentation Daemons on each host and receive instrumentation messages from all hosts. The Collectors forward received messages to the Instrumentation Correlators and Instrumentation Brokers.
4) The Instrumentation Correlators, which receive instrumentation messages from the Instrumentation Collectors and provide grammar-driven capabilities for correlating, combining, and reformatting application data into higher-level metrics (composite events) for use by displays or other Resource Management components.
5) The Instrumentation Brokers, which receive instrumentation messages from the Instrumentation Collectors and perform task-specific reformatting and data manipulation for driving displays or other Resource Management components.
6) The Jewel Instrumentation Broker (QoS Monitor), which is a legacy component that can receive instrumentation data from either the open source Jewel instrumentation package or from the Instrumentation Collectors. The QoS Monitor performs task-specific message reformatting and data manipulation for driving displays and the QoS Managers.

Instrumentation API Library

The applications link in the Instrumentation API Library and make API call to construct and send out instrumentation event messages. Three separate APIs are provided for use by the applications: 1) a printf( )-style API which allows the code to format, build, and send instrumentation data with a single function call, 2) a buffer-construction-style API where the multiple function calls are made to construct the instrumentation buffer iteratively, one data element per call, and 3) a Jewel function call API based on the existing API provided by the Jewel instrumentation package (an open-source package produced by the German National Research Center for Computer Science). The first two APIs are the preferred programming interfaces and take advantage of several key new instrumentation features. It will be appreciated that the Jewel API is provided solely for backwards compatibility with existing instrumented application code and is implemented as a set of wrappers around the printf( )-style API. All three APIs are supported for C and C++. Ada bindings have been produced for the buffer-construction-style API and the Jewel function call API.

The instrumented data is sent from the application to the Instrumentation Daemon on the same host. The current mechanism for data transfer is via UNIX FIFO IPC (inter-process communication) mechanisms. The FIFO mechanism was chosen based on reliability, low overhead, and ease of implementation. Future implementations of the Instrumentation system may explore alternate data passing mechanisms including shared message queues.

Instrumentation Daemon

An Instrumentation Daemon resides on each host in the distributed environment. The Instrumentation Daemon is interrupted when new data is written to the FIFO. The Instrumentation Daemon reads the data from the FIFO and reformats the data into the standard internal Instrumentation message format and sends the data to each of the Instrumentation Collectors that are currently active. (For future implementations, an event request filtering mechanism will be implemented so that specific event messages will only be sent to those Instrumentation Collectors that have requested the message.)

Instrumentation Collectors

The Instrumentation Collectors receive instrumentation messages from the Instrumentation Daemons on each host in the distributed environment. Currently, the Instrumentation Collectors send every instrumentation message to all Instrumentation Brokers and Instrumentation Correlators that have connected to the Instrumentation Collector. (For future implementations, an event request filtering mechanism will be implemented so that specific event messages will only be sent to those Instrumentation Brokers and Instrumentation Correlators that have requested the message. For now, the Instrumentation Collector serves as a pass-through server for instrumentation messages. The Instrumentation Collector does supports architecture scalability in the sense that without the Instrumentation Collectors, each Instrumentation Broker and Instrumentation Correlators would need to maintain connections to the Instrumentation Daemons on every host.)

Instrumentation Correlators

The Instrumentation Correlators provide grammar-driven capabilities for correlating, combining, and reformatting application data into higher-level metrics (composite events) for use by displays or other Resource Management components. Each Correlator reads in a user-specified correlation grammar file that is interpreted at run-time by the Correlator's instrumentation correlation engine.

Instrumentation Brokers

The Instrumentation Brokers are task-specific applications built around a common code package. The Instrumentation Brokers receive instrumentation messages from the Instrumentation Collectors, filter all received instrumentation messages to find the messages of interest, and perform task-specific message data reformatting and manipulation for driving other components such as displays or other Resource Management components. The Instrumentation Broker approach allows for instrumentation data sources to be quickly integrated for test, display, and debugging purposes. (As the Instrumentation Correlator grammar and correlation engine mature in future releases, it is anticipated that the Instrumentation Broker approach will be used less frequently.)

Jewel Instrumentation Broker (QoS Monitor)

The Jewel Instrumentation Broker (hereafter referred to the QoS Monitor) is a legacy architecture component that served as a broker between the Jewel instrumentation package components and Resource Management components and displays. The QoS Monitor was responsible for polling the Jewel Collector components to retrieve application event messages. These messages were then reformatted and used to drive several displays and the QoS Managers. The Jewel instrumentation package has now been replaced in all applications, however the message reformatting capabilities of the QoS Monitor have been maintained so that several displays and the existing QoS Manager interface do not have to be upgraded immediately. The QoS Monitor component has been modified so that it receives instrumentation data from both Jewel and the Instrumentation Collectors.

Middleware

The RMComms middleware package, which is described in the RMComms Middleware Design Report, provides the internal message passing interfaces between the Resource Management components connected via the network. The middleware provides for automatic location-transparent many-to-many client-server connections. Low overhead, reliable message passing capabilities are provided. Registration of message handler callback functions for specified requested message types are provided with the message handler functions being invoked when messages arrive. Registration of connection status callback functions which are invoked when either new connections are made or existing connections are broken is also provided. The middleware package also allows for multiple client and server objects to be instantiated in the same application, is thread-safe, and provides an easy-to-use object-oriented API through which all capabilities are accessed.

Additional details regarding the Instrumentation functional group FG2 are provided in CD-Appendix I.

FG42: Resource Manager

The Resource Manager 42 is the primary decision-making component of the Resource Management toolkit. It is responsible for: 1) responding to application and host failures by determining if and what recovery actions should be taken, 2) determining if and where to place new copies of scalable applications or which scalable applications should be shutdown when the QoS Managers FG44A–FG44N indicate that scale-up or scale-down actions should be taken based on measured application performance, 3) determining where new applications should be placed when requested to do so by Program Control, and 4) determining which and how many applications should run based on application system (mission) priorities. In order to accomplish these tasks, the Resource Manager 42 maintains a global view of the state of the entire distributed environment including status information on all hosts, networks, and applications.

In addition, the Resource Manager 42 also calculates software and hardware readiness metrics and reports these readiness values for display purposes. FIGS. 1A, 1B show the connectivity and high-level data flow between the Resource Manager 42 and the other Resource Management-related components.

The Resource Manager 42 receives status and failure information about hosts, networks, and applications from Program Control. This information includes periodic status updates as well as immediate updates when statuses change such as a new host being detected or an application failing. In the case of applications going down, information as to whether the applications were shutdown on purpose or whether they failed is also sent. Program Control also issues requests to the Resource Manager 42 when new applications need to be dynamically allocated and when Program Control determines that the Resource Manager 42 needs to assess and attempt to resolve inter-application dependencies (such as an application which needs to be running prior to starting up another application).

The Resource Manager 42 responds to faulted applications and hosts by determining whether the failed applications can and should be restarted and attempting to determine where (and if) there are hosts available that the application can run on. When a decision is made by the Resource Manager 42, a message is sent to Program Control specifying what application to start and where to put it. The same general mechanism is used when Program Control requests that the Resource Manager 42 determine where to start new applications and/or how to resolve inter-application dependencies; the Resource Manager 42 responds with orders indicating what applications to start and where to start them. The Resource Manager 42 also sends application shutdown orders to Program Control requesting that certain application be stopped; this can occur when the QoS Managers FG44A–FG44N indicate that certain scalable applications have too many copies running or when application system priority changes (to lower priorities) occur resulting in scaling back the application system configuration.

The Resource Manager 42 receives host load and host fitness information on all known hosts from the Hardware Broker 40 (Host Load Analyzer). This information include overall host fitness scores, CPU-based fitness scores, network-based fitness scores, and memory and paging-based fitness scores along with the SPEC95 ratings of the hosts. This information is received approximately once a second and includes information on all known hosts in the distributed system. These scores are used by the Resource Manager 42 for determining the "best" hosts for placing new applications when: 1) responding to requests from the QoS Managers FG44A–FG44N to scale up additional copies of an application, 2) attempting to restart failed applications, 3) responding to requests to dynamically allocate certain applications, and 4) responding to application system (mission) priority changes which require scaling up additional applications.

The Resource Manager 42 receives requests from the QoS Managers FG44A–FG44N for scaling up, moving, or scaling down specific applications. The Resource Manager FG42 responds to these requests by determining whether the request should be acted upon and, if so, determines the specific action to take and issues orders to Program Control to start up or shutdown specific applications on specific hosts. The QoS Managers FG44A–FG44N are responsible for monitoring specific system performance metrics (e.g., quality of service, or QoS, requirements) via instrumentation and determining if performance can be improved by scaling up or moving certain applications. When this occurs, the QoS Managers FG44A–FG44N send a request to the Resource Manager FG42 indicating that a new copy of a specific application should be started. If the QoS Managers FG44A–FG44N determine that the performance of a scalable application can be improved by moving an application, a scale up request is first sent to the Resource Manager FG42 and when the new application has been started, a scaledown request is then sent to the Resource Manager. Also, when the QoS Managers FG44A–FG44N determine that there are more copies of scalable application running then are needed, requests to shutdown specific applications are sent to the Resource Manager FG42. The division of responsibility is that the QoS Managers FG44A–FG44N determine what actions would potentially improve performance, but the Resource Manager FG42 has final authority to determine whether to implement the requested actions.

When the Resource Manager FG42 is first started, it reads in the System Specification Files (via System Specification Library, SSL, calls) which contain the list of hosts that are known to be in the distributed environment and information on all applications that can be run in the distributed environment. The System Specification Files also include application-level information including where specific applications can be run, which applications are scalable, which applications can be restarted, and any dependencies between applications.

The Resource Manager FG42 can also receive updated application survivability specifications from the QoS Specification Control component. This information overrides the application survivability information that was initially loaded in from the System Specification Files for specified applications. The information is used by the Resource Manager FG42 to determine whether the specific applications will be restarted if they fail at run-time.

The Resource Manager FG42 sends application system and hardware system readiness and system (mission) priority information to the Readiness Broker and to the Globus Broker. The Readiness Broker is responsible for driving a GUI/display which shows the current readiness data and allows the system (mission) priorities to be changed and sent back to the Resource Manager FG42. The Globus Broker provides basically the same functionality except that only a high-level subset of the readiness data provided to the Readiness Broker is provided to the Globus Broker. The readiness information sent to the Readiness Broker consists of readiness values for each application, application subsystem, and application system defined in the System Specification Files. The readiness scores are currently based on the status (up/down) of the applications within a system or subsystem along with the percentage of potential copies of scalable applications that are currently running. Host and network readiness scores are also calculated and are the scores are determined based on the host load information and host fitness scores received from the Hardware Broker 40.

The Resource Manager FG42 also sends information about allocation and reallocation decisions to the Resource Management Decision Review Display. Information on the decision that was made, what event the decision was in response to, and how long it took to both make the decision and implement the decision are sent to the display. In addition, information about the top choices for where an application could have potentially been placed is also sent (if applicable); this information includes the host fitness scores for the selected host and the next best host choices which could have been selected.

See CD-Appendix M for additional details regarding Resource Manager FG42.

In the Background Section of the application, the reader may have interpreted the sentence "The present invention relates generally to resource management systems by which networked computers cooperate in performing at least one task too complex for a single computer to perform" to indicate that the Resource Management Architecture is limited to such applications. Thus, while the Resource Management Architecture generally supports tasks distributed across multiple hosts, it is not limited to only those tasks that must be distributed due to the inability to run them on a single machine. Moreover, the Resource Management functional elements advantageously could be used to control a set of applications which all run on the same machine while still providing monitoring, fault tolerance, etc. (albeit that this is not the normal or even the intended configuration). Furthermore, the Resource Management Architecture, as discussed above, deals with resource managed applications, where the managed characteristic may be one of scalability, survivability, fault tolerance or priority.

Figure 15:
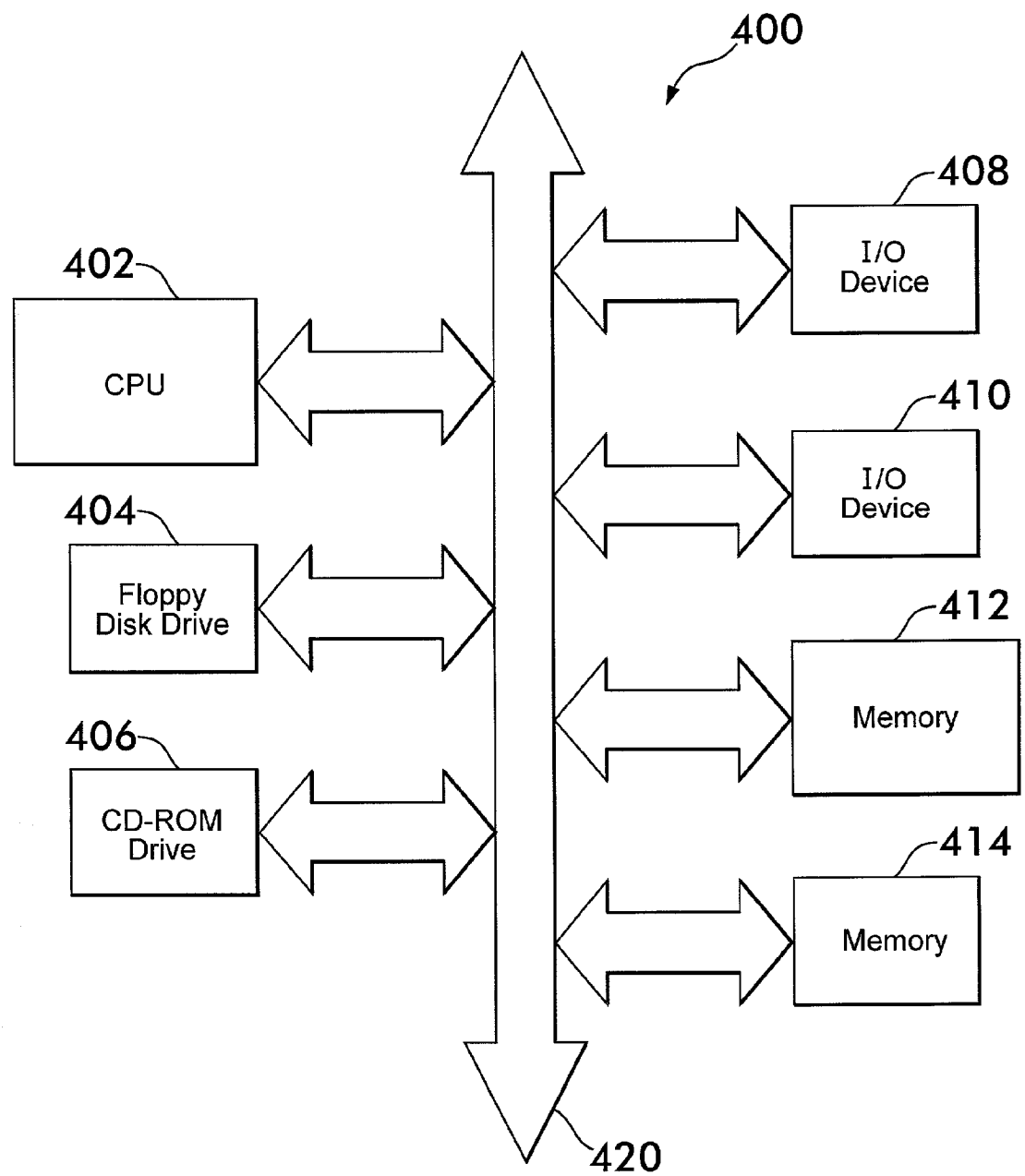
FIG. 15 is a high-level block diagram of a CPU-based general computer which can act as a host in the Resource Management Architecture according to the present invention.

FIG. 15 is a block diagram of a CPU-based system 400, corresponding to one or more of the hosts A–N. The system 400 includes a central processing unit (CPU) 402, e.g., a microprocessor, that communicates with the RAM 412 and an I/O device 408 over a bus 420. It must be noted that the bus 420 may be a series of buses and bridges commonly used in a processor-based system, but for convenience purposes only, the bus 420 has been illustrated as a single bus. A second I/O device 410 is provided in an exemplary case. The processor-based system 400 also includes a primary memory 412, an additional memory 414, which could be either a read-only memory (ROM) or another memory device, e.g., a hard drive or the like. The CPU-based system may include peripheral devices such as a floppy disk drive 404, a compact disk (CD) ROM drive 406, a display (not shown), a key board (not shown), and a mouse (also not shown), that communicate with the CPU 402 over the bus 420 as is well known in the art. It will be appreciated that the either one of the memories 412 or 414 advantageously can be employed to store computer readable instructions for converting the general purpose system 400 into one of the host A–N. It will also be appreciated that the nature of the distributed environment permits the necessary application and API's needed to implement the Resource Management Architecture to be stored anywhere on the network.

TABLE III

| APPENDIX | TYPE | DESCRIPTION |
|---|---|---|
| A | Attached | Resource Management Architecture Function List |
| B | Attached | Standard Instrumentation Message Format |
| C | Attached | API Listing for RMComms |
| D | CD | Resource Manager Interface Messages |
| E | CD | Host Load Analyzer (Hardware Broker) Function |
| F | CD | Quality-of-service (QoS) Manager Function |
| G | CD | FG3: System Specification Language & System Specification Library (SSL) Functions |
| H | CD | Host And Network Monitoring Functional Group |
| I | CD | Instrumentation Functional Group |
| J | CD | Display Functional Group |
| K | CD | RMComms Network Communication Middleware Design |
| L | CD | System Readiness Display |
| M | CD | Resource Manager FG42 |
| N | CD | Instrumentation Graph Tool |
| O | CD | Host Discovery Function |

TABLE III-continued

| APPEN-DIX | TYPE | DESCRIPTION |
|---|---|---|
| P | CD | Instrumentation Application Programming Interface (API) |
| Q | CD | Program Control Application Controller |
| R | CD | Program Control Display |
| S | CD | Program Control Functional Group |
| T | CD | QoS Manager |
| U | CD | Resource Allocation Decision-making Functional Group |

Table III provides a listing of the Appendices included for all purposes in the application. It will be noted that the majority of the listed Appendices are provided on the CD-ROM filed concurrently with the application. In addition, the CD-ROM also includes the source code listing for the Resource Management Architecture according to the present invention.

Although presently preferred embodiments of the present invention have been described in detail herein, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A processor in a distributed environment comprised of hosts, each host instantiating a copy of a scalable application, the processor comprising:
    an instrumentation collector that receives an instrumentation command from the host that executes the scalable application;
    a quality of service manager that monitors the instrumentation command to determine application quality of the scalable application;
    a history server that receives an operating system command from the host;
    a host load analyzer that analyzes a load responsive to the history server to determine an operating load;
    a resource manager that receives the application quality and the operating load to determine a resource allocation for the host; and
    a program control that receives the resource allocation and a program signal from the distributed environment to control the host,
    wherein the instrumentation command includes a start up, a shutdown or and a move of a selected copy of the copies from the hosts, the system operating command based on a first information regarding performance of all copies of the scalable application and a second information regarding performance of the hosts.

2. A processor in a distributed environment comprised of hosts, each host instantiating at least one copy of a managed characteristic application, the processor comprising:
    an instrumentation collector that receives an instrumentation command from the host that executes the managed characteristic application;
    a quality of service manager that monitors the instrumentation command to determine application quality of the managed characteristic application;
    a history server that receives an operating system command from the host;
    a host load analyzer that analyzes a load responsive to the history server to determine an operating load;
    a resource manager that receives the application quality and the operating load to determine a resource allocation for the host; and
    a program control that receives the resource allocation and a program signal from the distributed environment to control the host,
    wherein the instrumentation command orders at least one of a start up of, a shutdown and a move of the copy of the managed characteristic application, the operating system command is based on a first information regarding performance and status of all applications including all copies of the managed characteristic application and a second information regarding the performance of the host.

3. The processor as recited in claim 2, wherein the managed characteristic application comprises a scalable application.

4. The processor as recited in claim 2, wherein the managed characteristic application comprises a fault tolerant application, where the degree of fault tolerance is selectable by a user.

5. The processor as recited in claim 2, wherein the managed characteristic application comprises a selectable priority application.

6. The processor as recited in claim 2, wherein the managed characteristic application further responds to user-initiated control actions.

7. The processor as recited in claim 2, wherein the program control device modifies the configuration of the managed characteristic application responsive to instantaneous tasking by a user.

8. A processor in a distributed environment comprised of hosts instantiating a copy of a managed characteristic application, the processor comprising:
an instrumentation collector that receives an instrumentation command from the host that executes the scalable application;
    a quality of service manager that monitors the instrumentation command to determine application quality of the scalable application;
    a history server that receives an operating system command from the host;
    a host load analyzer that analyzes a load responsive to the history server to determine an operating load;
    a resource manager that receives the application quality and the operating load to determine a resource allocation for the host; and
    a program control that receives the resource allocation and a program signal from the distributed environment to control the host,
    wherein the instrumentation command includes start up, configuration, shutdown and moving of a selected one of the managed characteristic applications, the system operating command is based on a first information regarding performance and status of all running applications including all of the managed characteristic applications, a second information regarding performance of the hosts, and a third information regarding performance of the distributed environment.

9. The processor as recited in claim 8, wherein the managed characteristic application comprises a scalable application.

10. The processor as recited in claim 8, wherein the managed characteristic application comprises a fault tolerant application, where the degree of fault tolerance is selectable by a user.

11. The processor as recited in claim 8, wherein the managed characteristic application comprises a selectable priority application.

12. The processor as recited in claim 8, wherein the managed characteristic application further responds to user-initiated control actions.

13. The processor as recited in claim 8, wherein the program control device modifies the configuration of the managed characteristic application responsive to instantaneous tasking by a user.

14. A processing program recordable on a program storage device readable by an electronic processor that tangibly employs the processing program of instructions executable on the processor disposed in a grid system that includes N hosts instantiating M managed characteristic applications instantiated by and located on at least the N hosts, the processing program comprising:
- instructions to enable an instrumentation collector to receive an instrumentation command from the host that executes the M managed characteristic applications, wherein N program control agents residing on a respective one of the N hosts and providing control over startup, configuration, moving, and shutdown of applications on a respective one of the N hosts;
- instructions to enable a quality of service manager to monitor the instrumentation command and to determine application quality of the M managed characteristic application applications;
- instructions to enable a history server to receive an operating system command from the N hosts, the operating system command being based on information regarding performance and status of all of the M managed characteristic applications;
- instructions to enable a host load analyzer to analyze a load responsive to the history server to determine an operating load;
- instructions to enable a resource manager to receive the application quality and the operating load and to determine a resource allocation for the N hosts; and
- instructions to enable a program controller operatively coupled to the N program control agents, wherein the program controller receives one of the interactive and automatic application control requests and generates specific control orders which are sent to the individual N program control agents responsive thereto;
- where N and M are positive integers.

15. The processing program as recited in claim 14, wherein the specific control orders include one of startup orders permitting instantiation of an $(M+1)^{th}$ managed characteristic application or shutdown and configuration orders permitting a status change regarding one of the M managed characteristic applications.

16. The processing program as recited in claim 14, further comprising:
- instructions for K program control displays permitting interactive control of distributed applications,
- where K is a positive integer.

17. The processing program as recited in claim 16, wherein the K program control displays depict current status and the configuration of the M managed characteristic applications.

18. The processing program as recited in claim 16, wherein the K program control displays depict current status of all applications instantiated on the grid system.

19. The processing program as recited in claim 16, wherein each of the K program control displays comprises a graphical user interface permitting a user to determine the status of each of the N program control agents and the program controller.

20. The processing program as recited in claim 16, wherein the K program control displays respond to one or more L configuration files, wherein L is a positive integer.

21. The processing program as recited in claim 20, wherein each of the K program control displays permits a user to one of create new configuration files and edit an existing one of the L configuration files.

22. The processing program as recited in claim 20, wherein selected ones of the L configuration files correspond to predefined scenario configurations.

23. The processing program as recited in claim 14, wherein the specific control orders permit a subset of the M managed characteristic applications to be started and stopped.

24. The processing program as recited in claim 23, wherein all of the M managed characteristic applications in the subset are started and stopped simultaneously.

25. The processing program as recited in claim 23, wherein the M managed characteristic applications in the subset are started and stopped in a predetermined sequence.

26. The processing program as recited in claim 23, wherein all of the M managed characteristic applications in the subset are started and stopped in a predetermined sequence having a respective delay time between each event in the predetermined sequence.

27. The processing program as recited in claim 23, wherein a first subset of the M managed characteristic applications comprise scalable applications and a second subset of the M managed characteristic applications comprise fault tolerant applications, where the degree of fault tolerance is selectable by a user.

28. The processing program as recited in claim 23, wherein a first subset of the M managed characteristic applications comprise selectable priority applications and a second subset of the M managed characteristic applications comprise fault tolerant applications, where the degree of fault tolerance is selectable by a user.

29. The processing program as recited in claim 23, wherein a first subset of the M managed characteristic applications comprise scalable applications, a second subset of the M managed characteristic applications comprise fault tolerant applications, where the degree of fault tolerance is selectable by a user, and a third subset of the M managed characteristic applications comprises selectable priority applications.

30. The processing program as recited in claim 14, wherein the M managed characteristic applications comprise scalable applications.

31. The processing program as recited in claim 14, wherein the M managed characteristic applications comprise fault tolerant applications, where the degree of fault tolerance is selectable by a user.

32. The processing program as recited in claim 14, wherein the M managed characteristic applications comprise selectable priority applications.

33. The processing program as recited in claim 14, wherein:
- each of the N hosts operates in accordance with a selected one of R operating systems; the N program control agents implement the orders via system call mechanisms specific to the particular operating system of a corresponding one of the N hosts;
- R is a positive integer; and
- N is greater than or equal to R.

34. The processing program as recited in claim 14, wherein each of the N program control agents provides feedback to the program controller regarding the current status and configuration of all applications running on a respective one of the N hosts, and provides feedback to the program controller regarding host status for the respective one of the N hosts.

35. The processing program as recited in claim 14, further comprising:
K program control displays permitting interactive control of distributed applications, wherein:
each of the K program control displays comprises a graphical user interface permitting a user to determine the status of each of the N program control agents and the program control function;
each of the K program control displays responds to a respective subset of L configuration files, wherein K and L are positive integers, and wherein K, L, and N may be equal to or different than one another; and
the program controller, using information from specification files different than the L configuration files, generates the specific control orders by translating the control function requests into the specific control orders.

36. A processing program recordable on a program storage device readable by an electronic processor that tangibly employs the processing program of instructions executable by the processor disposed in a distributed environment that includes N hosts instantiating M managed characteristic applications and instantiated by at least the N hosts, the processing program comprising:
instructions to enable an instrumentation collector to receive an instrumentation command from the host that executes the M managed characteristic applications, wherein N program control agents residing on a respective one of the N hosts and providing direct control over startup, configuration, moving, and shutdown of applications on the respective one of the N hosts;
instructions to enable a quality of service manager to monitor the instrumentation command and to determine application quality of the M managed characteristic application applications;
instructions to enable a history server to receive an operating system command from the N hosts, the operating system command being based on information regarding performance and status of all of the M managed characteristic applications;
instructions to enable a host load analyzer to analyze a load responsive to the history server to determine an operating load;
instructions to enable a resource manager to receive the application quality and the operating load and to determine a resource allocation for the N hosts;
instructions to enable a program controller operatively coupled to the N program control agents, which receives one of user-initiated and program initiated application control requests and information comprising first information regarding performance and status of all running applications, including all of the managed characteristic applications, second information regarding performance of the hosts, and third information regarding performance of the distributed environment, and which generates specific control orders which are sent to the individual N program control agents responsive thereto; and
instructions to enable K program control displays permitting generation of the user-initiated application control requests applied to the program controller, wherein:
each of the K program control displays instantiates a graphical user interface permitting a user to determine the status of each of the N program control agents and the program control function;
each of the K program control displays responds to a respective subset of L configuration files;
the program controller, using information from specification files different than the L configuration files, generates the specific control orders by translating the control function requests into the specific control orders; and
K, L, M and N are positive integers.

37. The processing program as recited in claim 36, wherein the specific control orders include one of startup orders permitting instantiation of an $(M+1)^{th}$ managed characteristic application or shutdown, and configuration orders permitting a status change regarding one of the M managed characteristic applications.

38. The processing program as recited in claim 36, wherein:
each of the N hosts operates in accordance with a selected one of R operating systems;
the N program control agents implement the orders via system call mechanisms specific to the particular operating system of a corresponding one of the N hosts;
R is a positive integer; and
N is greater than or equal to R.

39. Software stored on at least one host for converting N networked hosts into a resource managed system instantiating M managed characteristic applications, the software comprising:
instructions to enable a first function group to monitor the host and network resources;
instructions to enable a second function group which provides to report general-purpose application event occurrences and event correlation capabilities to determine performance and status of the M managed characteristic applications;
instructions to enable a third function group which provides to provide the reasoning and decision-making capabilities for the resource managed system to determine an operating load; and
instructions to enable a fourth function group to provide program control capabilities permitting starting, stopping, moving, and configuring of selected ones of the M managed characteristic applications on respective ones of the N hosts in the resource managed system, based on the performance and the status of all of the M managed characteristic applications, the fourth function group further comprising:
instructions to enable N program control agents that reside on a respective one of the N hosts to provide direct control over startup, configuration, and shutdown of the selected ones of the M managed characteristic applications on the respective one of the N hosts; and
instructions to enable a program controller operatively coupled to the N program control agents to determine a resource allocation for the M managed characteristic applications in response to the operating load,
wherein the program controller receives one of interactive and automatic application control requests and generates specific control orders which are sent to the individual N program control agents responsive thereto, wherein the automatic application control request is generated by the third function group, and wherein M and N are positive integers.

40. The software as recited in claim 39, wherein the specific control orders include one of startup, shutdown, and configuration orders.

41. The software as recited in claim 39, wherein the fourth function group further comprises:

K program control displays permitting interactive control of the M managed characteristic applications.

42. The software as recited in claim 41, wherein each of the K program control displays comprises a graphical user interface permitting a user to determine the status of each of the N program control agents and the program controller.

43. The software as recited in claim 41, wherein the K program control displays respond to L configuration files, wherein L and K are positive integers.

44. The software as recited in claim 43, wherein each of the K program control displays permits a user to one of create a new configuration file and edit an existing one of the L configuration files.

45. The software as recited in claim 43, wherein selected ones of the L configuration files correspond to predetermined scenario configurations.

46. The software as recited in claim 39, wherein:

each of the N hosts operates in accordance with a selected one of R operating systems;

the N program control agents implement the orders via system call mechanisms specific to the particular operating system of a corresponding one of the N hosts; and N and R are positive integers and N is greater than or equal to R.

47. The software as recited in claim 39, wherein each of the N program control agents provides feedback to the program controller regarding the current status and configuration of all applications running on a respective one of the N hosts.

48. The software as recited in claim 39, wherein the fourth function group further comprises:

K program control displays permitting interactive control of distributed applications, wherein:

each of the K program control displays comprises a graphical user interface permitting a user to determine the status of each of the N program control agents and the program controller;

each of the K program control displays responds to a subset of L configuration files, wherein L and K are positive integers; and the program controller, using information from specification files different than the L configuration files generates the specific control orders by translating the control function requests into the specific control orders.

* * * * *